(12) United States Patent
Mochida et al.

(10) Patent No.: US 6,742,390 B2
(45) Date of Patent: Jun. 1, 2004

(54) ANGULAR VELOCITY SENSOR

(75) Inventors: Yoichi Mochida, Fujisawa (JP);
Yoshihiro Konaka, Sagamihara (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/339,599

(22) Filed: Jan. 10, 2003

(65) Prior Publication Data
US 2003/0131664 A1 Jul. 17, 2003

(30) Foreign Application Priority Data

Jan. 10, 2002 (JP) .......................................... 2002-003712
Jul. 18, 2002 (JP) .......................................... 2002-210055
Sep. 17, 2002 (JP) .......................................... 2002-270416
Dec. 3, 2002 (JP) .......................................... 2002-351552

(51) Int. Cl.[7] .............................. G01P 9/04; G01C 19/00
(52) U.S. Cl. ................................ 73/504.14; 73/504.04; 73/504.12
(58) Field of Search ........................................ 73/504.04

(56) References Cited

U.S. PATENT DOCUMENTS 6,230,563 B1    5/2001   Clark et al.
6,301,963 B1   10/2001   Park

FOREIGN PATENT DOCUMENTS

| EP | 1 170 573 A2 | 1/2002 |
| JP | 05-312576 | 11/1993 |
| JP | 07-218268 | 8/1995 |

Primary Examiner—Helen C. Kwok
(74) Attorney, Agent, or Firm—Keating & Bennett, LLP

(57) ABSTRACT

An angular velocity sensor includes four mass members which are connected by retaining beams, and the retaining beams are fixed to a substrate at node portions which correspond to nodes of the retaining beams when the mass members vibrate such that two adjacent mass members are in opposite phases. The mass members vibrate in an X-axis direction while the overall center of gravity is maintained at an approximately constant position. Two mass members disposed at the central region move in a Y-axis direction in accordance with an angular velocity about a Z axis, and the angular velocity is detected on the basis of the displacements thereof. The mass members vibrate in a stable vibrational state and dimensional errors or other problems, are compensated for by their shapes that are symmetric to each other in the Y-axis direction. Accordingly, the detection accuracy and reliability of the sensor are improved.

22 Claims, 28 Drawing Sheets

ANGULAR VELOCITY SENSOR

BACKGROUND OF THE INVENTION

1. Field of the Invention

The present invention relates to an angular velocity sensor suitable for use in detecting an angular velocity.

2. Description of the Related Art

As a first example of a known angular velocity sensor, Japanese Unexamined Patent Application Publication No. 5-312576 discloses an angular velocity sensor which includes a substrate, a mass member which is retained by retaining beams attached to the substrate such that the mass member can move in two perpendicular directions, a vibration generator for vibrating the mass member in a vibration direction which is one of the two perpendicular directions that is parallel to the substrate, and an angular velocity detector which detects an angular velocity on the basis of a displacement of the mass member in a detection direction which is perpendicular to the vibration direction.

In such an angular velocity sensor, among X and Y axes which are parallel to the substrate and a Z axis which is perpendicular to the substrate, the mass member is vibrated in, for example, the X-axis direction with a predetermined amplitude. When an angular velocity about the Z axis is applied to the mass member while it is vibrating in the above-described manner, a Coriolis force is applied to the mass member in the Y-axis direction. Accordingly, the mass member moves in the Y-axis direction, and the angular velocity detector detects the displacement of the mass member on the basis of a capacitance change and outputs a detection signal corresponding to the angular velocity.

In this case, the mass member is retained by the retaining beams provided on the substrate in such a manner that the mass member can move (vibrate) in the X-axis direction. One end of each retaining beam is fixed to the substrate, and the other end is connected to the mass member. While the angular velocity sensor is activated, the retaining beams are deflected such that the mass member vibrates in the X-axis direction.

As a second example of a known angular velocity sensor, Japanese Unexamined Patent Application Publication No. 7-218268 discloses an angular velocity sensor which is called a tuning fork gyroscope, wherein a pair of mass members are arranged above a substrate and are vibrated in opposite phases, so that vibrations of the mass members transmitted to the substrate via retaining beams cancel each other.

In such a case, the retaining beams have a complex shape including a plurality of bent portions in order to retain each of the mass members at a predetermined position. One end of each retaining beam is split into two portions which are connected to the two mass members.

In the above-described first example, the mass member is connected to the substrate by the retaining beams. Therefore, when the mass member vibrates above the substrate, the vibration is easily transmitted to the substrate via the retaining beams.

Accordingly, when the angular velocity sensor is activated, vibration energy is transmitted to the substrate and the amplitude and the vibration velocity of the mass member are reduced. Thus, the Coriolis force due to the angular velocity is also reduced and the detection sensitivity decreases. In addition, when the vibration is transmitted to the substrate, the mass member may vibrate in the detection direction due to the vibration of the substrate even when no angular velocity is applied. Accordingly, the detected angular velocity often includes an error, and reliability of the angular velocity sensor decreases.

In the above-described second example, the mass members are vibrated in opposite phases so that the vibrations of the mass members transmitted to the substrate cancel each other. However, the mass members are retained by the retaining beams having a complex shape with bent portions, and it is difficult to manufacture the retaining beams having the same size, shape, deflection characteristics, etc.

Accordingly, in the second example, the mass members may vibrate in different manners due to the difference in size between the retaining beams, processing errors, etc. In such a case, the vibrations of the mass members transmitted to the substrate via the retaining beams cannot reliably cancel each other.

On the other hand, when an acceleration is applied to the angular velocity sensor in the Y-axis direction due to an external force, such as an impact force, while the angular velocity sensor is activated, the mass members may move in the Y-axis direction not only due to the Coriolis force caused by the angular velocity but also due to an inertial force caused by the acceleration. In such a case, although the detected displacement includes both an angular-velocity component and an acceleration component, the angular velocity is determined on the basis of the detected displacement.

Therefore, even a small impact applied to the angular velocity sensor causes an error corresponding to the acceleration component in the angular-velocity detection signal and decreases the accuracy in detecting angular velocity. Accordingly, it is difficult to ensure the reliability of the sensor.

If the acceleration applied to the angular velocity sensor includes a frequency component that is close to the vibration frequency of the mass members, the error due to the acceleration component cannot be reliably removed even by signal processing, such as synchronous detection, in which the detection signal is synchronously rectified at a period corresponding to the vibration frequency and integrated to separate the angular-velocity component.

SUMMARY OF THE INVENTION

In order to overcome the problems described above, preferred embodiments of the present invention provide a high-sensitivity, high-accuracy, and high-reliability angular velocity sensor which prevents vibrations of mass members from being transmitted to a substrate via retaining beams and in which the mass members vibrate in a stable vibrational state.

According to a preferred embodiment of the present invention, an angular velocity sensor includes a substrate, four mass members which face the substrate with a gap between each mass member and the substrate, the mass members being arranged along a Y-axis direction when X, Y, and Z axes that are perpendicular to each other are defined, retaining beams which connect the mass members such that the mass members can move in the X-axis direction, a fixing member disposed between the substrate and the retaining beams to fix the retaining beams to the substrate, a vibration generator which vibrates at least one of the mass members in the X-axis direction so that the adjacent mass members vibrate in opposite phases, and an angular velocity detector which detects an angular velocity on the basis of displacements of two of the four mass members which are disposed symmetrically about the central position in the Y-axis direction when the two mass members disposed symmetrically about the central position move in at least one of the Y and Z-axis directions by the angular velocity.

Accordingly, the four mass members can be connected to each other by the retaining beams along the Y-axis direction, which is perpendicular to the vibrating direction (X-axis direction). By vibrating at least one of the mass members by the vibration generator, the four mass members can be vibrated such that two adjacent mass members are in opposite phases. The retaining beams which connect the mass members are provided with vibration nodes, which are maintained at predetermined positions when the retaining beams vibrate along with the mass members.

Since the two mass members which are disposed symmetrically about the central position (at the central region or at the outside in the Y-axis direction) vibrate in opposite phases, these two mass members move in the opposite directions due to a Coriolis force when the angular velocity is applied, and move in the same direction due to an inertial force when an acceleration is applied. Therefore, the displacements thereof in the same direction (acceleration components) can be canceled by calculating the difference between the displacements of these two mass members, and the angular velocity can be detected separately from the acceleration.

In addition, since the four mass members are arranged along the Y-axis direction, the overall center of gravity of the four mass members can be maintained at an approximately certain position while the mass members vibrate. Accordingly, the mass members can vibrate in a stable vibrational state and the vibrations thereof can be prevented from being transmitted to the substrate. The two mass members disposed symmetrically about the central position in the Y-axis direction are preferably arranged such that the shapes thereof are symmetrical with respect to the overall center of gravity of the four mass members. In such a case, the resonance frequencies and the amounts of deformation due to temperature variation of the two mass members disposed at the central region are approximately the same. Therefore, the two mass members disposed at the central region move by approximately the same distance when an acceleration is applied. As a result, the acceleration components can be reliably eliminated by calculating the difference between the displacements of the two mass members disposed at the central region and the detection accuracy of the angular velocity can be increased.

As described above, according to a preferred embodiment of the present invention, the four mass members are connected by the retaining beams and are vibrated in the X-axis direction such that two adjacent mass members are in opposite phases. The four mass members are preferably arranged such that the shapes thereof are symmetrical with respect to the overall center of gravity in the Y-axis direction. In such a case, the four mass members can vibrate in a stable vibrational state such that two adjacent mass members are in opposite phases while the overall center of gravity is maintained at an approximately constant position. Accordingly, the mass members can vibrate with a good balance and reaction forces generated while the mass members vibrate can reliably cancel each other. Therefore, the vibrations can be more reliably prevented from being transmitted to the substrate. In addition, even when there are small dimensional errors or processing errors, differences in resonance frequencies, etc., between the mass members due to such errors can be compensated for by their symmetrical shapes. Accordingly, when the acceleration is applied due to external vibration, impact, etc., the mass members which vibrate in opposite phases move by approximately the same distance, and the displacements due to the acceleration can be reliably canceled by the angular velocity detector. Therefore, the angular velocity can be accurately detected separately from the acceleration, and the performance and reliability of the sensor can be improved.

In the angular velocity sensor of preferred embodiments of the present invention, preferably, the angular velocity detector detects an angular velocity on the basis of displacements of two of the four mass members which are disposed at the central region in the Y-axis direction when the two mass members disposed at the central region move in at least one of the Y and Z-axis directions by the angular velocity.

In the angular velocity sensor of preferred embodiments of the present invention, preferably, the retaining beams are fixed to the substrate by the fixing member at portions corresponding to nodes of the retaining beams when the mass members vibrate such that two adjacent mass members are in opposite phases.

Since the fixing member fixes the retaining beams to the substrate at positions corresponding to the nodes of the retaining beams when the mass members vibrate, the vibrations of the mass members can be reliably prevented from being transmitted to the substrate via the retaining beams, and the detection accuracy of the angular velocity sensor can be further increased.

In addition, according to preferred embodiments of the present invention, preferably, the four mass members are arranged linearly in the Y-axis direction and the retaining beams extend linearly in the Y-axis direction and connect the mass members.

Accordingly, when, for example, one of the mass members is vibrated in the X-axis direction, the vibration thereof is efficiently transmitted to the other mass members via the retaining beams. Thus, the mass members can be vibrated such that two adjacent mass members are in opposite phases with a simple structure. In addition, the vibrational state (vibration mode) of each mass member can be determined by the deflection of the linear retaining beams. Accordingly, even when there are small processing errors in the mass members, the two mass members disposed at the central region can be vibrated at approximately the same amplitude, and stable detection sensitivity can be obtained.

In addition, according to preferred embodiments of the present invention, preferably, the four mass members include a pair of mass members disposed at the central region in the Y-axis direction and a pair of mass members disposed at positions outside the mass members disposed at the central region, and a first pair selected from the two pairs of mass members moves in the Y-axis direction in accordance with an angular velocity about the Z axis and a second pair of the two pairs of mass members moves in the Z-axis direction in accordance with an angular velocity about the Y axis. In addition, the angular velocity detector includes a first angular velocity detector element for detecting the angular velocity about the Z axis on the basis of displacements of the first pair of mass members and a second angular velocity detector element for detecting the angular velocity about Y axis on the basis of displacements of the second pair of mass members.

Accordingly, the angular velocity about the Z axis can be detected, for example, by the mass members disposed at the central region while the angular velocity about the Y axis is detected by the mass members disposed at the outside. Alternatively, the angular velocity about the Y axis can be detected by the mass members disposed at the central region while the angular velocity about the Z axis is detected by the mass members disposed at the outside. Thus, the angular velocity sensor functions as a two-axis angular velocity sensor which detects angular velocities about two axes individually. In addition, the overall size of the two-axis angular velocity sensor can be reduced, and signal processing circuits and electric wiring for the sensor can be made simpler.

In addition, according to preferred embodiments of the present invention, preferably, each of the two mass members disposed at the central region includes a central frame having a frame shape and a horizontal vibrator which is disposed inside the central frame such that the horizontal vibrator can vibrate in the Y-axis direction along the substrate, and the angular velocity detector detects an angular velocity about the Z axis on the basis of displacements of the horizontal vibrators in the Y-axis direction.

Accordingly, while the angular velocity is not applied, the vibrator only vibrates in the X-axis direction in the central frame even when the retaining beams are deflected. Thus, the deflection of the retaining beams can be prevented from being transmitted to the vibrator as a displacement in the Y-axis direction, and the detection accuracy of the angular velocity about the Z axis can be further increased.

In addition, according to preferred embodiments of the present invention, preferably, the angular velocity detector includes first and second displacement detectors for detecting a displacement in the Y-axis direction of the horizontal vibrator of one of the two mass members disposed at the central region, and third and fourth displacement detectors for detecting a displacement in the Y-axis direction of the horizontal vibrator of the other one of the two mass members disposed at the central region.

Since the two mass members disposed at the central region in the Y-axis direction vibrate in opposite phases, they move in the opposite directions due to the Coriolis force when an angular velocity about the Z axis is applied, and move in the same direction due to the inertial force when an acceleration is applied in the Y-axis direction. Accordingly, by adding, or obtaining the difference between the displacement of the horizontal vibrator detected by the first and second displacement detectors and the displacement of the other horizontal vibrator detected by the third and fourth displacement detectors, the displacements in the same direction (acceleration components) can be canceled and eliminated, so that the angular velocity can be detected separately from the acceleration and variations in sensitivities due to thermal distortion can be canceled.

In addition, according to preferred embodiments of the present invention, preferably, the first and second displacement detectors include first and second fixed detection electrodes and first and second movable detection electrodes, respectively, the first and second fixed electrodes being provided on the substrate and the first and second movable electrodes being provided on the corresponding horizontal vibrator and facing the first and second fixed detection electrodes, respectively, with gaps therebetween in the Y-axis direction. When the angular velocity about the Z axis is applied, the movable detection electrode moves toward the fixed detection electrode in one of the first and second displacement detectors and the movable detection electrode moves away from the movable detection electrode in the other one of the first and second displacement detectors move away from each other. In addition, preferably, the third and fourth displacement detectors include third and fourth fixed detection electrodes and third and fourth movable detection electrodes, respectively, the third and fourth fixed electrodes being provided on the substrate and the third and fourth movable electrodes being provided on the corresponding horizontal vibrator and facing the third and fourth fixed detection electrodes, respectively, with gaps therebetween in the Y-axis direction. When the angular velocity about the Z axis is applied, the movable detection electrode moves toward the fixed detection electrode in one of the third and fourth displacement detectors and the movable detection electrode moves away from the movable detection electrode in the other one of the third and fourth displacement detectors move away from each other.

Accordingly, when an angular velocity about the Z axis is applied, the capacitance between the fixed detection electrode and the movable detection electrode increases, for example, in the first and the third displacement detectors while the capacitance between the fixed detection electrode and the movable detection electrode decreases in the second and the fourth displacement detectors. In such a case, when an acceleration is applied in the Y-axis direction, the capacitance between the fixed detection electrode and the movable detection electrode increases, for example, in the first and the fourth displacement detectors while the capacitance between the fixed detection electrode and the movable detection electrode decreases in the second and the third displacement detectors.

Accordingly, the acceleration components can be canceled and eliminated by adding the capacitances in the first and the third displacement detectors and adding the capacitances in the second and the fourth displacement detectors, so that the angular velocity can be detected separately from the acceleration. In addition, since the sum of the capacitances in the first and the third displacement detectors and the sum of the capacitances in the second and the fourth displacement detectors vary (increase and decrease) in the opposite phases, a signal corresponding to the angular velocity can be magnified by obtaining the difference between these two sums.

In addition, according to preferred embodiments of the present invention, preferably, the angular velocity detector includes a first displacement detector for detecting a displacement in the Y-axis direction of the horizontal vibrator of one of the two mass members disposed at the central region, and a second displacement detector for detecting a displacement in the Y-axis direction of the horizontal vibrator of the other one of the two mass members disposed at the central region. The first displacement detector includes a first fixed detection electrode which is provided on the substrate and a first movable detection electrode which is provided on the corresponding horizontal vibrator and faces the first fixed detection electrode with a gap therebetween in the Y-axis direction, and the second displacement detector includes a second fixed detection electrode which is provided on the substrate and a second movable detection electrode which is provided on the corresponding horizontal vibrator and faces the second fixed detection electrode with a gap therebetween in the Y-axis direction.

Since the two mass members disposed at the central region in the Y-axis direction vibrate in opposite phases, they move in the opposite directions when an angular velocity about the Z axis is applied. When each of the two displacement detectors includes a fixed detection electrode and a movable detection electrode, the two displacement detectors can be set such that the capacitances between the fixed detection electrodes and the movable detection electrodes of the two displacement detectors increase or decrease in the same phase or in the opposite phases. Accordingly, the angular velocity about the Z axis can be detected by adding or obtaining the differences between the capacitances in the two displacement detectors.

When the angular velocity about the Z axis is applied, the first and second movable detection electrodes may move toward or away from the first and second fixed detection electrodes, respectively, in the first and second displacement detectors at the same time.

In this case, when an acceleration is applied in the Y-axis direction, the two horizontal vibrators move in the same direction. In addition, the capacitance in one of the two displacement detectors increases and the capacitance in the other one of the two displacement detectors decreases. Accordingly, the capacitance changes due to the acceleration can be canceled and eliminated by adding the capacitances in the two displacement detectors, so that the angular velocity can be detected separately from the acceleration.

Alternatively, when the angular velocity about the Z axis is applied, the movable detection electrode may move toward the fixed detection electrode in one of the first and second displacement detectors while the movable detection electrode moves away from the fixed detection electrode in the other one of the first and second displacement detectors.

In this case, when an acceleration is applied in the Y-axis direction, the two horizontal vibrators move in the same direction and the capacitances in the two displacement detectors increase and decrease together. Accordingly, the capacitance changes due to the acceleration can be canceled and eliminated by obtaining the difference between the capacitances in the two displacement detectors, so that the angular velocity can be detected separately from the acceleration and variations in sensitivities due to thermal distortion can be canceled.

In addition, according to preferred embodiments of the present invention, preferably, each of two of the four mass members which are disposed at the outside in the Y-axis direction includes a central frame having a frame shaped configuration and a vertical vibrator which is disposed inside the central frame such that the vertical vibrator can vibrate in the Z-axis direction, which is perpendicular to the substrate, and the angular velocity detector detects an angular velocity about the Y axis on the basis of displacements of the vertical vibrators in the Z-axis direction.

Accordingly, the mass members disposed at the outside can move toward/away from the substrate in the Z-axis direction in accordance with the angular velocity about the Y axis while they vibrate in the X-axis direction, and the angular velocity about the Y axis can be detected on the basis of the displacements of these mass members.

In addition, the angular velocity about the Z axis can be detected by the mass members disposed at the central region while the angular velocity about the Y axis is detected by the mass members disposed at the outside. Thus, the angular velocity sensor functions as a two-axis angular velocity sensor which detects angular velocities about two axes individually.

In addition, according to preferred embodiments of the present invention, preferably, the fixing member includes arm portions which are deflected in the Y-axis direction while retaining the mass members when an acceleration is applied to the mass members in the Y-axis direction.

Accordingly, the four mass members can be retained by arm portions having elasticity (spring characteristics) in the Y-axis direction. Therefore, when, for example, the mass members move (vibrate) in the Y-axis direction due to disturbance such as acceleration, the mass members vibrate while they are elastically connected to each other by the arm portions (coupled vibration), so that vibration energies of the mass members are transmitted between the mass members due to the elastic force of the arm portions. Therefore, even when the amplitudes of the mass members corresponding to a predetermined acceleration are different from each other due to dimensional errors or processing errors, the differences in vibration amplitude between the mass members can be reduced as the vibration energies are transmitted between them, and the influence of the acceleration can be reliably eliminated between the mass members.

In addition, according to preferred embodiments of the present invention, preferably, the four mass members are arranged symmetrically in the Y-axis direction with respect to the overall center of gravity of the four mass members.

Accordingly, the resonance frequencies of the two mass members disposed at the central region can be set to be approximately the same, so that these mass members move by approximately the same distance when an acceleration is applied. Therefore, the acceleration components can be eliminated by calculating the difference between the displacements of these two mass members, and only the angular velocity component can be obtained. In addition, since the overall center of gravity can be maintained at an approximately constant position when the four mass members vibrate, the four mass members can vibrate in a stable vibrational state and the vibrations thereof can be prevented from being transmitted to the substrate.

In addition, even when there are small dimensional errors or processing errors, differences in resonance frequencies, etc., between the mass members due to such errors can be compensated for by their symmetrical shapes, and the performance and reliability of the sensor can be improved.

In addition, according to preferred embodiments of the present invention, preferably, masses of two of the four mass members which are disposed at the outside in the Y-axis direction are smaller than masses of the two mass members disposed at the central region. When the four mass members vibrate, a rotational moment about the overall center of gravity of the four mass members applied to the two mass members disposed at the central region is approximately the same as a rotational moment about the overall center of gravity of the four mass members applied to the two mass members disposed at the outside.

When the mass members vibrate such that two adjacent mass members are in opposite phases, the rotational moment about the overall center of gravity applied to the mass members disposed at the central region and that applied to the mass members disposed at the outside are opposite to each other. Since the mass members disposed at the outside are farther away from the overall center of gravity than the mass members disposed at the central region, the rotational moment applied to the mass members disposed at the central region and that applied to the mass members disposed at the outside can be set to be approximately the same by setting the mass of the outer mass members smaller than the mass of the central mass members.

As a result, when the mass members are vibrated by the vibration generator, the quality factor in the resonant state can be increased and the mass members can be vibrated with a large amplitude, so that stable detection sensitivity can be obtained. In addition, since the rotational moment applied to the mass members disposed at the central region and the mass members disposed at the outside cancel each other, the rotational moments can be prevented from being transmitted to the substrate as an external force. Therefore, the detection accuracy of the angular velocity sensor can be further increased.

In addition, according to preferred embodiments of the present invention, two of the four mass members which are disposed at the central region in the Y-axis direction may be provided with a vibrational state monitor for monitoring the state of vibration generated by the vibration generator on the basis of displacements of the mass members when the mass members vibrate in the X-axis direction.

Accordingly, when the angular velocity detector detects the displacements of the two mass members disposed at the central region in the Y-axis direction, the angular velocity detector and the vibrational state monitor can be disposed near each other.

In addition, when the angular velocity detector detects the displacements of the two mass members disposed at the outside in the Y-axis direction, the angular velocity detector and the vibrational state monitor can be disposed separately from each other. Therefore, a signal corresponding to the angular velocity and a signal corresponding to the vibrational state can be obtained separately with high accuracy, and there is more freedom in designing the sensor.

In addition, according to preferred embodiments of the present invention, two of the four mass members which are disposed at the outside in the Y-axis direction may be provided with a vibrational state monitor for monitoring the state of vibration generated by the vibration generator on the basis of displacements of the mass members when the mass members vibrate in the X-axis direction.

Accordingly, when the angular velocity detector detects the displacements of the two mass members disposed at the outside in the Y-axis direction, the angular velocity detector and the vibrational state monitor can be disposed separately from each other. Therefore, a signal corresponding to the angular velocity and a signal corresponding to the vibrational state can be obtained separately with high accuracy, and there is more freedom in designing the sensor.

In addition, according to preferred embodiments of the present invention, preferably, the angular velocity sensor further includes a vibrational state monitor for monitoring the state of vibration generated by the vibration generator on the basis of displacements of the mass members when the mass members vibrate in the X-axis direction, the vibrational state monitor being disposed at a portion of one of the retaining beams which corresponds to one of nodes of the retaining beam when the mass members vibrate such that two adjacent mass members are in opposite phases.

Accordingly, a monitor electrode having a relatively small inertial mass can be rigidly attached to one of the portions corresponding to the nodes of the retaining beams where the vibrations are not easily transmitted, and be fixed to the substrate by the node and the fixing member. As a result, even when acceleration is applied to the substrate due to external vibration, impact, etc., the monitor electrode can be prevented from being accidentally moved due to the acceleration, and accurate monitor signals can be output to an external circuit, etc. In particular, the monitor electrode can be reliably prevented from being affected by the acceleration in the Z-axis direction. In addition, since the retaining beams are deflected by the amount corresponding to the amplitude of the mass members while the mass members vibrate, the vibrational state monitor can detect the vibrational state of the mass members on the basis of the amount of deflection of the retaining beams. Accordingly, the amplitudes, etc., of the mass member can be reliably feedback-controlled on the basis of the monitor signals by, for example, an external circuit. Therefore, even when there is temperature variation or when an external force is applied, the angular velocity can be detected with high accuracy, and reliability of the angular velocity sensor can be further improved.

In addition, according to preferred embodiments of the present invention, preferably, the vibrational state monitor includes a fixed monitor electrode provided on the substrate and a movable monitor electrode which is disposed on the portion of the retaining beam which corresponds to the node and which rotates around the portion of the retaining beam which corresponds to the node with respect to the fixed monitor electrode when the mass members vibrate and the retaining beams are deflected.

Accordingly, when the mass members vibrate and the retaining beams are deflected, the movable monitor electrode rotates around the node, so that the opposing area between the fixed monitor electrode and the movable monitor electrode changes in accordance with the displacement of the movable monitor electrode. Therefore, the vibrational state of the mass members can be detected on the basis of a capacitance change between the fixed monitor electrode and the movable monitor electrode. Accordingly, the vibrational state of the mass members can be accurately detected with a simple, non-contact structure.

In addition, according to preferred embodiments of the present invention, preferably, the fixed monitor electrode includes a plurality of electrode fingers having an arc shaped configuration disposed around the portion of the retaining beam which corresponds to the node, and the movable monitor electrode includes a plurality of electrode fingers having an arc shape such that the electrode fingers of the fixed monitor electrode and the electrode fingers of the movable monitor electrode oppose each other with gaps provided in the radial direction.

Accordingly, the electrode fingers of the fixed monitor electrode and those of the movable monitor electrode can have, for example, comb-like configurations arranged such that they interlock with each other, and the opposing area between the fixed monitor electrode and the movable monitor electrode can be increased. Thus, a small, high-accuracy monitor electrode unit can be obtained. In addition, since the electrode fingers of the fixed monitor electrode and those of the movable monitor electrode have an arc shape, they can move relative to each other without coming into contact with each other when the movable monitor electrode rotates around the node. In addition, the electrode fingers of the fixed electrode and those of the movable electrode oppose each other with gaps therebetween in the radial direction, and the opposing area therebetween changes proportionally to the amount of rotation (rotational angle) of the movable monitor electrode. Therefore, the capacitance between the fixed electrode monitor and the movable electrodes can be changed proportionally (linearly). Accordingly, the vibrational state of the mass members can be detected with high accuracy even when the monitor electrodes are disposed at one of the nodes of the retaining beams.

In addition, according to preferred embodiments of the present invention, preferably, the angular velocity detector includes first and second displacement detectors for detecting a displacement in the Y-axis direction of one of the two mass members disposed symmetrically about the central position in the Y-axis direction, and third and fourth displacement detectors for detecting a displacement in the Y-axis direction of the other one of the two mass members disposed symmetrically about the central position in the Y-axis direction.

Since the two mass members disposed symmetrically about the central position in the Y-axis direction vibrate in opposite phases, they move in the opposite directions when an angular velocity about the Z axis is applied and move in the same direction when an acceleration is applied in the Y-axis direction. Accordingly, by adding, or obtaining the difference between the displacement of the mass member detected by the first and second displacement detectors and the displacement of the other mass member detected by the third and fourth displacement detectors, the acceleration components included in the displacements can be canceled and eliminated, so that the angular velocity can be detected separately from the acceleration and variations in sensitivities due to thermal distortion can be canceled.

In addition, according to preferred embodiments of the present invention, preferably, the angular velocity detector includes a first displacement detector for detecting a displacement in the Y-axis direction of one of the two mass members disposed symmetrically about the central position in the Y-axis direction, and a second displacement detector for detecting a displacement in the Y-axis direction of the other one of the two mass members disposed symmetrically about the central position in the Y-axis direction.

Since the two mass members disposed symmetrically about the central position in the Y-axis direction vibrate in opposite phases, they move in the opposite directions when an angular velocity about the Z axis is applied. When each of the two displacement detectors includes a fixed detection electrode and a movable detection electrode, the two displacement detectors can be set such that the capacitances between the fixed detection electrodes and the movable detection electrodes of the two displacement detectors increase or decrease in the same phase or in the opposite phases. Accordingly, the angular velocity about the Z axis can be detected by adding or obtaining the differences between the capacitances in the two displacement detectors.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
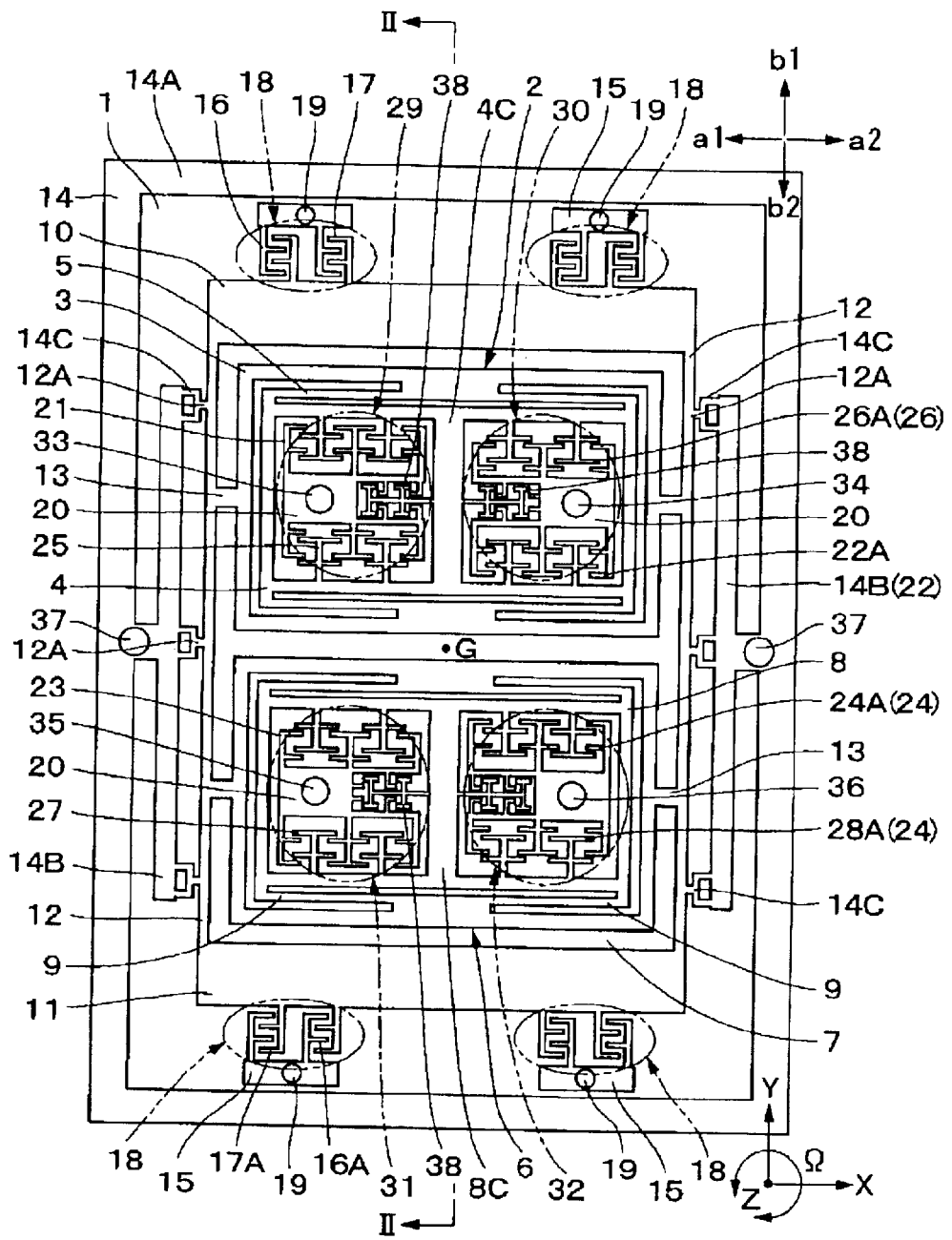
FIG. 1 is a plan view showing an angular velocity sensor according to a first preferred embodiment of the present invention.

Angular velocity sensors according to preferred embodiments of the present invention will be described in detail below with reference to the accompanying drawings.

A first preferred embodiment of the present invention will be described below with reference to FIGS. 1 to 10. An angular velocity sensor according to the first preferred embodiment detects an angular velocity about a Z axis, which is substantially perpendicular to a substrate.

In the figures, reference numeral 1 denotes a substantially rectangular substrate defining a main body of an angular velocity sensor. The substantially rectangular substrate 1 is preferably made of, for example, a silicon material having a high resistance, a glass material, or other suitable material. Among three perpendicular axes (X, Y, and Z axes), the substrate 1 extends horizontally along, for example, the X and Y axes and is disposed perpendicularly to the Z axis.

Figure 2:
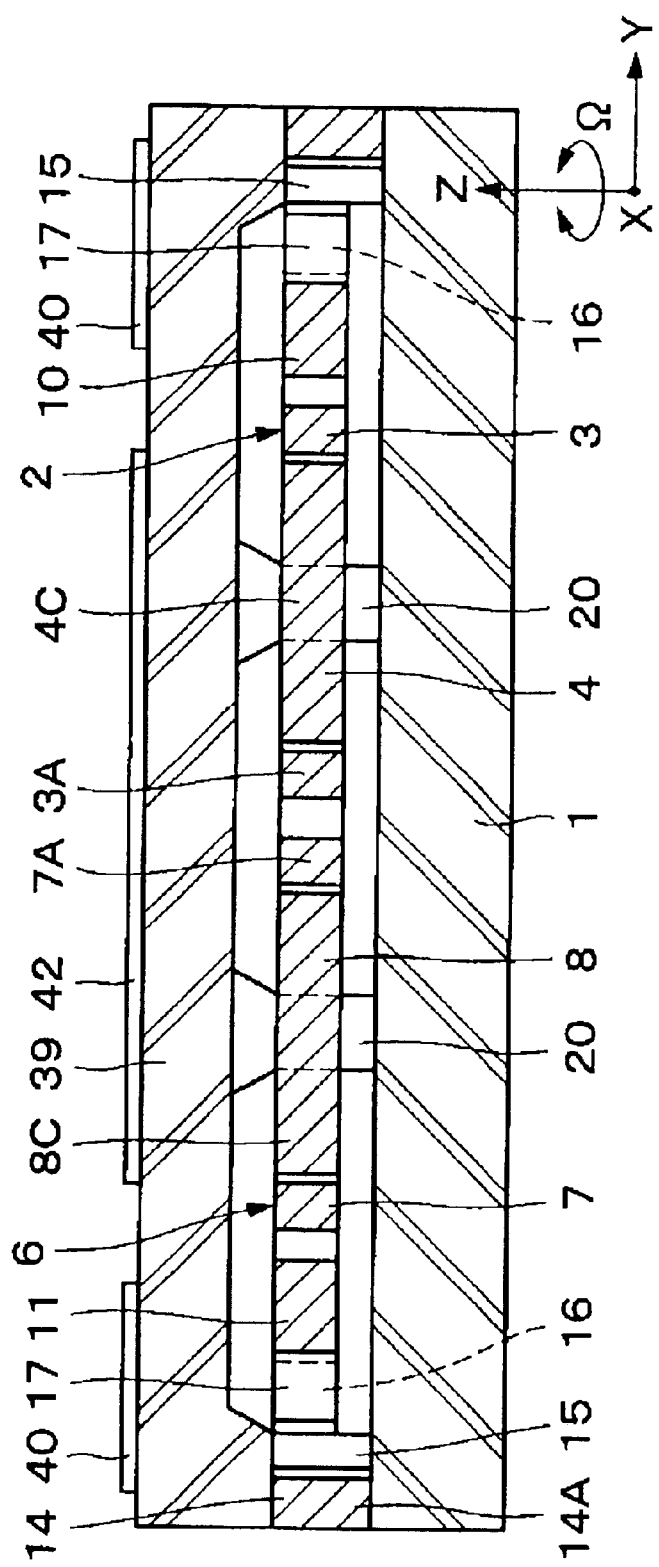
FIG. 2 is a sectional view of the angular velocity sensor shown in FIG. 1 cut along line II—II.

As shown in FIGS. 1 and 2, central mass members 2 and 6, outer mass members 10 and 11, outer retaining beams 12, a fixing member 14, electrode retainers 15 and 20, driving electrodes 16 and 17, detection electrodes 21, 22, 23, 24, 25, 26, 27, and 28, monitor electrode units 38, etc., which will be described below, are formed on the substrate 1 by, for example, forming a layer of monocrystal or polycrystal silicon material having a low resistance and performing a microfabrication process such as etching.

Figure 3:
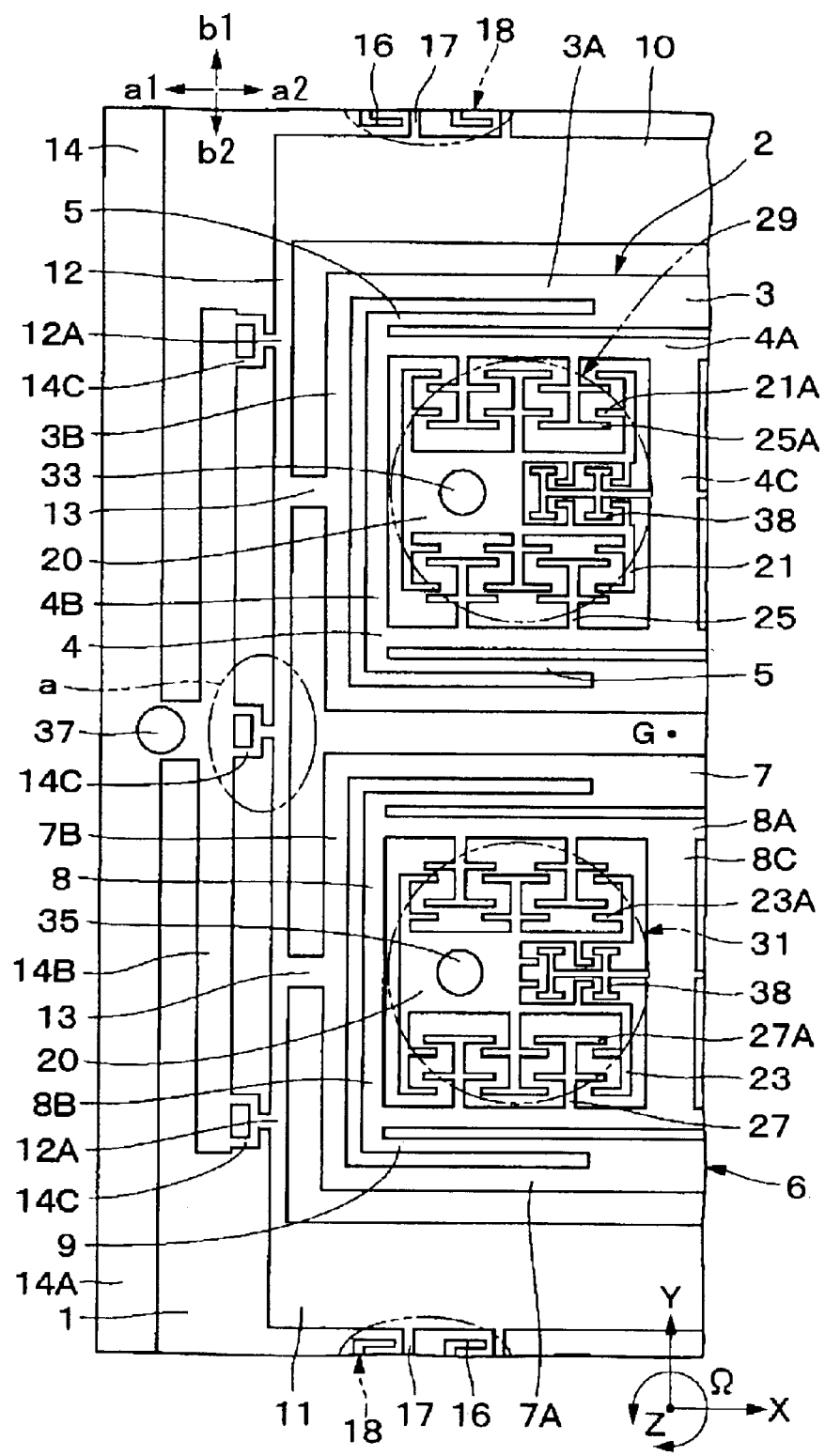
FIG. 3 is an enlarged plan view showing a left side of the angular velocity shown in FIG. 1.

As shown in FIG. 3, the four mass members 2, 6, 10, and 11 are arranged in the Y-axis direction such that the central mass members 2 and 6 are disposed at the central region above the substrate 1. The central mass member 2 includes a substantially rectangular central frame 3, a horizontal vibrator 4 which is configured as an integral frame having the shape of an angular number '8' placed in a horizontal orientation and which is disposed inside the central frame 3 such that the horizontal vibrator 4 can vibrate in the Y-axis direction, and inner retaining beams 5, which will be described below.

The central frame 3 includes longitudinal frame members 3A which extend in the X-axis direction at the front and back and lateral frame members 3B which extend in the Y-axis direction at the left and right. In addition, when the outer retaining beams 12 are deflected such that the central mass member 2 vibrates in the X-axis direction, the central frame 3 and connecting members 13, which will be described below, function to prevent the deflection of the outer retaining beams 12 from being transmitted to the horizontal vibrator 4 as a displacement in the Y-axis direction. Accordingly, the horizontal vibrator 4 is prevented from moving in the Y-axis direction irrespectively of an angular velocity.

The horizontal vibrator 4 includes longitudinal frame members 4A which extend in the X-axis direction at the front and back, lateral frame members 4B which extend in the Y-axis direction at the left and right, and a central frame member 4C which extends in the Y-axis direction at a position between the lateral frame members 4B. Four inner retaining beams 5, which can be deflected in the Y-axis direction, are disposed at four corners between the central frame 3 and the horizontal vibrator 4. The inner retaining beams 5 retain the horizontal vibrator 4 such that the horizontal vibrator 4 can move (vibrate) in the Y-axis direction along the substrate 1, and prevent the horizontal vibrator 4 from moving in the X-axis direction with respect to the central frame 3.

Similar to the central mass member 2, the central mass member 6 disposed above the substrate 1 includes a central frame 7 having longitudinal frame members 7A at the front and back and lateral frame members 7B at the left and right and a horizontal vibrator 8 which is disposed inside the central frame 7 and which has longitudinal frame members 8A at the front and back, lateral frame members 8B at the left and right, and a central frame member 8C. The horizontal vibrator 8 is retained by four inner retaining beams 9 such that the horizontal vibrator 4 can move in the Y-axis direction.

The two outer mass members 10 and 11 are disposed at positions outside the central mass members 2 and 6 in the Y-axis direction, and have a linear shape which extends in the X-axis direction. The outer mass members 10 and 11 are connected to the outer retaining beams 12 at both ends thereof.

The four mass members 2, 6, 10, and 11 are arranged linearly in the Y-axis direction and are connected to each other by the outer retaining beams 12. In addition, the mass members 2, 6, 10, and 11 face the substrate 1 with a gap between each mass member and the substrate 1. As shown in FIG. 3, the shapes of the two central mass members 2 and 6 are symmetrical with respect to the overall center of gravity G of the mass members 2, 6, 10, and 11 in the Y-axis direction. In addition, the horizontal vibrators 4 and 8 disposed inside the central mass members 2 and 6, respectively, have approximately the same resonance frequency. In addition, the central mass members 2 and 6 are positioned symmetrically about the central position in the Y-axis direction (center of gravity G), and the outer mass members 10 and 11 are also positioned symmetrically about the central position in the Y-axis direction.

Figure 6:
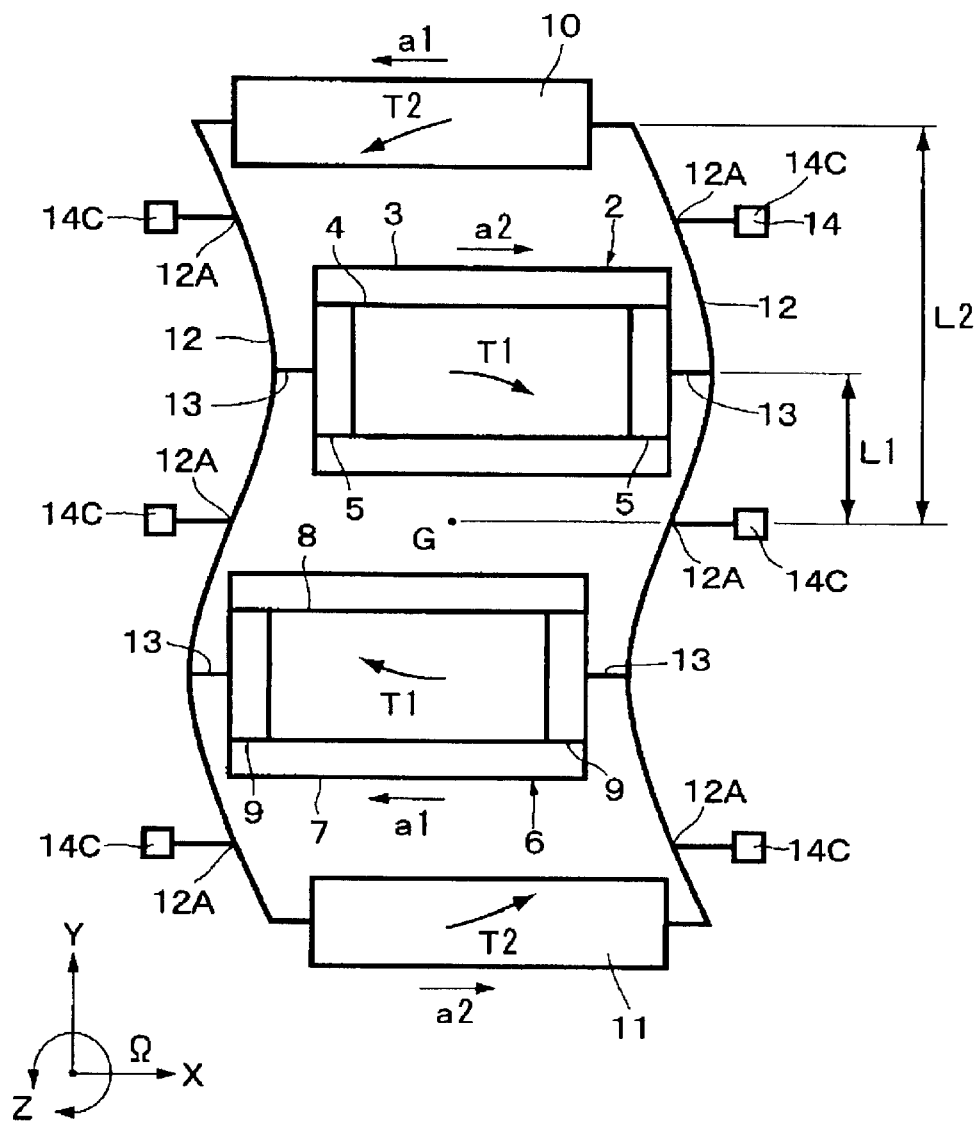
FIG. 6 is a schematic diagram showing rotational moments applied to central mass members and outer mass members when the mass members are vibrated.

As shown in FIG. 6, which will be described in more detail below, the outer retaining beams 12 are deflected to vibrate the mass members 2, 6, 10, and 11 in the X-axis direction such that the phases of two adjacent mass members are opposite, that is, the phase of the mass members 2 and 11 is opposite to the phase of the mass members 6 and 10. Since the pair of mass members 2 and 11 and the pair of mass members 6 and 10 reliably vibrate in a symmetric manner while the overall center of gravity G is maintained at an approximately constant position, the vibrations can be prevented from being transmitted to the substrate 1.

Each of the central mass members 2 and 6 has a predetermined mass M1, and the center of gravity of each of the central mass members 2 and 6 is separated from the overall center of gravity G by a predetermined distance L1 in the Y-axis direction. In addition, each of the outer mass members 10 and 11 has a predetermined mass M2 which is less than that of the central mass members 2 and 6 (M1>M2), and the center of gravity of each of the outer mass members 10 and 11 is separated from the overall center of gravity G by a predetermined distance L2 in the Y-axis direction, which is more than L1 (L1<L2).

The mass M1 and the distance L1 of the central mass members 2 and 6 and the mass M2 and the distance L2 of the outer mass members 10 and 11 are determined so as to satisfy Equations (1) and (6), which will be described below. Accordingly, when the angular velocity sensor is activated, a rotational moment T1 of the central mass members 2 and 6 and a rotational moment T2 of the outer mass members 10 and 11 are approximately the same, so that the rotational moments T1 and T2 about the overall center of gravity G cancel each other.

The outer retaining beams 12 are disposed at both sides of the mass members 2, 6, 10, and 11 in the X-axis direction. Each of the outer retaining beams 12 has a thin beam construction which extends linearly in the Y-axis direction and which can be deflected in the X-axis direction. In addition, each of the outer retaining beams 12 is connected to the central frames 3 and 7 by wide, rigid connecting members 13 at intermediate positions along the longitudinal direction of the outer retaining beam 12, and to the outer mass members 10 and 11 at both ends in the longitudinal direction of the outer retaining beam 12. In this manner, the outer retaining beams 12 retain the four mass members 2, 6, 10, and 11 such that the mass members 2, 6, 10, and 11 can vibrate in the X-axis direction.

As shown in FIG. 6, when the mass members 2, 6, 10, and 11 vibrate such that the phase of the mass members 2 and 11 and the phase of the mass members 6 and 10 are opposite to each other, each of the outer retaining beams 12 is deflected in the X-axis direction to form a letter 'S' shape. Each of the outer retaining beams 12 has three node portions 12A at intermediate positions along the longitudinal direction of the outer retaining beam 12, the node portions 12A corresponding to vibration nodes and being maintained at approximately constant positions.

As shown in FIGS. 1 and 3, the fixing member 14 provided on the substrate 1 includes a substantially rectangular base frame 14A which is fixed on the substrate 1 such that the base frame 14A surrounds the mass members 2, 6, 10, and 11; substantially T-shaped extending portions 14B which are disposed inside the base frame 14A integrally with the base frame 14A and which extend in the Y-axis direction at the left and right sides of the substrate 1; and arm portions 14C which are provided on the extending portions 14B and which are connected to the node portions 12A of the outer retaining beams 12 at positions separated from the substrate 1.

When the mass members 2, 6, 10, and 11 vibrate such that the phase of the mass members 2 and 11 and the phase of the mass members 6 and 10 are opposite to each other, the vibrations thereof cancel each other at each of the node portions 12A of the outer retaining beams 12. Accordingly, the fixing member 14 prevents the vibrations from being transmitted to the substrate 1.

Figure 4:
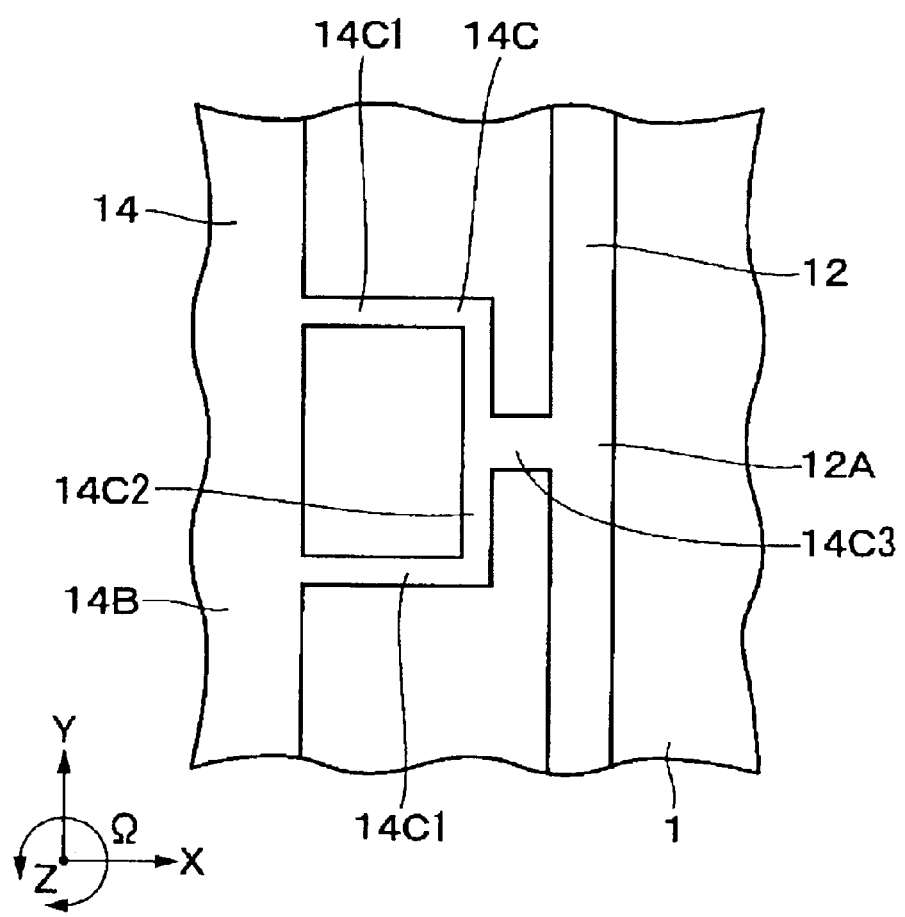
FIG. 4 is an enlarged view of a main portion denoted by a in FIG. 3 which includes a fixing member.

As shown in FIG. 4, each arm portion 14C is constructed of a thin beam having one of a bracket shape, a U-shape, a Y-shape or other suitable shape and has elasticity (spring characteristics) in the Y-axis direction. For example, each arm portion 14C includes two lateral beams 14C1 which project from the extending portion 14B in the X-axis direction with a gap therebetween and which can be deflected in the Y-axis direction, a longitudinal beam 14C2 which extends in the Y-axis direction and connects the distal ends of the lateral beams 14C1, and a fixing portion 14C3 which is connected to the longitudinal beam 14C2 at the central position thereof and which is fixed to the corresponding node portion 12A of the outer retaining beam 12.

Figure 8:
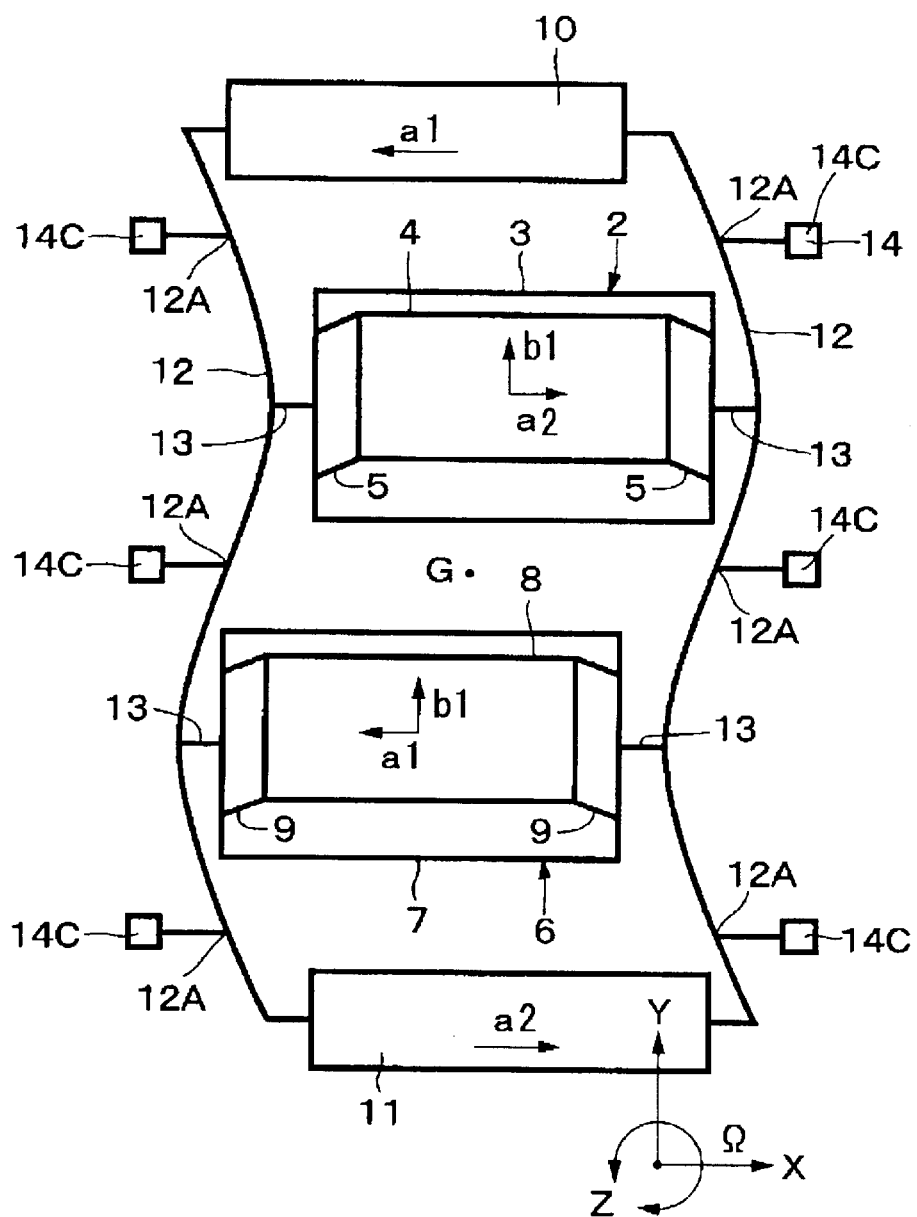
FIG. 8 is a schematic diagram showing the manner in which the two central mass members move in the same direction due to acceleration.
Figure 9:
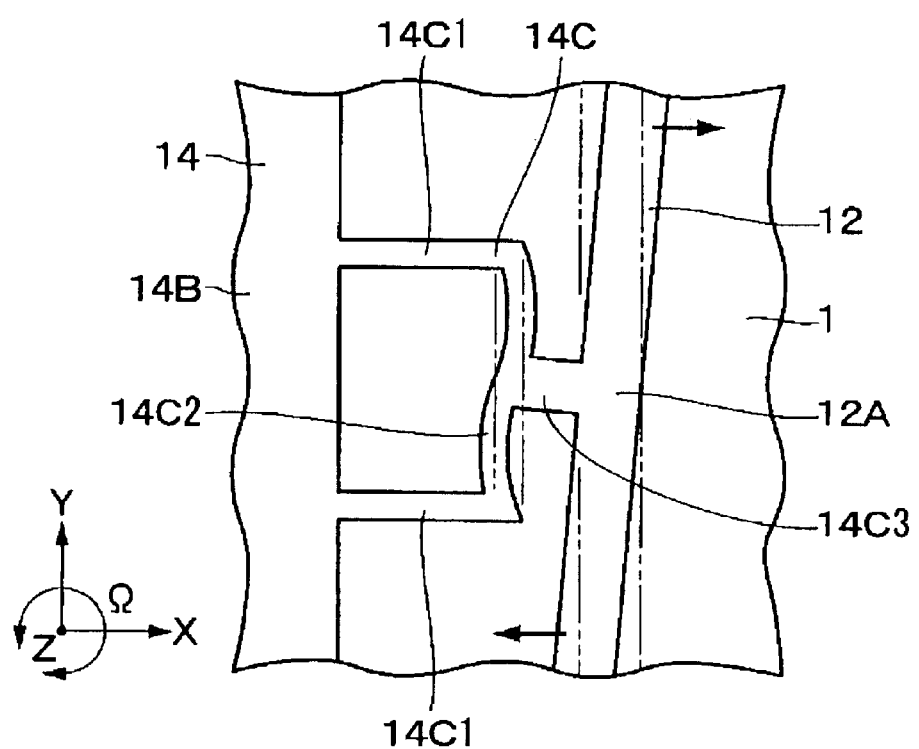
FIG. 9 is an enlarged view showing the manner in which an arm portion is deflected when the mass members are vibrated in the X-axis direction.
Figure 10:
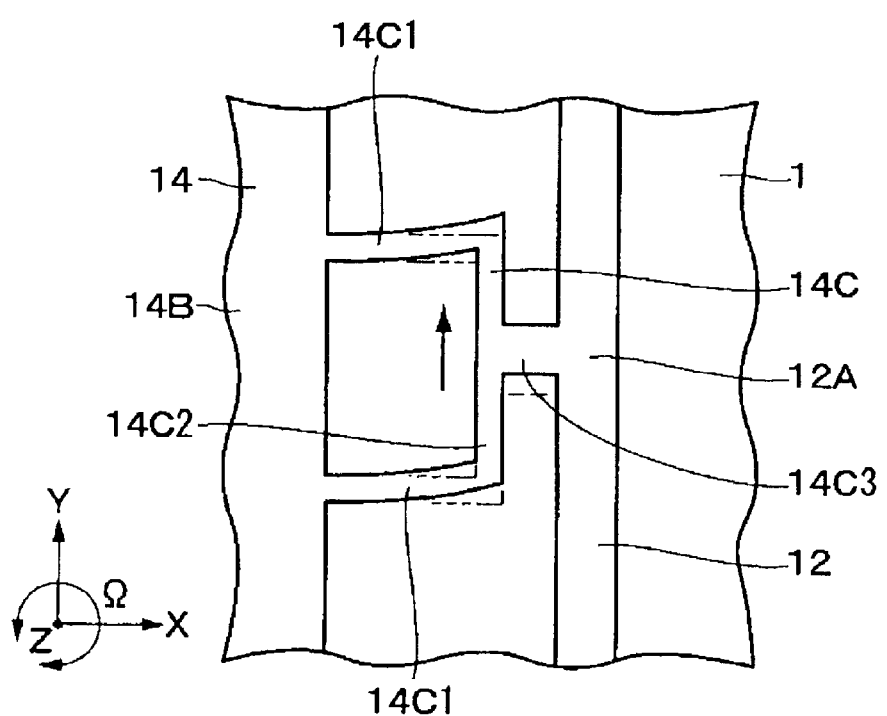
FIG. 10 is an enlarged view showing the manner in which an arm portion is deformed when the mass members move in the Y-axis direction due to acceleration.

As shown in FIGS. 8 and 10, which will be described in more detail below, when the mass members 2, 6, 10, and 11 move (vibrate) in the Y-axis direction due to disturbance such as an acceleration, the lateral beams 14C1 of the arm portions 14C are deflected in the Y-axis direction while retaining the mass members 2, 6, 10, and 11. Accordingly, the mass members 2, 6, 10, and 11 vibrate while they are elastically connected to each other by the arm portions 14C (coupled vibration). Therefore, vibration energies of the mass members 2, 6, 10, and 11 are transmitted between the mass members 2, 6, 10, and 11 due to the elastic force (spring force) of the arm portions 14C, and differences in vibration amplitude can be reduced relative to the acceleration.

Reference numeral 15 denotes four driving electrode retainers provided on the substrate 1 at positions outside the outer mass members 10 and 11, and reference numeral 16 denotes fixed driving electrodes which are retained by the driving electrode retainers 15. Each of the fixed driving electrodes 16 has a plurality of electrode fingers 16A which extend in the X-axis direction and which are arranged along the Y-axis direction in a comb-like pattern with gaps disposed therebetween.

Reference numeral 17 denotes four movable driving electrodes which project from the outer mass members 10 and 11 at positions corresponding to the driving electrode retainers 15. Each of the movable driving electrodes 17 has a plurality of electrode fingers 17A which interlock with the electrode fingers 16A of the corresponding fixed driving electrode 16 with gaps therebetween in the Y-axis direction.

Reference numeral 18 denotes four vibration generators 18 constructed of the four pairs of driving electrodes 16 and 17. When driving signals including a bias voltage and an alternating voltage is input to driving electrode pads 19 provided on the driving electrode retainers 15, each vibration generator 18 generates an electrostatic attractive force between the driving electrodes 16 and 17, and the outer mass members 10 and 11 vibrate in the directions shown by the arrows a1 and a2 in FIG. 1. Accordingly, all of the mass members 2, 6, 10, and 11 vibrate due to the outer retaining beams 12 such that the phase of the mass members 2 and 11 and the phase of the mass members 6 and 10 are opposite.

Reference numeral 20 denotes four detection electrode retainers which are provided on the substrate 1. Two of the four detection-electrode electrode retainers 20 are disposed at positions inside the horizontal vibrator 4 of the central mass member 2 at the left and right sides of the central frame member 4C. The electrode retainers 20 at the left and right sides of the central frame member 4C retain fixed detection electrodes 21 and 22 having comb-like electrode fingers 21A and 22A, respectively. In addition, the other two of the four electrode retainers 20 are disposed at positions inside the horizontal vibrator 8 of the central mass member 6 at the left and right sides of the central frame member 8C. The electrode retainers 20 at the left and right sides of the central frame member 8C retain fixed detection electrodes 23 and 24 having comb-like electrode fingers 23A and 24A, respectively.

Reference numerals 25 and 26 denote movable detection electrodes arranged such that they project inside the horizontal vibrator 4 at positions corresponding to the fixed detection electrodes 21 and 22, respectively, and reference numerals 27 and 28 denote movable detection electrodes arranged such that they project inside the horizontal vibrator 8 at positions corresponding to the fixed detection electrodes 23 and 24, respectively. The movable detection electrodes 25, 26, 27, and 28 include electrode fingers 25A, 26A, 27A, and 28A, respectively, which interlock with the electrode fingers 21A, 22A, 23A, and 24A of the fixed detection electrodes 21, 22, 23, and 24, respectively, with gaps therebetween in the Y-axis direction.

Reference numeral 29 denotes a first displacement detector which functions as an angular velocity detector along with displacement detectors 30, 31, and 32, which will be described below. The displacement detector 29 includes the fixed detection electrode 21 and the movable detection electrode 25 which define a plane-parallel capacitor, and detects the displacement of the horizontal vibrator 4 of the central mass member 2 on the basis of a capacitance change. In the displacement detector 29, the capacitance increases when the horizontal vibrator 4 moves along the Y axis in the direction shown by the arrow b1 in FIG. 1 and decreases when the horizontal vibrator 4 moves in the direction shown by the arrow b2.

Reference numeral 30 denotes a second displacement detector which detects the displacement of the horizontal vibrator 4. The displacement detector 30 includes the fixed detection electrode 22 and the movable detection electrode 26 which also define a capacitor. The detection electrodes 22 and 26 face each other in the Y-axis direction in the positional relationship opposite to that between the detection electrodes 21 and 25 of the first displacement detector 29. Therefore, in the displacement detector 30, the capacitance is set to increase and decrease in accordance with the displacement of the horizontal vibrator 4 in a manner opposite to the displacement detector 29. More specifically, the capacitance in the displacement detector 30 decreases when the horizontal vibrator 4 moves in the direction shown by the arrow b1 and increases when the horizontal vibrator 4 moves in the direction shown by the arrow b2.

Reference numeral 31 denotes a third displacement detector which detects the displacement of the horizontal vibrator 8 of the central mass member 6 on the basis of a capacitance change. The displacement detector 31 includes the fixed detection electrode 23 and the movable detection electrode 27, and the capacitance in the displacement detector 31 decreases when the horizontal vibrator 8 moves in the direction shown by the arrow b1 and increases when the horizontal vibrator 8 moves in the direction shown by the arrow b2.

Reference numeral 32 denotes a fourth displacement detector which detects the displacement of the horizontal vibrator 8. The displacement detector 32 includes the fixed detection electrode 24 and the movable detection electrode 28. The detection electrodes 24 and 28 face each other in the Y-axis direction in the positional relationship opposite to that between the detection electrodes 23 and 27 of the third displacement detector 31. Therefore, oppositely to the displacement detector 31, the capacitance in the displacement detector 32 increases when the horizontal vibrator 8 moves in the direction shown by the arrow b1 and decreases when the horizontal vibrator 8 moves in the direction shown by the arrow b2.

When an angular velocity $\Omega$ about the Z axis is applied to the substrate 1 while the mass members 2, 6, 10, and 11 are vibrating in the X-axis direction, the inner retaining beams 5 and 9 are deflected and the horizontal vibrators 4 and 8 move in the Y-axis direction by a distance corresponding to the amount of angular velocity $\Omega$. Accordingly, the displacement detectors 29, 30, 31, and 32 detect the displacements of the horizontal vibrators 4 and 8 on the basis of capacitance changes, and output detection signals to an external device via detection electrode pads 33, 34, 35, and 36 provided on the electrode retainers 20. In addition, the fixing member 14 is provided with two grounding electrode pads 37.

Reference numeral 38 denotes four monitor electrode units which are provided between the detection electrode retainers 20 and the horizontal vibrators 4 and 8 to function as a vibrational state monitor. The monitor electrode units 38 output alternating-current monitor signals corresponding to vibration frequencies, amplitudes, etc., of the horizontal vibrators 4 and 8 via the detection electrode pads 33 to 36. These monitor signals are used for, for example, monitoring the vibrational states of the central mass members 2 and 6, or as references for signal processing, such as synchronous detection, of angular-velocity detection signals.

The four monitor electrode units 38 are constructed such that the monitor electrode units 38 for the horizontal vibrator 4 and the monitor electrode units 38 for the horizontal vibrator 8 output monitor signals in the same phase when the horizontal vibrators 4 and 8 are vibrating in opposite phases. Accordingly, signals output to a differential amplifier 44 via detection electric wires 42 and 43, which will be described below, include the monitor signals in the same phase, so that the monitor signals are canceled by the differential amplifier 44. When the monitor signals are to be obtained, the signals from the detection electric wires 42 and 43 are added.

Figure 5:
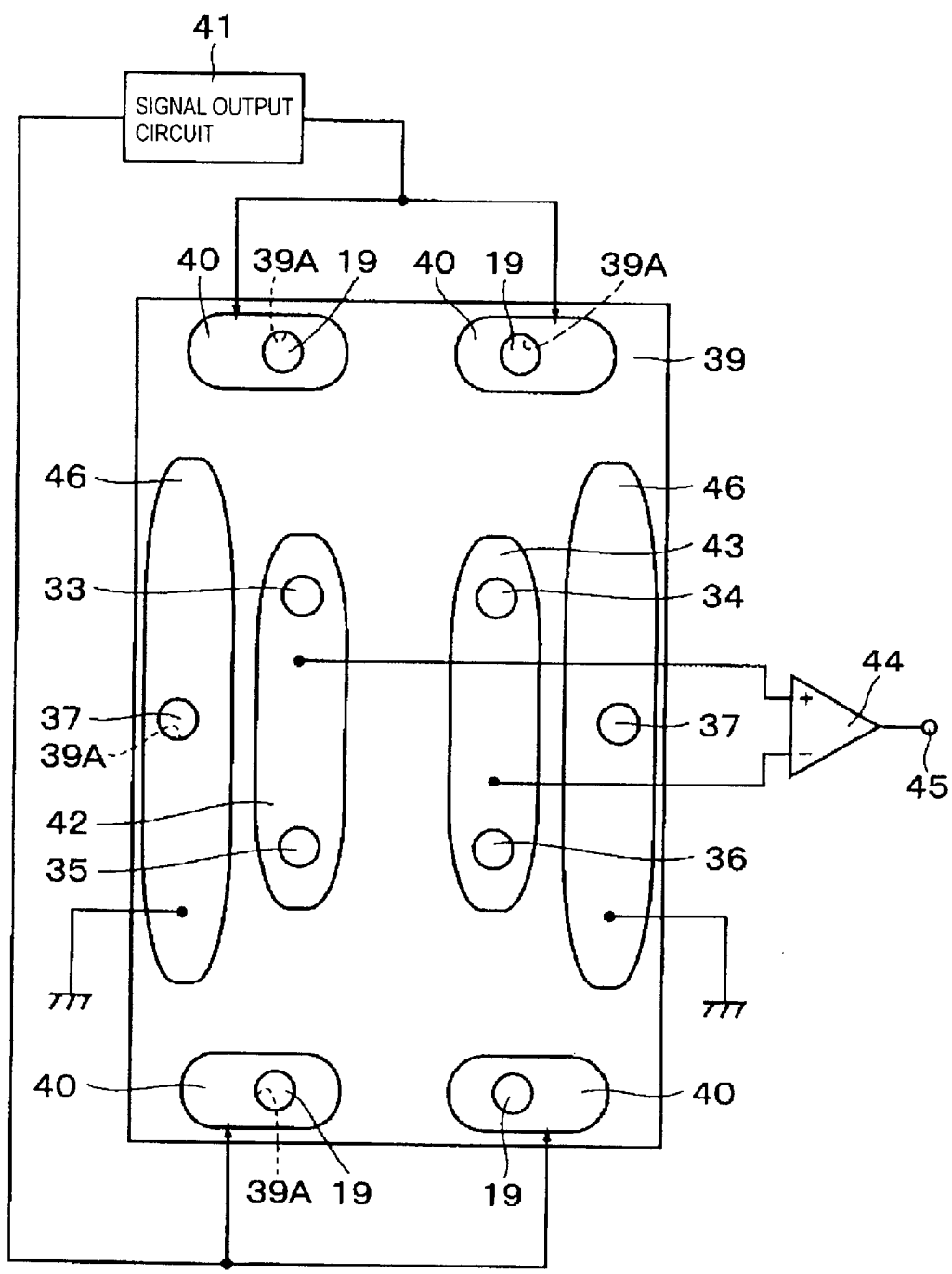
FIG. 5 is a circuit configuration diagram showing the driving electric wires, detection electric wires, and grounding electric wires disposed on a cover plate along with an external circuit.

Reference numeral 39 denotes a cover plate provided on the substrate 1. As shown in FIGS. 2 and 5, the cover plate 39 preferably has a substantially rectangular shape and is preferably composed of a silicon material having a high resistance, a glass material or other suitable material. The cover plate 39 is bonded to the base frame 14A of the fixing member 14 by anode coupling or by other means, so as to cover the mass members 2, 6, 10, and 11, the outer retaining beams 12, the fixing member 14, the vibration generators 18, the displacement detectors 29 to 32, and other elements. In addition, the cover plate 39 is provided with a plurality of through holes 39A for connecting the electrode pads 19 and 33 to 37 to the electric wires 40, 42, and 43, which will be described below.

Reference numeral 40 denotes four driving electric wires which are provided at four corners of the cover plate 39 at positions corresponding to the vibration generators 18. The driving electric wires 40 are defined as, for example, wiring patterns of a metal layer, and are connected to the driving electrode pads 19 via the through holes 39A in the cover plate 39. In addition, the driving electric wires 40 supply alternating-current driving signals from an external signal output circuit 41 to the vibration generators 18 via the driving electrode pads 19.

The detection electric wire 42 is disposed at the left side in the central region of the cover plate 39 at a position corresponding to the displacement detectors 29 and 31. The detection electric wire 42 connects the displacement detectors 29 and 31 in parallel to the differential amplifier 44, which will be described below, to output the sum of the capacitance changes in the displacement detectors 29 and 31 (displacements of the horizontal vibrators 4 and 8).

In addition, the detection electric wire 43 is disposed at the right side in the central region of the cover plate 39, and connects the displacement detectors 30 and 32 in parallel to the differential amplifier 44 to output the sum of the capacitance changes in the displacement detectors 30 and 32.

The detection signals output from the detection electric wires 42 and 43 are converted into voltages, and are input to the differential amplifier 44, which outputs the difference between the detection signals to an output terminal 45 as a detection signal corresponding to the angular velocity $\Omega$. The cover plate 39 is also provided with grounding electric wires 46 for connecting the movable driving electrodes 17 of the vibration generators 18 and the movable detection electrodes 25 to 28 of the displacement detectors 29 to 32 to the ground via the grounding electrode pads 37.

The angular velocity sensor according to a preferred embodiment of the present invention is constructed as described above. Next, the operation of the angular velocity sensor will be described below.

First, the signal output circuit 41 applies alternating-current driving signals to the vibration generators 18 at the left and right sides in opposite phases along with a bias voltage. Accordingly, an electrostatic attractive force is alternately generated between the fixed driving electrodes 16 and the movable driving electrodes 17 at the left and right, and the outer mass members 10 and 11 vibrate in the directions shown by the arrows a1 and a2 in FIG. 6. Since the driving signals applied to the outer mass members 10 and 11 are in opposite phases, the outer mass members 10 and 11 vibrate in phases that are different by 180°.

Then, the vibrations of the outer mass members 10 and 11 are transmitted to the central mass members 2 and 6 via the outer retaining beams 12, so that the mass members 2, 6, 10, and 11 vibrate such that the phase of the mass members 2 and 11 and the phase of the mass members 6 and 10 are opposite while the overall center of gravity G of the mass members 2, 6, 10, and 11 is maintained at an approximately constant position. At this time, the outer retaining beams 12 are deflected along with the longitudinal beams 14C2 (see FIG. 9) of the fixing member 14 in the X-axis direction to form a letter 'S' shape. Since the node portions 12A are positioned at vibration nodes and are maintained at approximately constant positions, the vibrations are prevented from being transmitted to the substrate 1 via the fixing member 14 which retains the outer retaining beams 12 at the node portions 12A.

Since the overall center of gravity G is maintained at an approximately constant position, the vibrations of the mass members 2, 6, 10, and 11 are more reliably prevented from being transmitted to the substrate 1, and the central mass members 2 and 6 can be vibrated in a stable vibrational state.

Since the central mass members 2 and 6 vibrate in opposite phases, a rotational moment about the center of gravity G is generated. However, according to preferred embodiments of the present embodiment, the mass M1 and the distance L1 from the overall center of gravity G of the central mass members 2 and 6 and the mass M2 and the distance L2 from the overall center of gravity G of the outer mass members 10 and 11 are set such that the rotational moment of the central mass members 2 and 6 and a rotational moment of the outer mass members 10 and 11 cancel each other. Accordingly, the rotational moments of the mass members 2, 6, 10, and 11 can be reliably prevented from being applied to the substrate 1 as an external force.

The rotational moments applied to the mass members 2, 6, 10, and 11 will be described in detail below. An inertial force Fa applied to the central mass members 2 and 6 while they are vibrating can be expressed as follows:

$$Fa = M1 \times A1 \times (2\pi f)^2 \qquad (1)$$

where A1 is the vibration amplitude in the X-axis direction, M1 is the mass, and f is the vibration frequency of the central mass members 2 and 6.

In addition, the rotational moment T1 of each of the central mass members 2 and 6 can be expressed by using the inertial force Fa according to Equation (1) and the distance L1 from the overall center of gravity G as follows:

$$T1 = Fa \times L1 = M1 \times A1 \times L1 \times (2\pi f)^2 \qquad (2)$$

Similarly, an inertial force Fb applied to the outer mass members 10 and 11 while they are vibrating can be expressed as follows:

$$Fb = M2 \times A2 \times (2\pi f)^2 \qquad (3)$$

where A2 is the vibration amplitude in the X-axis direction, M2 is the mass, and f is the vibration frequency of the outer mass members 10 and 11.

In addition, the rotational moment T2 applied to each of the outer mass members 10 and 11 can be expressed by using the inertial force Fb and the distance L2 from the overall center of gravity G as follows:

$$T2 = Fb \times L2 = M2 \times A2 \times L2 \times (2\pi f)^2 \qquad (4)$$

Since the overall rotational moment of the central mass members 2 and 6 (2×T1) and the overall rotational moment of the outer mass members 10 and 11 (2×T2) are applied in opposite directions, the following equation must be satisfied in order for the rotational moments to cancel each other:

$$T = 2 \times T1 - 2 \times T2 = 0 \qquad (5)$$

Therefore, T1=T2 must be satisfied, and the following equation is obtained by substituting the right sides of Equation (2) and Equation (4) in Equation (5):

$$M1 \times A1 \times L1 = M2 \times A2 \times L2 \qquad (6)$$

Since the distance L2 of the outer mass members 10 and 11 is larger than the distance L1 of the central mass members 2 and 6, Equation (6) can be satisfied by setting the mass M2 of the outer mass members 10 and 11 smaller than the mass M1 of the central mass members 2 and 6. Accordingly, the rotational moments T1 and T2 applied to the substrate 1 cancel each other.

Figure 7:
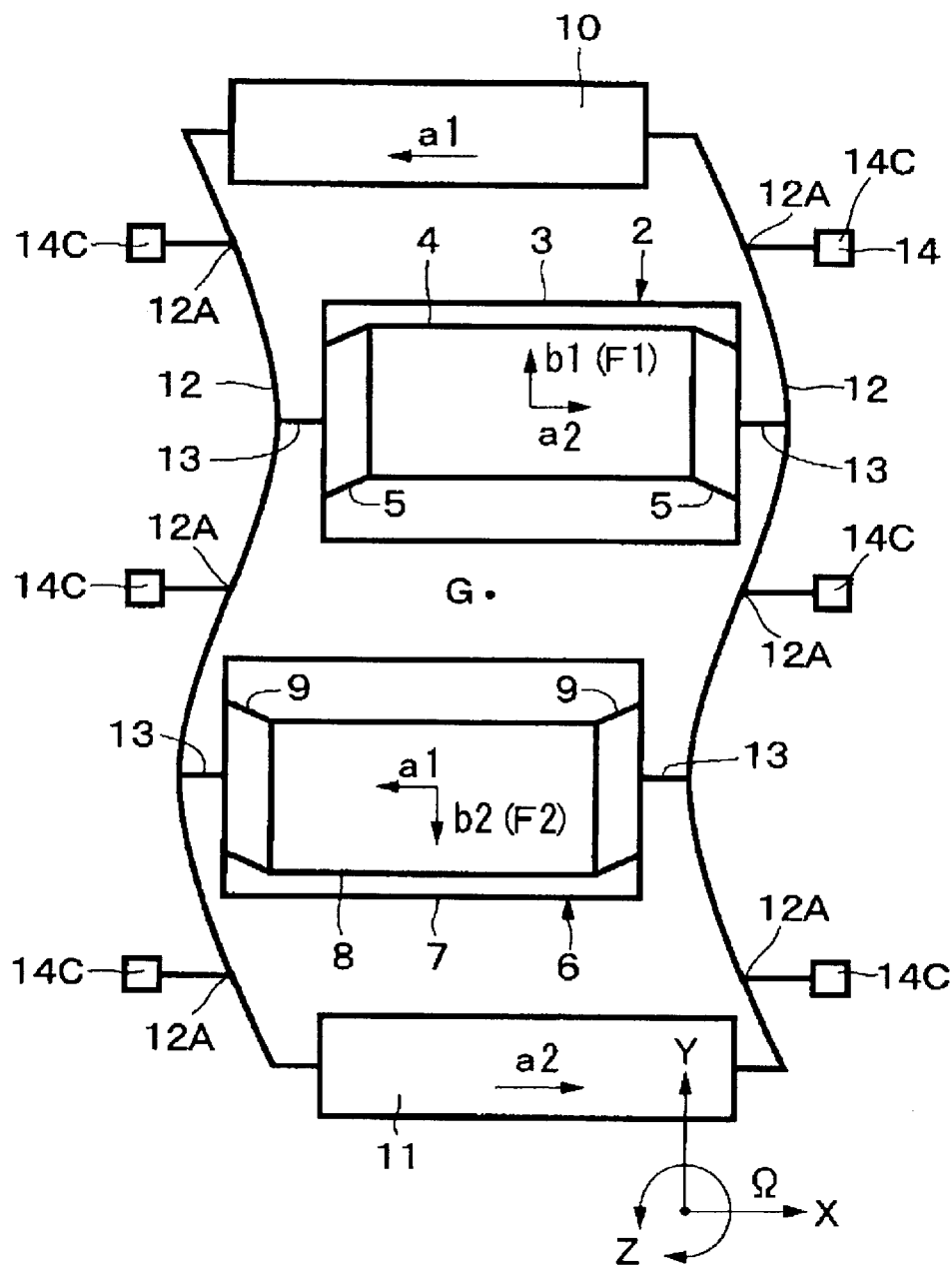
FIG. 7 is a schematic diagram showing the manner in which two central mass members move in the opposite directions due to an angular velocity.

Next, the operation of detecting an angular velocity will be described below. When an angular velocity Ω about the Z axis is applied to the substrate 1 while the mass members 2, 6, 10, and 11 are vibrating, the central mass member 2 receives a Coriolis force Fl, which is expressed as follows, in the Y-axis direction:

$$F1 = 2 \times M1 \times \Omega \times v \qquad (7)$$

where M1 is the mass of the central mass member 2, Ω is the angular velocity about the Z axis, and v is the velocity of the central mass member 2 in the X-axis direction. Accordingly, as shown in FIG. 7, for example, the inner retaining beams 5 are deflected and the central mass member 2 moves in the direction shown by the arrow b1 by the amount corresponding to the Coriolis force F1.

Since the central mass member 6 and the central mass member 2 vibrate in opposite phases (in opposite velocity directions), the central mass member 6 receives a Coriolis force F2 in a direction that is opposite to that of the Coriolis force applied to the central mass member 2, as is clear from Equation (7). Accordingly, the inner retaining beams 9 are deflected and the central mass member 6 moves in the direction shown by the arrow b2 by the amount corresponding to the Coriolis force F2.

Accordingly, the capacitances in the displacement detectors 29 and 31 increase, and the sum of the capacitance changes is output to the detection electric wire 42. In addition, the capacitances in the displacement detectors 30 and 32 decrease, and the sum of the capacitance changes is output to the detection electric wire 43. Then, the signals from the detection electric wires 42 and 43 are input to the differential amplifier 44, and the difference therebetween is output to the output terminal 45. The output signal is subjected to signal processing, such as synchronous detection, and the angular velocity Ω is thereby determined with high accuracy.

Next, a case is considered in which an acceleration is applied to the substrate 1 in the Y-axis direction. When, for example, the substrate 1 receives an acceleration in the direction shown by the arrow b1, the central mass members 2 and 6 move together in the direction shown by the arrow b1, as shown in FIG. 8. Therefore, the capacitances in the displacement detectors 29 and 32 increase and the capacitances in the displacement detectors 30 and 31 decrease. Therefore, the capacitance changes due to the acceleration in the displacement detectors 29 and 31 which are connected by the detection electric wire 42 cancel each other, and the capacitance changes due to the acceleration in the displacement detectors 30 and 32 which are connected by the detection electric wire 43 also cancel each other.

Since the shapes of the central mass members 2 and 6 are symmetrical about the overall center of gravity G, even when there are small dimensional errors or processing errors, the resonance frequencies of the horizontal vibrators 4 and 8 disposed inside the central mass members 2 and 6, respectively, are approximately the same.

Accordingly, when an acceleration is applied to the substrate 1 in the Y-axis direction due to external vibration, impact, etc., the horizontal vibrators 4 and 8 move in the Y-axis direction by approximately the same distance. Therefore, the capacitance changes caused by the acceleration cancel each other and are accurately eliminated, and vibrations and impacts applied to the substrate 1 can be reliably prevented from being falsely detected as the angular velocity.

When, for example, three mass members are arranged linearly and are vibrated such that two adjacent mass members are in opposite phases, the size of the mass member at the center must be larger than the size of the mass members at both sides thereof so that the overall center of gravity G of the three mass members does not move. Therefore, unless each mass member is processed with high precision, the resonance frequencies of the mass members will be different from each other due to small dimensional errors or processing errors. Accordingly, differences between the displacements of the mass members in the Y-axis direction due to external vibration, impact, etc., easily occur, and it is difficult to eliminate the influence of acceleration by canceling the displacements of the mass members.

However, according to preferred embodiments of the present embodiment, since the shapes of the four mass members 2, 6, 10, and 11 are symmetric about the overall center of gravity G, the pair of mass members 2 and 11 and the pair of mass members 6 and 10 can vibrate symmetrically in a stable vibrational state. In addition, even when there are small dimensional errors or processing errors, differences in resonance frequency caused by such errors can be compensated for due to their symmetrical shapes.

In addition, when the mass members 2, 6, 10, and 11 move (vibrate) in the Y-axis direction due to acceleration, etc., the lateral beams 14C1 of the arm portions 14C are deflected in the direction in accordance with the vibrational state, as shown in FIG. 10. Accordingly, the vibration energies of the mass members 2, 6, 10, and 11 are transmitted between the mass members 2, 6, 10, and 11 by the elastic force of the arm portions 14C and differences in vibration amplitude between the mass members 2, 6, 10, and 11 are reduced. Therefore, even when there are small dimensional errors or processing errors in the mass members 2, 6, 10, and 11 and the amplitudes thereof are different from each other, the influence of acceleration can be reliably eliminated between the horizontal vibrators 4 and 8.

Next, the case is considered in which the horizontal vibrators 4 and 8 are deformed due to the difference between thermal expansion of the substrate 1 and that of the horizontal vibrators 4 and 8. In this case, the fixed detection electrode 21 of the first displacement detector 29 slightly moves from its original position, and the distance between the fixed detection electrode 21 and the movable detection electrode 25 changes. As a result, the capacitance change between the fixed detection electrode 21 and the movable detection electrode 25 which occurs due to the displacement and the original capacitance in the displacement detector 29 vary, and the voltage output from the displacement detector 29 in correspondence with the angular velocity (sensitivity) varies along with temperature variation. Similarly, the voltages output from the second, third, and fourth displacement detectors 30, 31, and 32 in correspondence with the angular velocity (sensitivity) also vary along with temperature.

However, according to the present preferred embodiment, the fixed detection electrode 21 and the movable detection electrode 25 of the first displacement detector 29 face each other in the Y-axis direction in the positional relationship opposite to that between the fixed detection electrode 22 and the movable detection electrode 26 of the second displacement detector 30, and the fixed detection electrode 23 and the movable detection electrode 27 of the third displacement detector 31 face each other in the Y-axis direction in the positional relationship opposite to that between the fixed detection electrode 24 and the movable detection electrode 28 of the fourth displacement detector 32. Therefore, when the horizontal vibrators 4 and 8 expand due to heat, the distance between the detection electrodes increases in the first and the third displacement detectors 29 and 31 and decreases in the second and fourth displacement detectors 30 and 32. Accordingly, when such thermal expansion occurs, sensitivity decreases in the displacement detectors 29 and 31 and increases in the displacement detectors 30 and 32.

According to the present preferred embodiment, the sum of the signals obtained from the displacement detectors 29 and 31 is output via the detection electric wire 42 and the sum of the signals obtained from the displacement detectors 30 and 32 is output via the detection electric wire 43. In addition, the differential amplifier 44 outputs the difference between the signals input from the detection electric wires 42 and 43 from the output terminal 45. Accordingly, even when the sensitivities of the displacement detectors 29, 30, 31, and 32 vary due to thermal distortion, the variations in sensitivities cancel each other, so that the sensitivity of the output terminal 45 is not affected by the temperature variation and is maintained at a constant sensitivity.

In addition, according to the present preferred embodiment, the central mass member 2 is provided with two displacement detectors 29 and 30, and the central mass member 6 is provided with the two displacement detectors 31 and 32. The displacement detectors 29 and 31 are connected to each other with the detection electric wire 42 and the displacement detectors 30 and 32 are connected to each other with the detection electric wire 43. Accordingly, even when an acceleration is applied and large capacitance changes occur in the displacement detectors 29, 30, 31, and 32, each of the detection electric wires 42 and 43 receives a signal in which the capacitance changes in the central mass members 2 and 6 are canceled, so that the differential amplifier 44 can be prevented from receiving signals of excessively high levels. Therefore, the differential amplifier 44 can be operated in a normal operational range.

As described above, according to the present preferred embodiment, the four mass members, including the central mass members 2 and 6 and the outer mass members 10 and 11, are connected to each other by the outer retaining beams 12 such that they can move in the X-axis direction. Thus, the shapes of the mass members 2, 6, 10, and 11 can be made symmetric about the overall center of gravity G in the Y-axis direction. Therefore, when the angular velocity sensor is activated, the mass members 2, 6, 10, and 11 can reliably vibrate in the X-axis direction such that the phase of the mass members 2 and 11 and the phase of the mass members 6 and 10 are opposite in a stable vibrational state while the overall center of gravity G is maintained at an approximately constant position.

Accordingly, the vibrations of the mass members 2, 6, 10, and 11 can be reliably canceled at the node portions 12A of the outer retaining beams 12 and the node portions 12A can be fixed to the substrate 1 by the fixing member 14. Therefore, vibration energies of the mass members 2, 6, 10, and 11 can be prevented from being transmitted to the substrate 1 via the fixing member 14, and the mass members 2, 6, 10, and 11 can efficiently vibrate at a predetermined amplitude, vibration velocity, etc. In addition, vibration of the substrate 1 can be prevented and the angular velocity can be detected at stable accuracy.

In addition, since the overall center of gravity G of the mass members 2, 6, 10, and 11 can be maintained at an approximately constant position, the pair of mass portions 2 and 11 and the pair of mass portions 6 and 10 can vibrate with a good balance and reaction forces applied while the mass members 2, 6, 10, and 11 are vibrating reliably cancel each other. Therefore, the vibrations can be more reliably prevented from being transmitted to the substrate 1.

In addition, since the mass M2 of the outer mass members 10 and 11 is smaller than the mass M1 of the central mass members 2 and 6 such that the rotational moments T1 and T2 are approximately the same, the rotational moment Ti of the central mass members 2 and 6 and the rotational moment T2 of the outer mass members 10 and 11 cancel each other. Thus, the rotational moments T1 and T2 can be reliably prevented from being transmitted to the substrate 1 as an external force, and the detection accuracy can be further improved. In addition, since the rotational moments T1 and T2 are approximately the same, the Q-factor of the mass members 2, 6, 10, and 11 in the resonant condition can be increased and the mass members 2, 6, 10, and 11 can vibrate at large amplitudes. Accordingly, the detection sensitivity can be increased.

In addition, according to the present preferred embodiment, since the central mass members 2 and 6 are provided with the displacement detectors 29 to 32, the size of the central mass members 2 and 6 can be easily increased due to the movable detection electrodes 25 to 28 of the displacement detectors 29 to 32. Accordingly, the mass M1 of the central mass members 2 and 6 becomes larger than the mass M2 of the outer mass members 10 and 11, so that the rotational moments T1 and T2 can be easily set to approximately the same value. Thus, the rotational moments T1 and T2 cancel each other.

In addition, since the shapes of the mass members 2, 6, 10, and 11 are symmetric about the overall center of gravity G, differences in resonance frequency caused by small dimensional errors or processing errors can be compensated for by their symmetrical shapes. Accordingly, acceleration due to external vibration, impact, etc., can be reliably eliminated between the displacement detectors 29 and 31 and between the displacement detectors 30 and 32. Accordingly, the angular velocity can be accurately detected separately from the acceleration, and the performance and reliability of the sensor can be improved.

In addition, since the four mass members 2, 6, 10, and 11 are connected to each other by the outer retaining beams 12 having a linear shape, the vibrational state (vibration mode) of each mass member can be determined by the deflection of the outer retaining beams 12. Accordingly, even when there are small processing errors in the mass members 2, 6, 10, and 11, the two central mass members 2 and 6 can vibrate at approximately the same amplitude, and stable detection sensitivity can be obtained.

In addition, the fixing member 14 includes the arm portions 14C which can be deflected in the Y-axis direction while retaining the mass members 2, 6, 10, and 11. Accordingly, when the mass members 2, 6, 10, and 11 vibrate in the Y-axis direction due to an acceleration, the lateral beams 14C1 of the arm portions 14C can be deflected in the Y-axis direction in accordance with the vibrational state. Thus, the vibration energies can be transmitted between the mass members 2, 6, 10, and 11 by the elastic force of the arm portions 14C such that the differences in amplitude are reduced. Therefore, the differences in amplitude between the mass members 2, 6, 10, and 11 due to, for example, dimensional errors or processing errors, can be minimized relative to the acceleration and the influence of acceleration can be more reliably eliminated.

In addition, since the central mass member 2 includes the central frame 3 and the horizontal vibrator 4 and the central mass member 6 includes the central frame 7 and the horizontal vibrator 8, the central frames 3 and 7 prevents the deflection of the outer retaining beams 12 from being transmitted to the horizontal vibrators 4 and 8, respectively, as the displacements in the Y-axis direction. Therefore, the accuracy in detecting angular velocity can be further improved.

In addition, since the displacement detectors 29 and 31 are connected in parallel to the detection electric wire 42 and the displacement detectors 30 and 32 are connected in parallel to the detection electric wire 43, the displacements of the horizontal vibrators 4 and 8 (capacitance changes) due to the acceleration can be canceled by a simple structure by using the detection electric wires 42 and 43. Accordingly, it is not necessary to use, for example, an amplifier for adding the detection signals of the displacement detectors 30 and 32 for eliminating the acceleration component, etc., and a signal processing circuit or the like connected to the sensor can be made simpler. In addition, since the differential amplifier 44 can be prevented from receiving signals of excessively high levels, the differential amplifier 44 can be operated in a normal operational range.

In addition, since the differential amplifier 44 outputs the difference between the signals input from the detection electric wires 42 and 43 via the output terminal 45, even when the sensitivities of the displacement detectors 29, 30, 31, and 32 vary along with temperature, the variations in the sensitivities cancel each other, so that the sensitivity of the output terminal 45 can be stably maintained at a constant sensitivity.

Next, a second preferred embodiment of the present invention will be described below with reference to FIGS. 11 and 12. According to the second preferred embodiment, monitor electrode units are disposed at positions which are spaced from the detection electrodes. In the second preferred embodiment, components similar to those in the first preferred embodiment are denoted by the same reference numerals and explanations thereof are thus omitted.

Reference numeral 51 denotes a substrate preferably made of a silicon material having a high resistance, a glass material, or other suitable material. Central mass members 52 and 56, outer mass members 60 and 61, outer retaining beams 62, a fixing member 64, vibration generators 68, displacement detectors 75 and 76, monitor electrode units 80, etc., which will be described below, are disposed on the surface of the substrate 51 with, for example, a silicon material having a low resistance.

Figure 12:
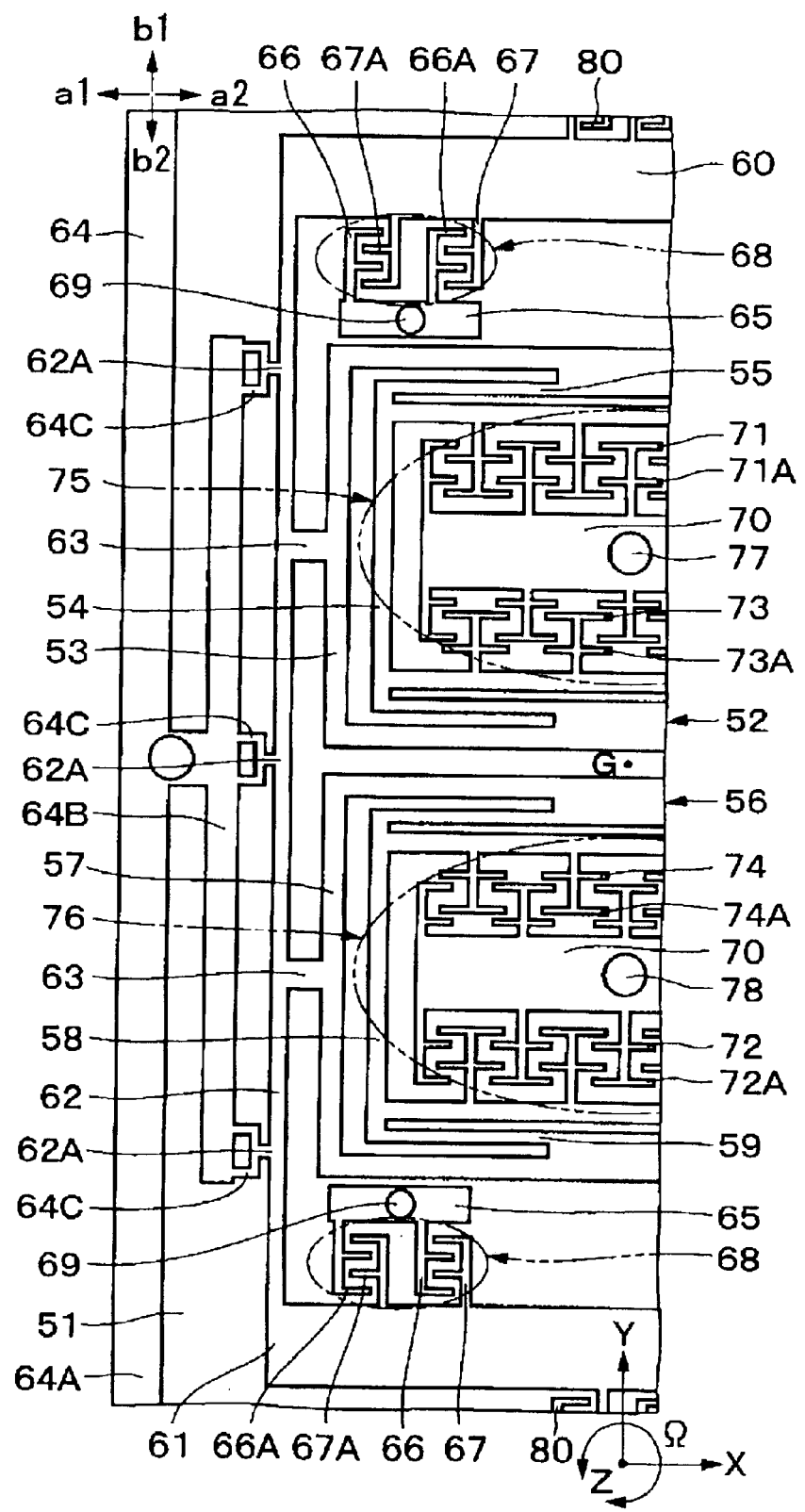
FIG. 12 is an enlarged plan view of a left side of the angular velocity shown in FIG. 11.

As shown in FIG. 12, similarly to the first preferred embodiment, the central mass member 52 is disposed at the central region of the substrate 51, and similarly to the first preferred embodiment, the central mass member 52 includes a substantially rectangular central frame 53, a horizontal vibrator 54 which is disposed inside the central frame 53, and, four inner retaining beams 55. The horizontal vibrator 54 preferably has a substantially rectangular frame shape and is retained by the inner retaining beams 55 such that the horizontal vibrator 54 can move in the Y-axis direction.

The central mass member 56 is constructed similarly to the central mass member 52, and includes a central frame 57, a horizontal vibrator 58, and inner retaining beams 59. The horizontal vibrator 58 is retained by the four inner retaining beams 59 such that the horizontal vibrator 58 can move in the Y-axis direction.

The two outer mass members 60 and 61 are disposed at positions outside the central mass members 52 and 56 in the Y-axis direction, and have a linear shape which extend in the X-axis direction. The outer mass members 60 and 61 are connected to the outer retaining beams 62 at both ends thereof.

Similarly to the first preferred embodiment, the four mass members 52, 56, 60, and 61 are arranged linearly in the Y-axis direction and are connected to each other by the outer retaining beams 62. In addition, the shapes of the mass members 52, 56, 60, and 61 are symmetrical in the Y-axis direction about the overall center of gravity G of the mass members 52, 56, 60, and 61. The mass members 52, 56, 60, and 61 vibrate in the X-axis direction such that the phase of the mass members 52 and 61 and the phase of the mass members 56 and 60 are opposite while the overall center of gravity G is maintained at an approximately constant position.

The outer retaining beams 62 at the left and right sides retain the four mass members 52, 56, 60, and 61 such that they can vibrate in the X-axis direction. Each of the outer retaining beams 62 is connected to the central frames 53 and 57 of the central mass members 52 and 56, respectively, by connecting members 63 at intermediate positions along the longitudinal direction of the outer retaining beam 62. When the mass members 52, 56, 60, and 61 vibrate such that the phase of the mass members 52 and 61 and the phase of the mass members 56 and 60 are opposite to each other, each of the outer retaining beams 62 is deflected in the X-axis direction to a letter 'S' shape. In addition, each of the outer retaining beams 62 has three node portions 62A at intermediate positions along the longitudinal direction of the outer retaining beam 62, the node portions 62A corresponding to vibration nodes and being maintained at approximately constant positions.

The fixing member 64 provided on the substrate 51 includes a substantially rectangular base frame 64A which is fixed on the substrate 51, extending portions 64B which are disposed inside the base frame 64A at the left and the right sides and which extend in the Y-axis direction, and arm portions 64C which are provided on the extending portions 64B and which are connected to the node portions 62A of the outer retaining beams 62. Accordingly, when the mass members 52, 56, 60, and 61 vibrate such that the phase of the mass members 52 and 61 and the phase of the mass members 56 and 60 are opposite, the vibrations are prevented from being transmitted to the substrate 51.

Reference numeral 65 denotes four driving electrode retainers which are provided on the substrate 51 at positions between the central mass member 52 and the outer mass member 60 and at positions between the central mass member 56 and the outer mass member 61, and reference numeral 66 denotes fixed driving electrodes which are retained by the driving electrode retainers 65. The fixed driving electrodes 66 have electrode fingers 66A which interlock with electrode fingers 67A of movable driving electrodes 67, which project from the outer mass members 60 and 61, with gaps therebetween in the Y-axis direction.

Reference numeral 68 denotes four vibration generators constructed of four pairs of the driving electrodes 66 and 67.

Figure 11:
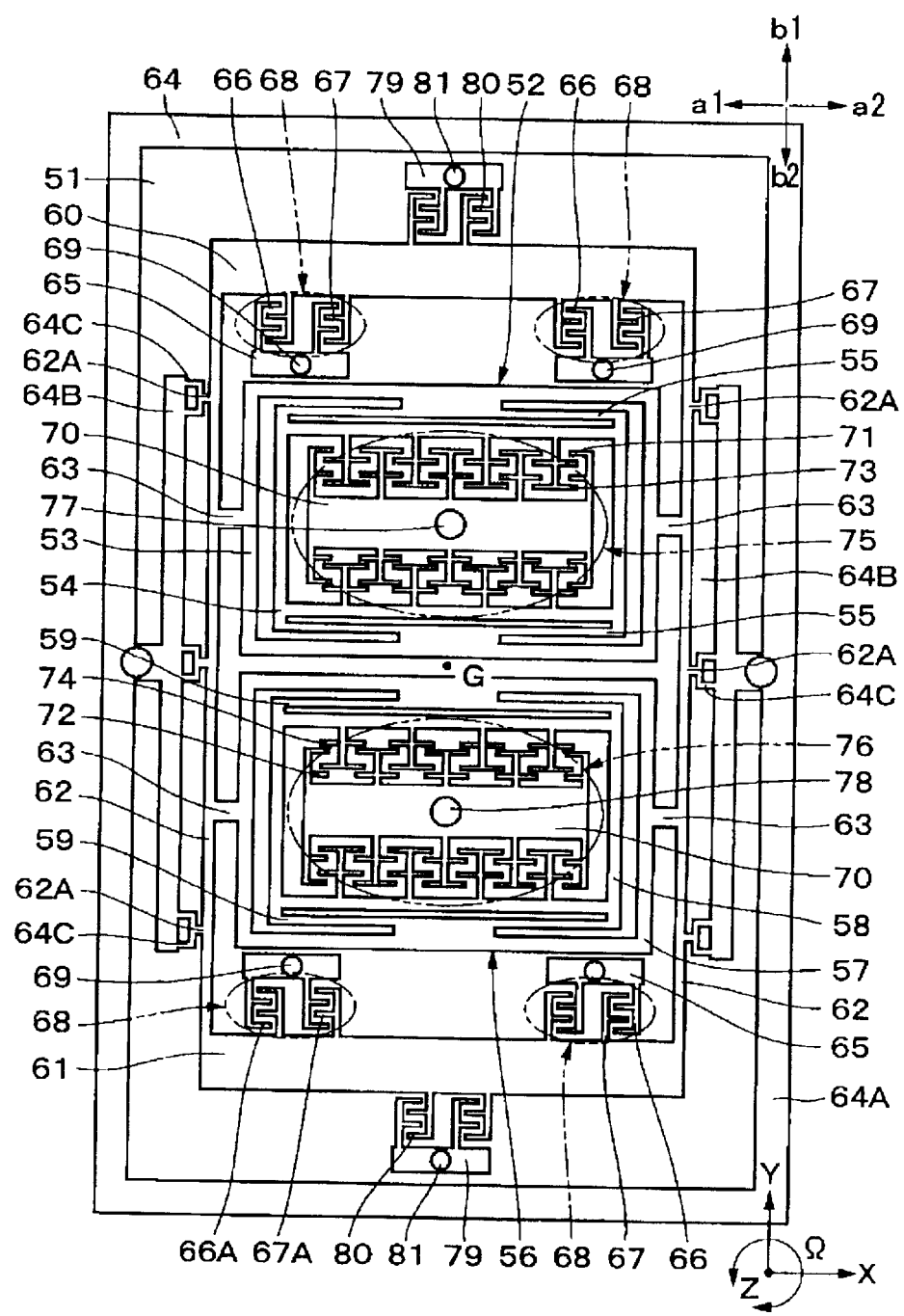
FIG. 11 is a plan view showing an angular velocity sensor according to a second preferred embodiment of the present invention.

When alternating-current driving signals are input to driving electrode pads 69 provided on the driving electrode retainers 65 along with a bias voltage, the vibration generators 68 vibrate the outer mass members 60 and 61 in the directions shown by the arrows a1 and a2 in FIG. 11 by an electrostatic attractive force.

Reference numeral 70 denotes two detection electrode retainers which are provided on the substrate 51 at positions inside the horizontal vibrators 54 and 58. One of the electrode retainers 70 disposed at the upper side in FIG. 11 retains a fixed detection electrode 71 having comb-like electrode fingers 71A, and the other one of the electrode retainers 70 retains a fixed detection electrode 72 having comb-like electrode fingers 72A.

Reference numerals 73 and 74 denote movable detection electrodes which are arranged such that they project inside the horizontal vibrators 54 and 58, respectively. The movable detection electrodes 73 and 74 include electrode fingers 73A and 74A which interlock with the electrode fingers 71A and 72A of the fixed detection electrodes 71 and 72, respectively, with gaps therebetween in the Y-axis direction.

Reference numeral 75 denotes a displacement detector which functions as an angular velocity detector for detecting the displacement of the horizontal vibrator 54 as an angular velocity on the basis of a capacitance change. The displacement detector 75 includes the fixed detection electrode 71 and the movable detection electrode 73. In the displacement detector 75, the capacitance increases when the horizontal vibrator 54 moves along the Y axis in the direction shown by the arrow b1 in FIG. 11 and decreases when the horizontal vibrator 54 moves in the direction shown by the arrow b2.

Reference numeral 76 denotes a displacement detector which functions as an angular velocity detector for detecting the displacement of the horizontal vibrator 58. The displacement detector 76 includes the fixed detection electrode 72 and the movable detection electrode 74. Oppositely to the displacement detector 75, the capacitance in the displacement detector 76 decreases when the horizontal vibrator 58 moves in the direction shown by the arrow b1 and increases when the horizontal vibrator 58 moves in the direction shown by the arrow b2.

When an angular velocity Ω about the Z axis is applied to the substrate 51 while the mass members 52, 56, 60, and 61 are vibrating in the X-axis direction, the horizontal vibrators 54 and 58 move in the opposite directions along the Y axis due to the Coriolis force. Accordingly, the displacement detectors 75, and 76 detect the displacements of the horizontal vibrators 54 and 58, respectively, on the basis of the capacitance changes, and outputs detection signals to an external device via detection electrode pads 77 and 78 provided on the electrode retainers 70. Since the movable detection electrodes 73 and 74 moves toward/away from the fixed detection electrodes 71 and 72, respectively, together at the same time, the capacitances in the displacement detectors 75 and 76 increase or decrease together in the same phase. Thus, the angular velocity Ω can be accurately detected by adding the detection signals obtained from the displacement detectors 75 and 76.

When an acceleration is applied to the substrate 51 in the Y-axis direction, the horizontal vibrators 54 and 58 move in the same direction along the Y axis, so that one of the capacitances in the displacement detectors 75 and 76 increases and the other one decreases. Accordingly, by adding the detection signals obtained via the detection electrode pads 77 and 78, the capacitances changes in the displacement detectors 75 and 76 due to the acceleration can be canceled and the angular velocity can be detected separately from the acceleration. However, since the sensitivities of the displacement detectors 75 and 76 increase or decrease together when thermal distortion occurs, the variations in sensitivities cannot cancel each other as in the first preferred embodiment.

Reference numeral 79 denotes two monitor electrode retainers which are provided on the substrate 51 at the front and back of the outer mass members 60 and 61. Each of the monitor electrode retainers 79 is provided with a monitor electrode unit 80 and a monitor electrode pad 81, which will be described below.

One of the monitor electrode units 80 is disposed between one of the monitor electrode retainers 79 and the mass member 60, and the other one of the monitor electrode units 80 is disposed between the other one of the monitor electrode retainers 79 and the mass member 61. The monitor electrode units 80 function as a vibrational state monitor. Similarly to the first preferred embodiment, the monitor electrode units 80 output alternating-current monitor signals corresponding to vibration frequencies, amplitudes, etc., of the outer mass members 60 and 61 via the monitor electrode pads 81. These monitor signals are used for, for example, monitoring the vibrational states of the central mass members 52 and 56, or as references for signal processing, such as synchronous detection, of angular-velocity detection signals.

Accordingly, operational effects similar to those obtained in the first preferred embodiment can also be obtained in the second preferred embodiment. In addition, in the second preferred embodiment, since the monitor electrode units 80 are disposed at positions spaced from the displacement detectors 75 and 76, the detection electrode pads 77 and 78 can be formed separately from the monitor electrode pads 81. Accordingly, the monitor signals and the detection signals can be output separately with high accuracy, and there is more freedom in designing the sensor.

In addition, in the present preferred embodiment, when an angular velocity about the Z axis is applied, the capacitances in the displacement detectors 75 and 76 increase or decrease together. Accordingly, when an acceleration is applied in the Y axis, one of the capacitances in the displacement detectors 75 and 76 increases and the other one decreases. Since the detection signals obtained via the detection electrode pads 77 and 78 are added in order to cancel the capacitance changes due to the acceleration, the detection electrode pads 77 and 78 can be directly connected to each other by using, for example, an electric wire. Since a signal in which the capacitance changes due to the acceleration are canceled is output to the electric wire, the signal level can be prevented from becoming excessively high even when a large acceleration is applied. Therefore, when the signal obtained via the electric wire is input to an amplifier, the amplifier can always be operated in a normal operation range.

Figure 13:
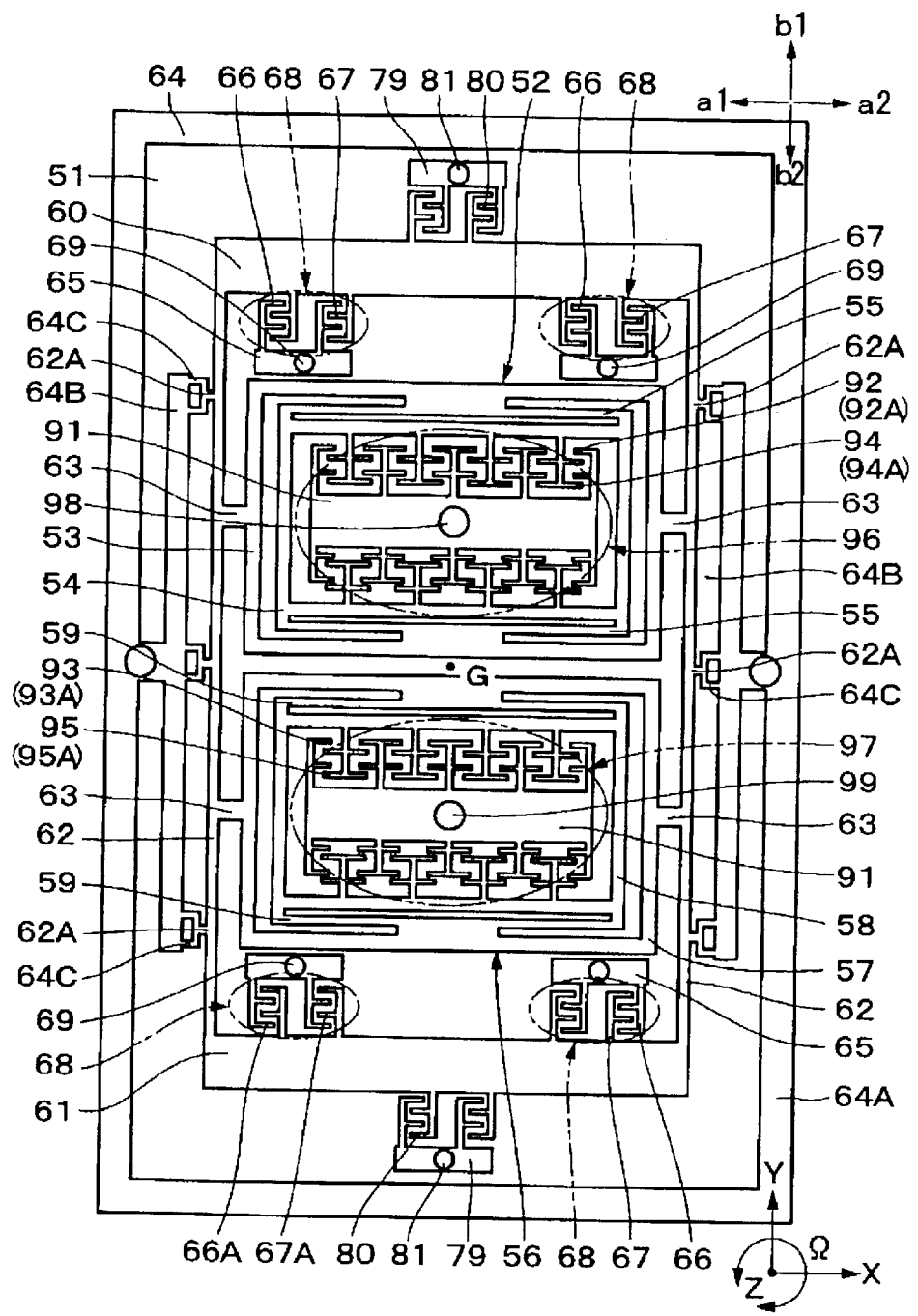
FIG. 13 is a plan view showing an angular velocity sensor according to a third preferred embodiment of the present invention.
Figure 14:
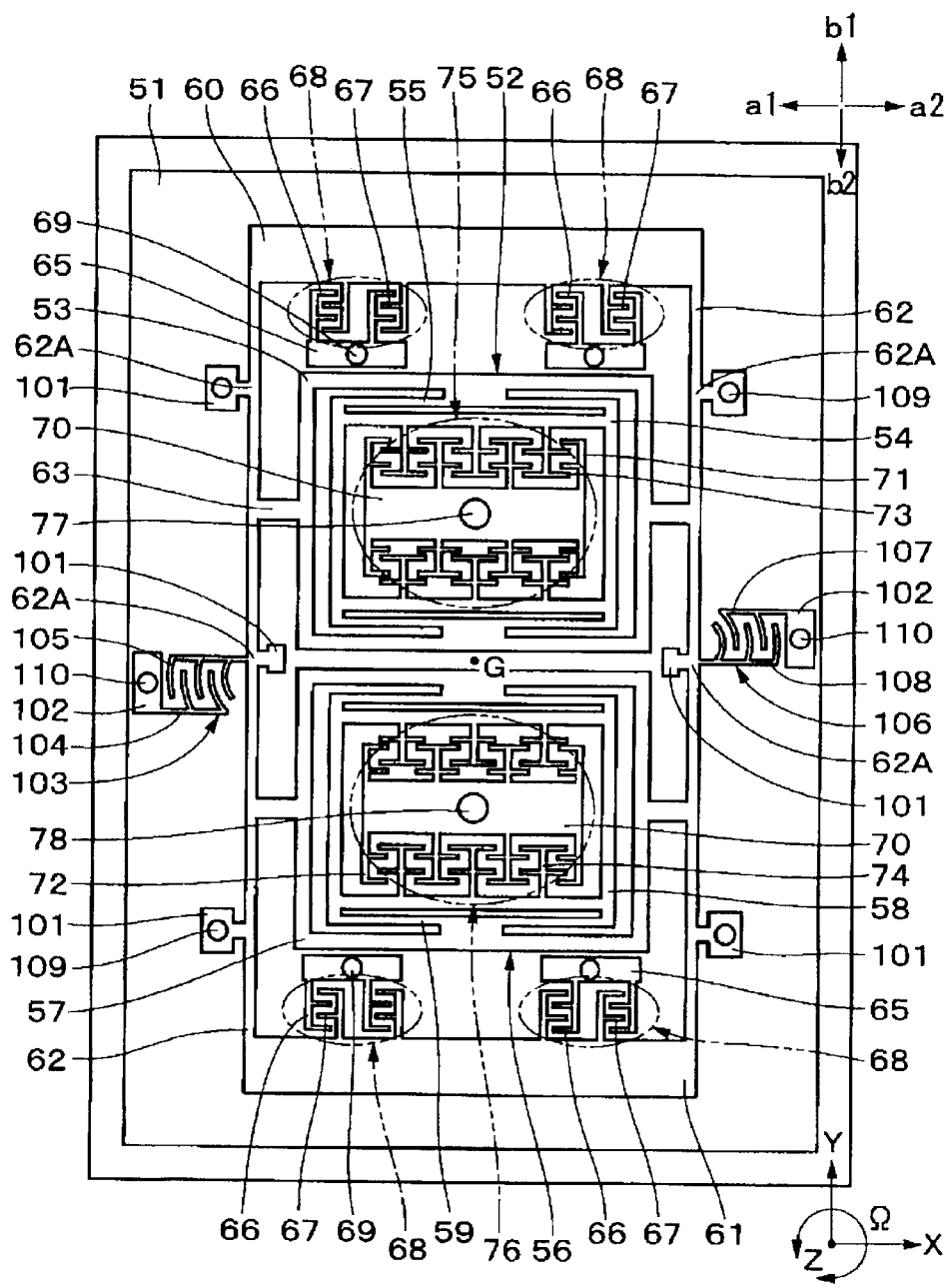
FIG. 14 is a plan view showing an angular velocity sensor according to a fourth preferred embodiment of the present invention.

Next, a third preferred embodiment of the present invention will be described below with reference to FIG. 13. According to the third preferred embodiment, when an angular velocity about the Z axis is applied, capacitance increases in one of two displacement detectors and decreases in the other one of the two displacement detectors. In the third preferred embodiment, components similar to those in the second preferred embodiment are denoted by the same reference numerals and explanations thereof are thus omitted.

Reference numeral 91 denotes two detection electrode retainers which are provided on the substrate 51 at positions inside the horizontal vibrators 54 and 58. One of the electrode retainers 91 disposed at the upper side in FIG. 13 retains a fixed detection electrode 92 having comb-like electrode fingers 92A, and the other one of the electrode retainers 91 retains a fixed detection electrode 93 having comb-like electrode fingers 93A.

Reference numerals 94 and 95 denote movable detection electrodes which are arranged such that they project inside the horizontal vibrators 54 and 58, respectively. The movable detection electrodes 94 and 95 include electrode fingers 94A and 95A which interlock with the electrode fingers 92A and 93A of the fixed detection electrodes 92 and 93, respectively, with gaps therebetween in the Y-axis direction.

Reference numeral 96 denotes a displacement detector which functions as an angular velocity detector for detecting the displacement of the horizontal vibrator 54 as an angular velocity on the basis of a capacitance change. The displacement detector 96 includes the fixed detection electrode 92 and the movable detection electrode 94. In the displacement detector 96, the capacitance increases when the horizontal vibrator 54 moves along the Y axis in the direction shown by the arrow b1 in FIG. 13 and decreases when the horizontal vibrator 54 moves in the direction shown by the arrow b2.

Reference numeral 97 denotes a displacement detector which functions as an angular velocity detector for detecting the displacement of the horizontal vibrator 58. The displacement detector 97 includes the fixed detection electrode 93 and the movable detection electrode 95. Similarly to the displacement detector 96, the capacitance in the displacement detector 97 increases when the horizontal vibrator 58 moves in the direction shown by the arrow b1 and decreases when the horizontal vibrator 58 moves in the direction shown by the arrow b2.

When an angular velocity $\Omega$ about the Z axis is applied to the substrate 51 while the mass members 52, 56, 60, and 61 are vibrating in the X-axis direction, the horizontal vibrators 54 and 58 move in the opposite directions along the Y axis due to the Coriolis force. Accordingly, the displacement detectors 96 and 97 detect the displacements of the horizontal vibrators 54 and 58, respectively, on the basis of the capacitance changes, and outputs detection signals to an external device via detection electrode pads 98 and 99 provided on the electrode retainers 91. Since the movable detection electrode 94 moves toward the fixed detection electrode 92 while the movable detection electrode 95 moves away from the fixed detection electrode 93 or the movable detection electrode 95 moves toward the fixed detection electrode 93 while the movable detection electrode 94 moves away from the fixed detection electrode 92, the capacitances in the displacement detectors 96 and 97 change in opposite phases. Thus, the angular velocity $\Omega$ can be accurately detected by obtaining the difference (differential amplification) between the detection signals obtained from the displacement detectors 96 and 97.

When an acceleration is applied to the substrate 51 in the Y-axis direction, the horizontal vibrators 54 and 58 move in the same direction along the Y axis, so that the capacitances in the displacement detectors 96 and 97 increase or decrease together in the same phase. Accordingly, by obtaining the difference between the detection signals obtained via the detection electrode pads 98 and 99, the capacitances changes in the displacement detectors 96 and 97 due to the acceleration can be canceled and the angular velocity can be detected separately from the acceleration.

Accordingly, operational effects similar to those obtained in the first preferred embodiment can also be obtained in the third preferred embodiment. In addition, in the present preferred embodiment, when an angular velocity about the Z axis is applied, one of the capacitances in the displacement detectors 96 and 97 increases and the other one decreases. Accordingly, when an acceleration is applied in the Y axis direction, the capacitances in the displacement detectors 96 and 97 increase and decrease together. Therefore, by obtaining the difference between the detection signals obtained from the detection electrode pads 98 and 99, the capacitances changes due to the acceleration can cancel each other.

In addition, when the distance between the fixed detection electrode 92 and the movable detection electrode 94 and the distance between he fixed detection electrode 93 and the movable detection electrode 95 change due to thermal distortion, sensitivity increases in one of the displacement detectors 96 and 97 and decreases in the other one of the displacement detectors 96 and 97. Since the difference between the detection signals obtained via the detection electrode pads 98 and 99 is obtained in order to cancel the capacitance changes due to the acceleration, the variations in sensitivities due to thermal distortion can also be canceled.

Next, a fourth preferred embodiment of the present invention will be described below with reference to FIGS. 14 to 17. According to the fourth preferred embodiment, monitor electrode units are disposed between the substrate and the node portions of the outer retaining beams. In the fourth preferred embodiment, components similar to those in the second preferred embodiment are denoted by the same reference numerals and explanations thereof are thus omitted.

Reference numeral 101 denotes a plurality of fixing members arranged such that they project from the surface of the substrate 51. The fixing members 101 are arranged at predetermined intervals along the longitudinal direction of the outer retaining beams 62, and the protruding ends of the fixing members 101 are connected to the node portions 62A of the outer retaining beams 62. Accordingly, the fixing members 101 retain the outer retaining beams 62 at the node portions 62A such that the outer retaining beams 62 can be deflected in the X-axis direction, and thereby function to prevent the vibrations of the mass members 52, 56, 60, and 61 from being transmitted to the substrate 51.

In addition, the fixing members 101 fix the node portions 62A of the outer retaining beams 62 to the substrate 51 at constant positions, so as to prevent the node portions 62A from moving in the X and Y-axis directions which are parallel to the substrate 51 and in the Z-axis direction which is perpendicular to the substrate 51.

Reference numeral 102 denotes two monitor electrode retainers which are provided on the substrate 51 at positions outside the outer retaining beams 62 at the left and right sides.

Figure 15:
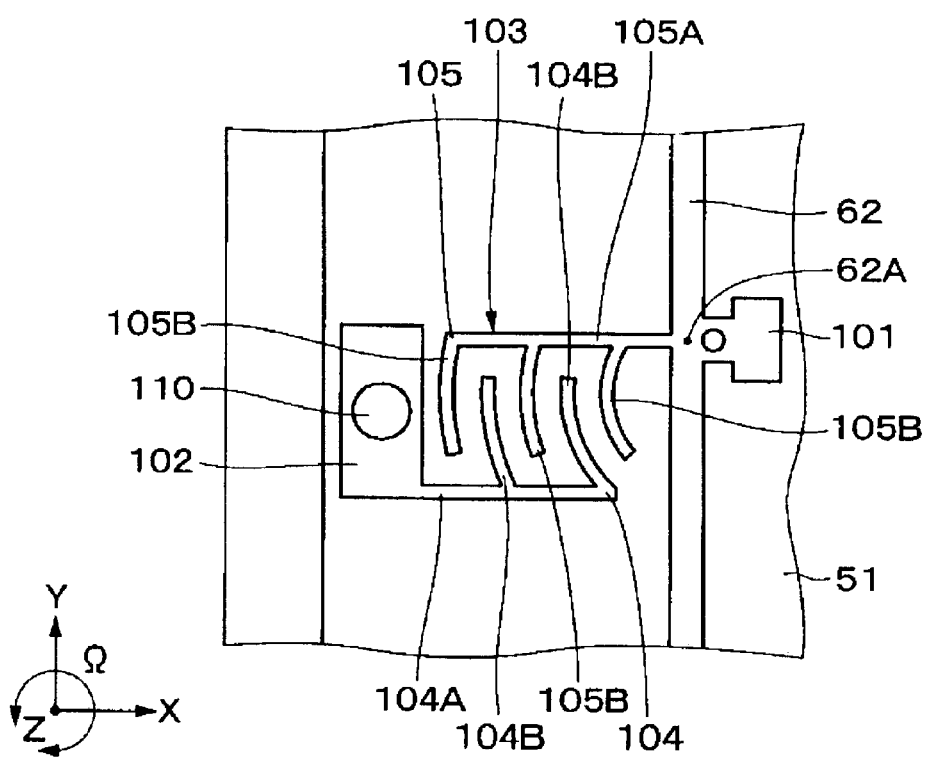
FIG. 15 is an enlarged view showing a monitor electrode unit at the left side in FIG. 14.

Reference numeral 103 denotes a monitor electrode unit which functions as a vibrational state monitor and which is disposed, for example, at a position between the substrate 51 and the outer retaining beam 62 at the left side. As shown in FIG. 15, the monitor electrode unit 103 includes a fixed monitor electrode 104 and a movable monitor electrode 105, which will be described below. The monitor electrode unit 103 detects and monitors the vibrational state (for example, the amplitude in the X-axis direction) of the mass members 52, 56, 60, and 61, on the basis of a capacitance change between the monitor electrodes 104 and 105, and outputs monitor signals to an external signal output circuit (not shown).

The fixed monitor electrode 104 is retained by the monitor electrode retainer 102 at the left side, and includes an arm portion 104A which projects from the monitor electrode retainer 102 toward the outer retaining beam 62 and a plurality of electrode fingers 104B which are arranged along the 104A in a comb-like pattern. More specifically, the electrode fingers 104B extend approximately in the Y-axis direction with gaps therebetween in the X-axis direction. In addition, as shown in FIG. 15, each of the electrode fingers 104B preferably has an arc shaped configuration that is centered at the node portion 62A of the outer retaining beam 62.

The movable monitor electrode 105 is provided on the outer retaining beam 62 at the left side, and includes an arm portion 105A which projects outward in the X-axis direction from the node portion 62A located at the center in the longitudinal direction of the outer retaining beam 62 and a plurality of electrode fingers 105B which are arranged along the arm portion 105A in a comb-like pattern.

The arm portion 105A is rigidly fixed to the node portion 62A so that it moves together with the outer retaining beam 62. In addition, similarly to the electrode fingers 104B of the fixed monitor electrode 104, the electrode fingers 105B also extend approximately in the Y-axis direction with gaps therebetween in the X-axis direction, and have an arc shape centered at the node portion 62A located at the center in the longitudinal direction of the outer retaining beam 62. The electrode fingers 104B and the electrode fingers 105B interlock with each other with gaps therebetween in the radial direction.

In the monitor electrode unit 103, when the mass members 52, 56, 60, and 61 vibrate and the outer retaining beams 62 are deflected in the X-axis direction, the electrode fingers 105B of the movable monitor electrode 105 rotate around the node portion 62A (center O) of the outer retaining beam 62 at the left side in a plane parallel to the substrate 51. Accordingly, the opposing area between the electrode fingers 104B and the electrode fingers 105B in the radial direction (capacitance) changes in accordance with the amplitude, etc., of the mass members 52, 56, 60, and 61. Since the electrode fingers 104B and 105B have an arc shape, they can move relative to each other without coming into contact with each other. The capacitance between the electrode fingers 104B and 105B changes proportionally (linearly) in accordance with the amount of rotation of the electrode fingers 105B.

Figure 16:
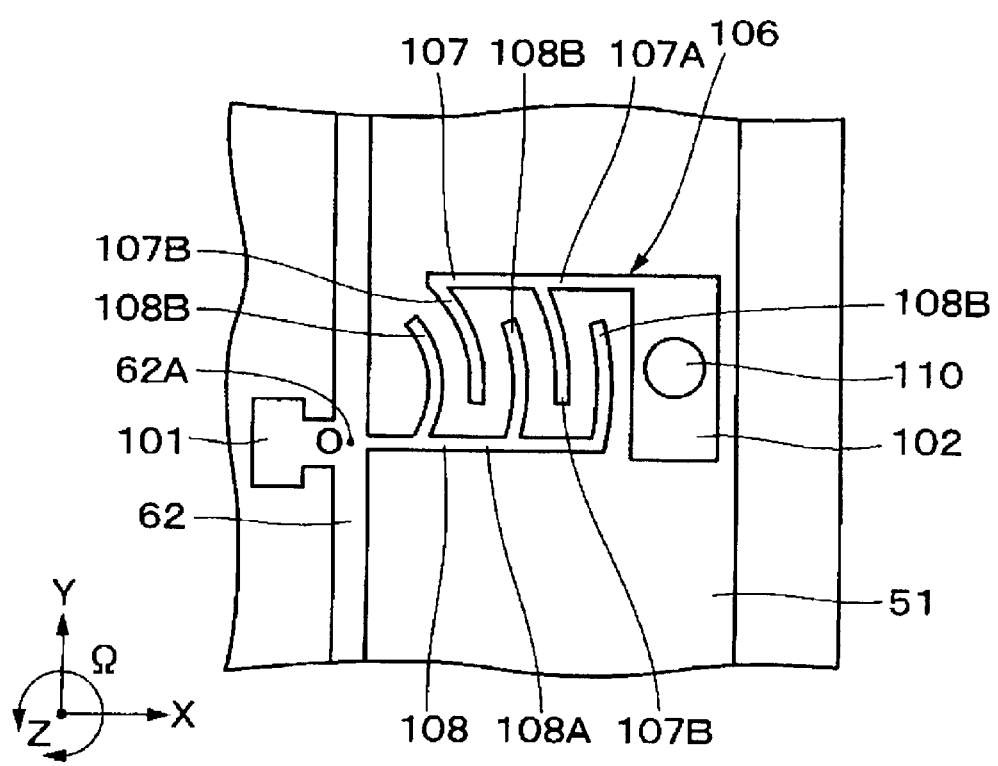
FIG. 16 is an enlarged view showing a monitor electrode unit at the right side in FIG. 14.

Reference numeral 106 denotes a monitor electrode unit which functions as another vibrational state monitor and which is disposed, for example, at a position between the substrate 51 and the outer retaining beam 62 at the right side. As shown in FIG. 16, similarly to the monitor electrode unit 103 disposed at the left side, the monitor electrode unit 106 includes a fixed monitor electrode 107 which is retained by the monitor electrode retainer 102 at the right side and which has an arm portion 107A and a plurality of electrode fingers 107B, and a movable monitor electrode 108 which is provided on the node portion 62A of the outer retaining beam 62 at the right side and which has an arm portion 108A and a plurality of electrode fingers 108B.

The monitor electrode units 103 and 106 detect the capacitance changes between, for example, grounding electrode pads 109 provided on the fixing members 101 and monitor electrode pads 110 provided on the monitor electrode retainers 102 at the left and right sides.

The monitor electrode units 103 and 106 are disposed at positions outside the mass members 52, 56, 60, and 61, which are arranged linearly, and the outer retaining beams 62 in the X-axis direction. When the outer retaining beams 62 are deflected, the capacitances in the monitor electrode units 103 and 106 increase and decrease together in the same phase.

The angular velocity sensor according to the fourth preferred embodiment has the above-described construction.

Next, the operation of the monitor electrode units 103 and 106 will be described below.

First, an external signal output circuit applies alternating-current driving signals to the vibration generators 68 at the left and right sides in opposite phases along with a bias voltage. Accordingly, similarly to the second preferred embodiment, the mass members 52, 56, 60, and 61 vibrate in the X-axis direction such that the phase of the mass members 52 and 61 and the phase of the mass members 56 and 60 are opposite. Then, when an angular velocity Ω about the Z axis is applied, the horizontal vibrators 54 and 58 move in the Y-axis direction in accordance with the angular velocity Ω applied, and the displacements of the horizontal vibrators 54 and 58 are detected by the displacement detectors 75 and 76 as the angular velocity Ω.

Figure 17:
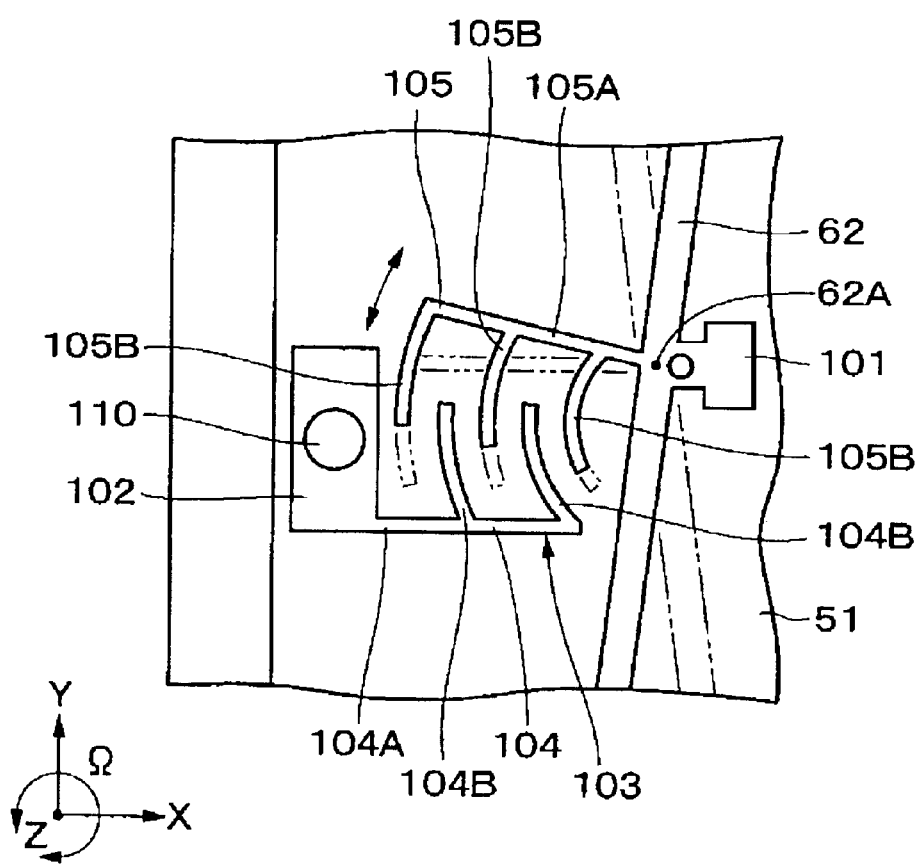
FIG. 17 is an enlarged plan view showing the manner in which a movable monitor electrode unit rotates around a node of a retaining beams when the mass members are vibrated.

At this time, as shown in FIG. 17, each of the outer retaining beams 62 is deflected in the X-axis direction as the mass members 52, 56, 60, and 61 vibrate, and a portion of the outer retaining beam 62 close to the node portion 62A swings around the node portion 62A in the X-axis direction. As a result, each of the movable monitor electrodes 105 and 108 of the monitor electrode units 103 and 106, respectively, rotates together with the corresponding outer retaining beam 62 around the center O in a horizontal plane, and a capacitance change occurs between the electrode 104 and 105 and between the electrodes 107 and 108. Accordingly, the monitor electrode units 103 and 106 output the monitor signals corresponding to the vibrational state of the mass members 52, 56, 60, and 61 to the signal output circuit.

Accordingly, an automatic gain control (AGC) circuit included in, for example, the signal output circuit, feedback controls the voltage, etc., of the driving signals applied to the vibration generators 68 such that state of the monitor signals are maintained constant. Therefore, even when, for example, natural frequencies, Q-factors, etc., of the mass members 52, 56, 60, and 61 vary along with the environmental temperature, the mass members 52, 56, 60, and 61 can be vibrated at a constant amplitude. Accordingly, the angular velocity Ω can be detected with stable detection accuracy.

In this case, the inertial masses of the movable monitor electrodes 105 and 108 of the monitor electrode units 103 and 106, respectively, are considerably small compared to those of the mass members 52, 56, 60, and 61. In addition, the movable monitor electrodes 105 and 108 are rigidly fixed to the node portions 62A of the outer retaining beams 62, and are fixed to the substrate 51 by the node portions 62A and the fixing members 101.

Accordingly, even when an acceleration is applied to the substrate 51 by external vibration, impact, etc., the movable monitor electrodes 105 and 108 can be prevented from being accidentally moved due to the acceleration, and accurate monitor signals can be output in correspondence with the capacitance between the monitor electrodes 104 and 105 and that between the monitor electrodes 107 and 108. In addition, the movable monitor electrode 105 can be prevented from moving toward/away from the substrate 51 due to the acceleration in the Z-axis direction.

Accordingly, operational effects similar to those obtained in the first preferred embodiment can also be obtained in the fourth preferred embodiment. In addition, in the fourth preferred embodiment, since the movable monitor electrodes 105 and 108 of the monitor electrode units 103 and 106 are provided on the node portions 62A of the outer retaining beams 62, the monitor electrode units 103 and 106 function accurately even when an external force is applied. Accordingly the amplitudes, etc., of the mass members 52, 56, 60, and 61 can be reliably feedback-controlled by using the monitor signals. Therefore, even when there is temperature variation or when an external force is applied, the angular velocity can be detected with high accuracy, and reliability of the angular velocity sensor can be further improved.

In addition, since the monitor electrode unit 103 detects the capacitance change between the fixed monitor electrode 104 and the movable monitor electrode 105 and the monitor electrode unit 106 detects the capacitance change between the fixed monitor electrode 107 and the movable monitor electrode 108, the vibrational state of the mass members 52, 56, 60, and 61 can be accurately detected with a simple, non-contact structure.

In addition, since the comb-like electrode fingers 104B and 105B of the monitor electrode unit 103 interlock with each other and the comb-like electrode fingers 107B and 108B of the monitor electrode unit 106 interlock with each other, even when the size of the electrodes 104, 105, 107, and 108 is reduced, a large opposing area can be obtained between the electrodes 104 and 105 and between the electrodes 107 and 108. Accordingly, the size of the monitor electrode units 103 and 106 can be reduced without reducing the detection accuracy.

In addition, since the electrode fingers 104B, 105B, 107B, and 108B have arc shaped configurations which are centered at the node portions 62A of the outer retaining beams 62, they can move without contacting each other when the movable monitor electrodes 105 and 108 rotate. In addition, the opposing area between the electrodes 104B and 105B changes linearly in accordance with the amount of rotation (rotational angle) of the movable monitor electrode 105 and the opposing area between the electrodes 107B and 108B changes linearly in accordance with the amount of rotation (rotational angle) of the movable monitor electrode 108. Accordingly, the capacitance between the electrodes 104B and 105B increases and decreases linearly in accordance with the rotational angle of the movable monitor electrode 105, and the capacitance between the electrodes 107B and 108B increases and decreases linearly in accordance with the rotational angle of the movable monitor electrode 108. Therefore, the vibrational state of the mass members 52, 56, 60, and 61 can be easily detected even when the monitor electrode units 103 and 106 are provided on the node portions 62A of the outer retaining beams 62.

In addition, since the monitor electrode units 103 and 106 are disposed at the left and right sides of the outer retaining beams 62, when the outer retaining beams 62 are deflected, the capacitances in the monitor electrode units 103 and 106 can be increased and decreased together in the same phase. By adding the monitor signals by a signal processing circuit, etc., the accuracy of the monitor signals can be further increased.

Figure 18:
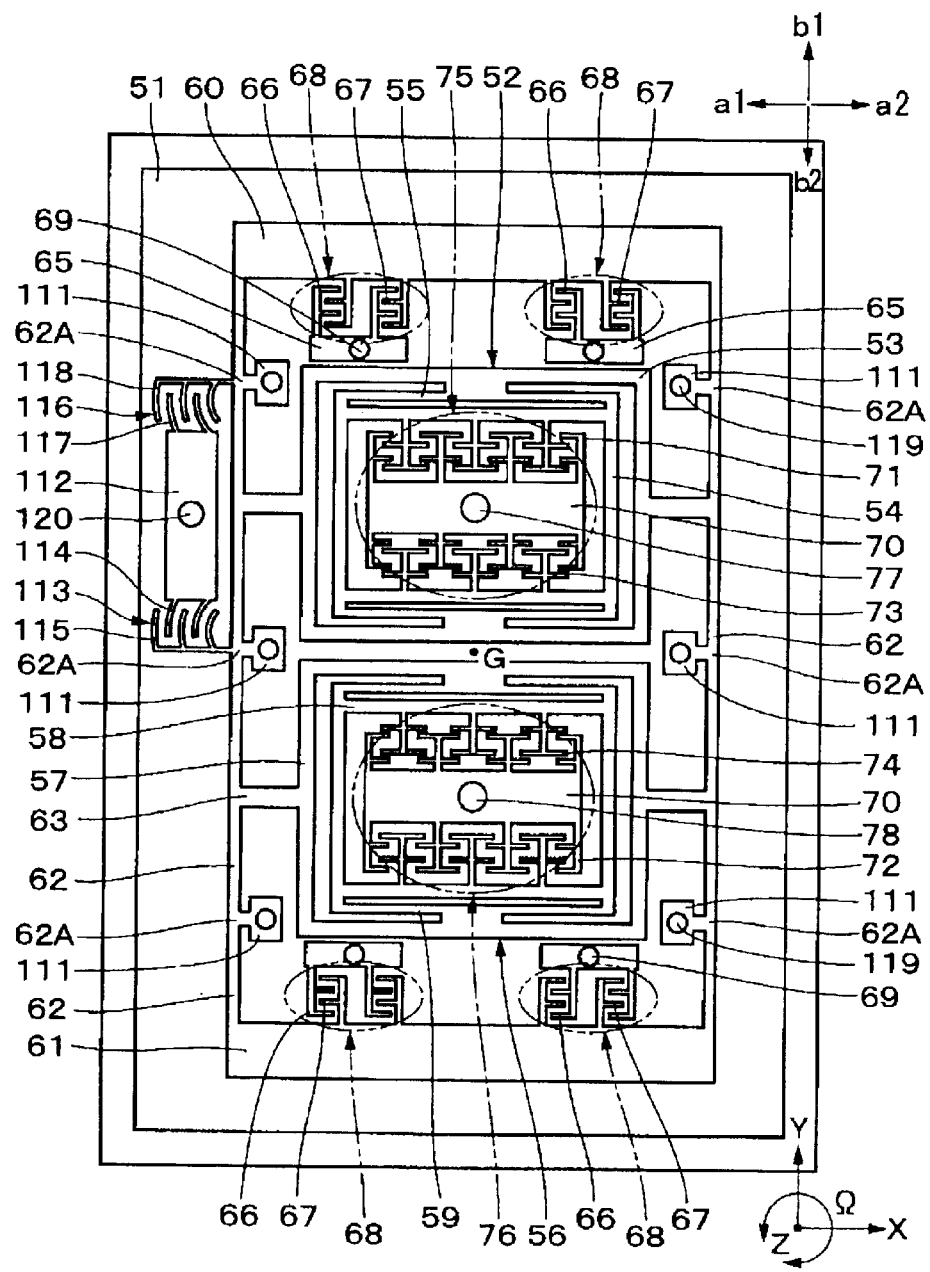
FIG. 18 is a plan view showing an angular velocity sensor according to a fifth preferred embodiment.
Figure 19:
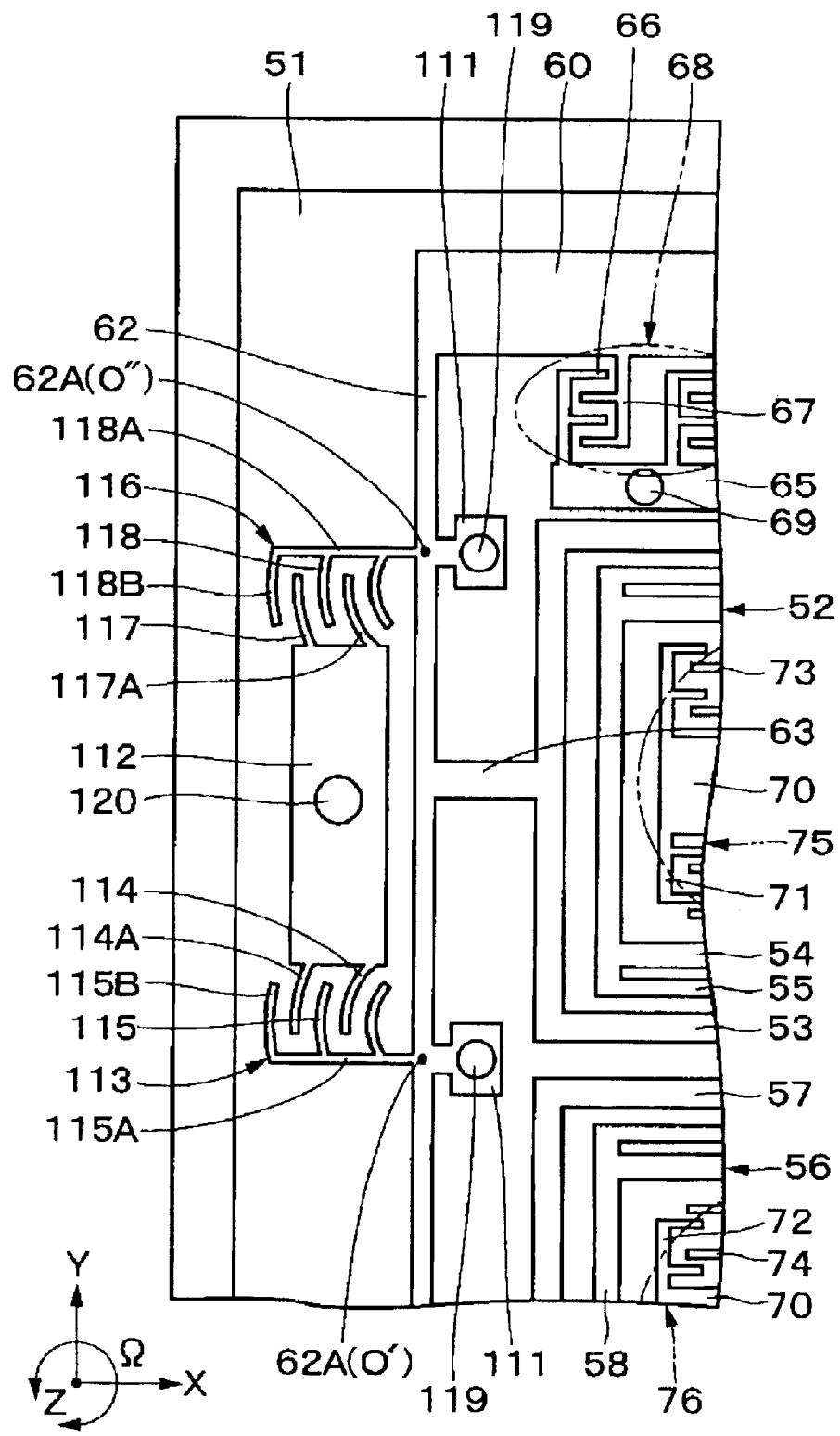
FIG. 19 is an enlarged view of FIG. 18 showing a portion including a monitor electrode unit.

Next, a fifth preferred embodiment of the present invention will be described below with reference to FIGS. 18 and 19. According to the fifth preferred embodiment, monitor electrode units are provided on two adjacent node portions of one of the outer retaining beams. In the fifth preferred embodiment, components similar to those in the second preferred embodiment are denoted by the same reference numerals and explanations thereof are thus omitted.

Reference numeral 111 denotes a plurality of fixing members each of which projects from the surface of the substrate 51. Similarly to the fourth preferred embodiment, the fixing members 111 are arranged at predetermined intervals along the longitudinal direction of the outer retaining beams 62. In addition, the fixing members 111 retain the outer retaining beams 62 at the node portions 62A, where the vibrations are not easily transmitted to the substrate 51, such that the outer retaining beams 62 can be deflected in the X-axis direction, and function to prevent the node portions 62A from moving in the X-axis and Y-axis directions which are parallel to the substrate 51, and in the Z-axis direction which is perpendicular to the substrate 51.

Reference numeral 112 denotes a monitor electrode retainer which is provided on the substrate 51 at, for example, a position close to the outer retaining beam 62 at the left side.

Reference numeral 113 denotes a monitor electrode unit which functions as a vibrational state monitor and which is disposed at a position between the substrate 51 and the outer retaining beam 62. As shown in FIG. 19, similarly to the fourth preferred embodiment, the monitor electrode unit 113 includes a fixed monitor electrode 114 which is provided on the monitor electrode retainer 112 and which has a plurality of electrode fingers 114A, and a movable monitor electrode 115 which is rigidly fixed to the node portion 62A located at the center in the longitudinal direction of the outer retaining beam 62 and which has an arm portion 115A and a plurality of electrode fingers 115B.

The electrode fingers 114A and 115B have an arc shaped configuration that is centered at the node portion 62A (center O') at the center in the longitudinal direction of the outer retaining beam 62, and interlock with each other with gaps therebetween in the radial direction.

Reference numeral 116 denotes a monitor electrode unit which functions as another vibrational state monitor and which is also disposed at a position between the substrate 51 and the outer retaining beam 62. Similarly to the monitor electrode unit 113, the monitor electrode unit 116 includes a fixed monitor electrode 117 which is provided on the monitor electrode retainer 112 and which has a plurality of electrode fingers 117A, and a movable monitor electrode 118 which is rigidly fixed to the node portion 62A placed near the end of the outer retaining beam 62 and which has an arm portion 118A and a plurality of electrode fingers 118B. The electrode fingers 117A and 118B have an arc shaped configuration that is centered at the node portion 62A (center O") which is located near the end of the outer retaining beam 62, and interlock with each other with gaps therebetween in the radial direction.

When the mass members 52, 56, 60, and 61 vibrate and the outer retaining beams 62 are deflected in the X-axis direction, the movable monitor electrode 115 rotates around the node portion 62A (center O') at the center in the longitudinal direction of the outer retaining beam 62 in a plane parallel to the substrate 51, and the movable monitor electrode 118 rotates around the node portion 62A (center O") placed near the end. Accordingly, the capacitances in the monitor electrode units 113 and 116 change, and the capacitance changes between grounding electrode pads 119 provided on the fixing members 111 and a monitor electrode pad 120 provided on the monitor electrode retainer 112.

The monitor electrode units 113 and 116 are disposed at two adjacent node portions 62A of one of the retaining beams 62, and when this outer retaining beam 62 is deflected, the capacitances in the monitor electrode units 113 and 116 increase and decrease together in the same phase. In addition, since the monitor electrode units 113 and 116 are connected to each other by the monitor electrode retainer 112, the electrode pads 119 and 120 output the sum of the monitor signals 113 and 116.

Accordingly, operational effects similar to those obtained in the first and third preferred embodiments can also be obtained in the fifth preferred embodiment. In addition, in the fifth preferred embodiment, since the monitor electrode units 113 and 116 are disposed at two adjacent node portions 62A of one of the retaining beams 62, both of the monitor electrode units 113 and 116 can be retained by the monitor electrode retainer 112, and the monitor electrode units 113 and 116 can be connected to each other by the monitor electrode retainer 112.

Accordingly, the sum of the monitor signals can be obtained without connecting the monitor electrode units 113 and 116 with external wires, etc. Therefore, high-accuracy monitor signals can be obtained with a simple structure, and the structure of the monitor electrode retainer 112 and the electrode pad 120 can be made simpler.

Next, a sixth preferred embodiment of the present invention will be described below with reference to FIGS. 20 to 24. According to the sixth preferred embodiment, angular velocities about two axes are individually detected by the angular velocity sensor. In the sixth preferred embodiment, components similar to those in the second preferred embodiment are denoted by the same reference numerals and explanations thereof are thus omitted.

Reference numeral 121 denotes a substrate of the angular velocity sensor. Similarly to the second preferred embodiment, the substrate 121 extends along the X and Y axes and is perpendicular to the Z axis. In addition, according to the sixth preferred embodiment, the angular velocity sensor detects an angular velocity $\Omega 1$ about the Z axis by using central mass members 122 and 126, and detects an angular velocity $\Omega 2$ about the Y axis by using outer mass members 130 and 134.

Figure 20:
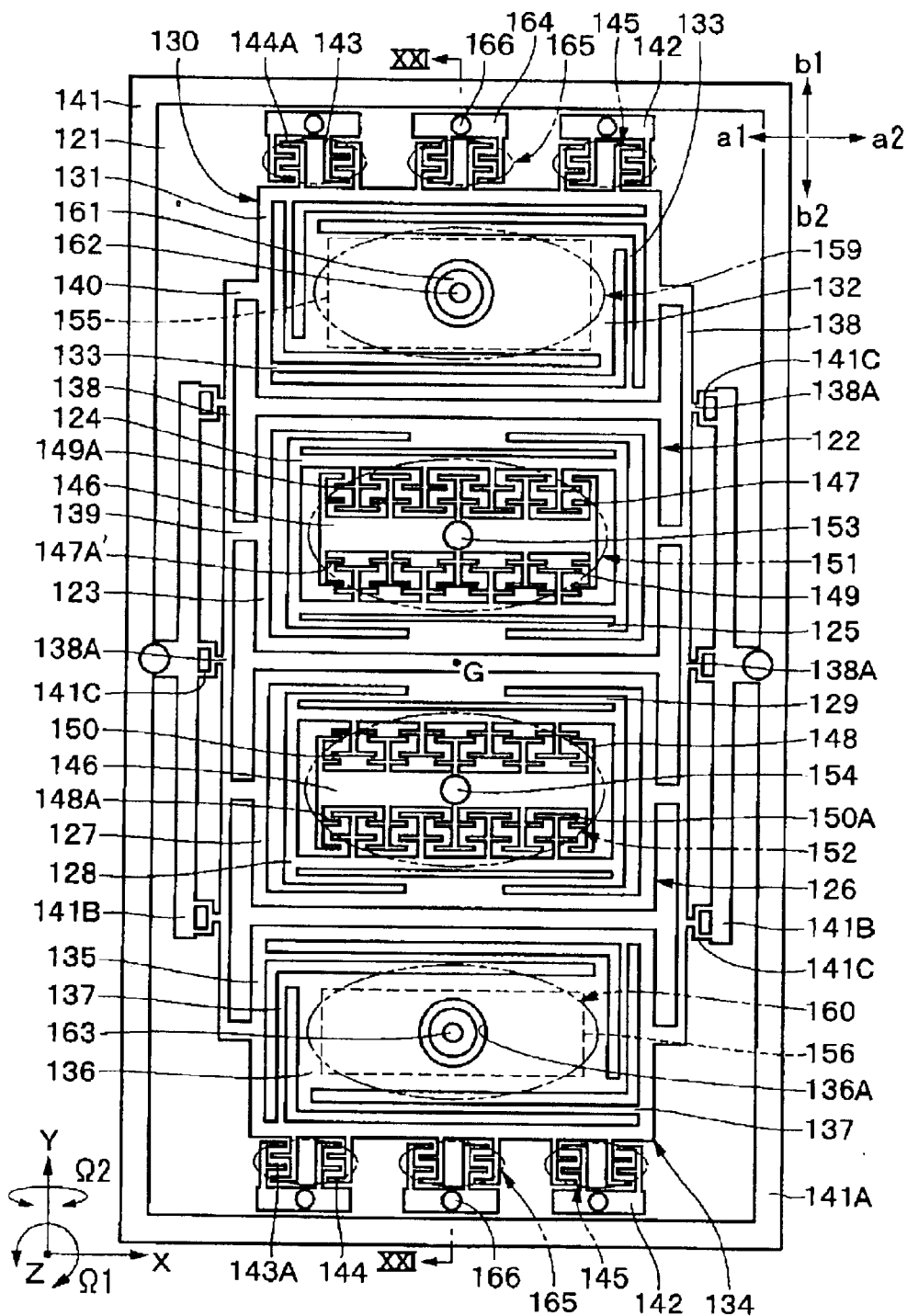
FIG. 20 is a plan view showing an angular velocity sensor according to a sixth preferred embodiment of the present invention.
Figure 21:
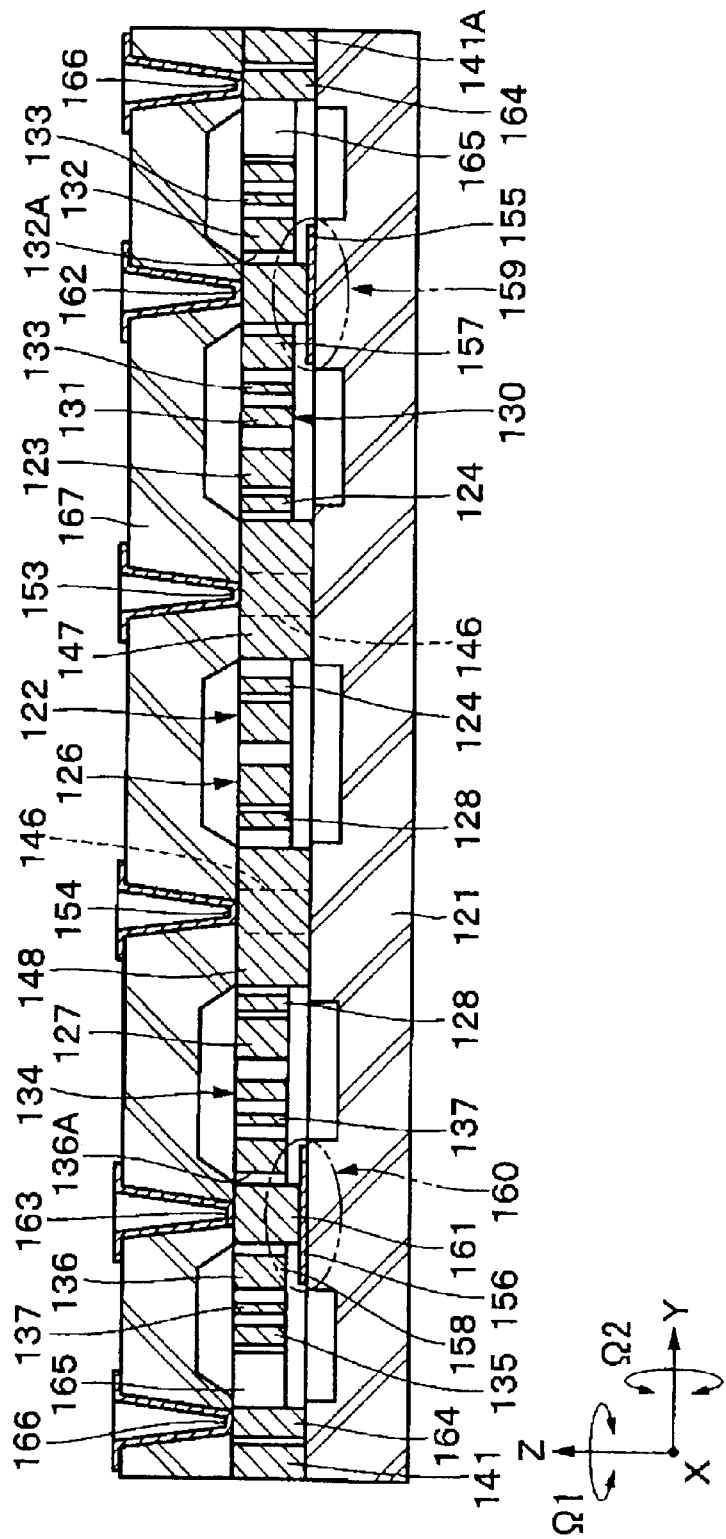
FIG. 21 is a sectional view of the angular velocity sensor shown in FIG. 20 cut along line XXI—XXI.
Figure 22:
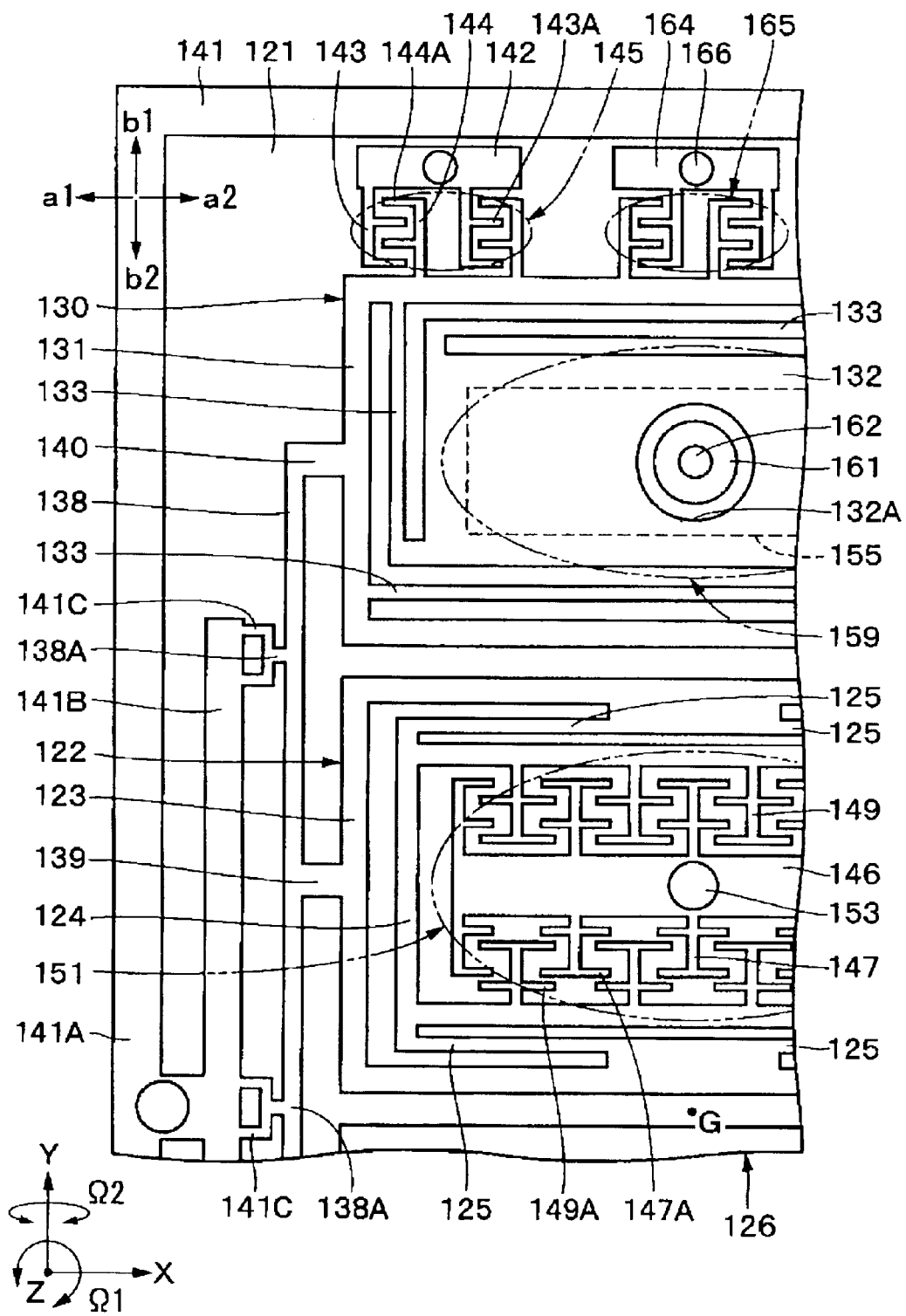
FIG. 22 is an enlarged plan view of a left side of the angular velocity shown in FIG. 20.

As shown in FIGS. 20 to 22, similarly to the second preferred embodiment, four mass members 122, 126, 130, and 134 are arranged above the substrate 121 such that central mass members 122 and 126 are disposed at the central region. The central mass member 122 includes a substantially rectangular central frame 123, a horizontal vibrator 124, and, four inner retaining beams 125.

Similarly to the central mass member 122, the central mass member 126 includes a substantially rectangular central frame 127, a horizontal vibrator 128, and, four inner retaining beams 129.

Among the four mass members 122, 126, 130, and 134, outer mass members 130 and 134 are disposed at positions outside the central mass members 122 and 126 in the Y-axis direction.

The outer mass member 130 includes a substantially rectangular outer frame 131, a vertical vibrator 132 disposed inside the external frame 131, and inner retaining beams 133 which retain the vertical vibrator 132 such that the vertical vibrator 132 can move (vibrate) in the Z-axis direction. The vertical vibrator 132 is preferably a substantially rectangular, flat mass member and an electrode hole 132A is disposed in the vertical vibrator 132 at the approximate center thereof, as shown in FIGS. 21 and 22.

Figure 23:
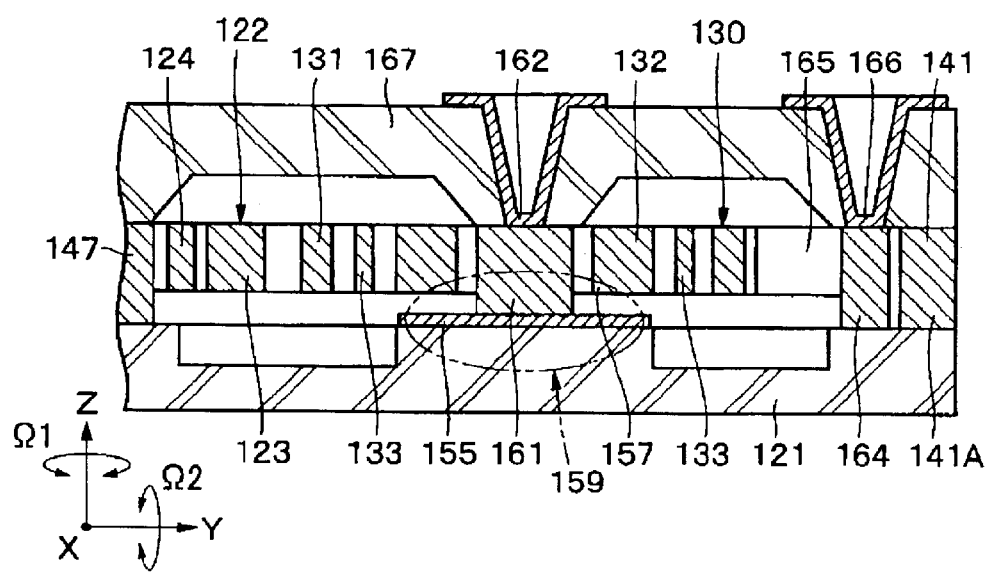
FIG. 23 is an enlarged sectional view of a vertical vibrator shown in FIG. 21.

Reference numeral 133 denotes, four inner retaining beams which are disposed between the outer frame 131 and the vertical vibrator 132. As shown in FIG. 23, the inner retaining beams 133 are thin and long, and one end thereof is fixed on the inner wall of the outer frame 131 and other end thereof is deflected in an 'L' shape and is fixed to the vertical vibrator 132 at four corners of the vertical vibrator 132.

Figure 24:
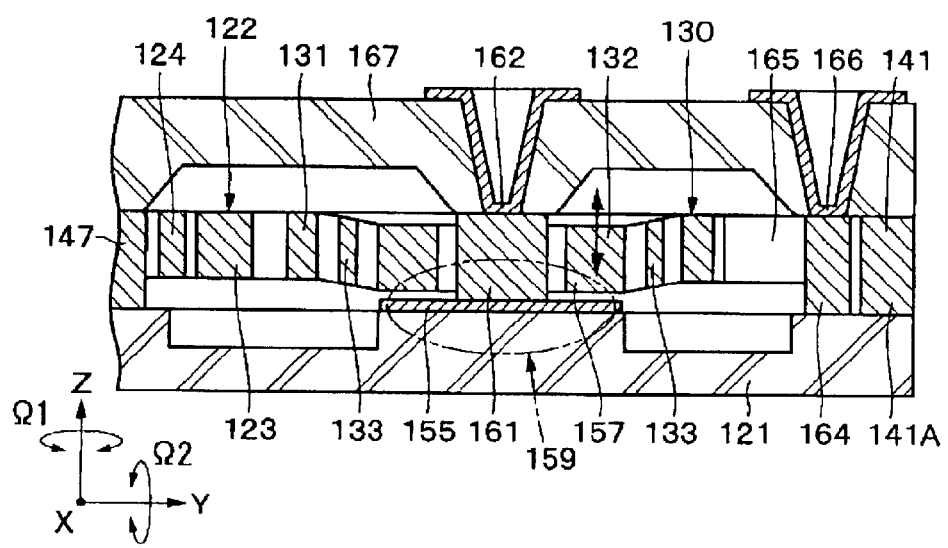
FIG. 24 is an enlarged sectional view showing the state in which the vertical vibrator moves in the Z-axis direction by an angular velocity about the Y axis.

Accordingly, as shown in FIG. 24, when the inner retaining beams 133 are deflected in the Z-axis direction, the vertical vibrator 132 moves toward/away from the substrate 121 along the Z-axis direction. Since the inner retaining beams 133 retain the vertical vibrator 132 at four corners thereof, the vertical vibrator 132 can reliably move with respect to the substrate 121 while being parallel to the substrate 121.

In addition, the inner supporting beams 133 extend along the four sides of the vertical vibrator 132, and are disposed so as to surround the vertical vibrator 132. Accordingly, even when the thin, long inner retaining beams 133 are connected to the vertical vibrator 132 at the four corners thereof, they can be arranged in a small area.

The outer mass member 134 is constructed similarly to the outer mass member 130, and includes a substantially rectangular outer frame 135, a vertical vibrator 136 having an electrode hole 136A, and inner retaining beams 137, as shown in FIG. 20.

Similarly to the second preferred embodiment, the four mass members 122, 126, 130, and 134 are arranged linearly in the Y-axis direction and have symmetrical shapes with respect to the overall center of gravity G. In addition, the mass members 122, 126, 130, and 134 vibrate in the X-axis direction such that the phase of the mass members 122 and 134 and the phase of the mass members 126 and 130 are opposite.

Reference numeral 138 denotes outer retaining beams which are disposed at the left and right sides and which retain the mass members 122, 126, 130, and 134 such that they can vibrate in the X-axis direction. Similarly to the second preferred embodiment, three node portions 138A are disposed on each of the outer retaining beams 138. In addition, each of the outer retaining beams 138 is connected to the central frames 123 and 127 by connecting members 139 at the central region in the longitudinal direction thereof, and to the outer frames 131 and 135 by connecting members 140 at both ends in the longitudinal direction thereof.

Reference numeral 141 denotes a fixing member provided on the substrate 121. Similarly to the second preferred embodiment, the fixing member 141 includes a substantially rectangular base frame 141A, T-shaped extending portions 141B, and arm portions 141C. Each of the arm portions 141C includes lateral beams, a longitudinal beam, and a fixing portion, and has elasticity so that it can be deflected in the Y-axis direction, and the outer retaining beams 138 are fixed to the substrate 121 at the node portions 138A by the arm portions 141C of the fixing member 141.

Four driving electrode retainers 142 are provided on the substrate 121 at positions outside the outer mass members 130 and 134. Each of the driving electrode retainers 142 retains a fixed driving electrode 143 having comb-like electrode fingers 143A. The electrode fingers 143A of the fixed driving electrodes 143 interlock with electrode fingers 144A of movable driving electrodes 144, which project from the outer mass members 130 and 134 with gaps therebetween. In this manner, four vibration generators 145 for vibrating the mass members 122, 126, 130, and 134 in the X-axis direction are constructed of four pairs of the driving electrodes 143 and 144.

In addition, similarly to the second preferred embodiment, two detection electrode retainers 146 are provided on the substrate 121 at positions inside the horizontal vibrators 124 and 128 to retain fixed detection electrodes 147 and 148. The fixed detection electrode 147 has electrode fingers 147A which interlock with electrode fingers 149A of a movable detection electrode 149 which projects inside the horizontal vibrators 124, and the fixed detection electrode 148 has electrode fingers 148A which interlock with electrode fingers 150A of a movable detection electrode 150 which projects inside the horizontal vibrators 128.

Reference numeral 151 denotes a displacement detector which functions as a first angular velocity detector element for detecting an angular velocity $\Omega 1$ about the Z axis. Similarly to the second preferred embodiment, the displacement detector 151 includes the detection electrodes 147 and 149, and detects the displacement of the horizontal vibrator 124 in the Y-axis direction as the angular velocity $\Omega 1$ about the Z axis on the basis of a capacitance change between the electrode fingers 147A and 149A.

Reference numeral 152 denotes a displacement detector which also functions as the first angular velocity detector element. The displacement detector 152 includes the detection electrodes 148 and 150, and detects the displacement of the horizontal vibrator 128 in the Y-axis direction as the angular velocity $\Omega 1$ about the Z axis on the basis of a capacitance change between the electrode fingers 148A and 150A.

In addition, similarly to the second preferred embodiment, when the horizontal vibrators 124 and 128 move in the opposite directions along the Y axis due to the angular velocity $\Omega 1$ about the Z axis, the displacement detectors 151 and 152 output detection signals via detection electrode pads 153 and 154 (see FIG. 20) provided on the detection electrode retainers 146. Accordingly, the angular velocity $\Omega 1$ can be detected with high accuracy by inputting the detection signals into a differential amplifier, etc.

When the horizontal vibrators 124 and 128 move in the same direction along the Y axis due to acceleration, the capacitance changes caused by the displacements can be canceled between the displacement detectors 151 and 152 and the influence of the acceleration can be eliminated.

Reference numerals 155 and 156 denote two fixed detection electrodes which are disposed on the substrate 121 at positions corresponding to the vertical vibrators 132 and 136, respectively. As shown in FIGS. 21 to 23, the fixed detection electrodes 155 and 156 include substantially rectangular metal films.

The fixed detection electrode 155 disposed at the right side in FIG. 21 opposes a movable detection electrode 157 disposed on the back surface of the vertical vibrator 132 with a gap therebetween in the Z-axis direction. Thus, the detection electrodes 155 and 157 define a plane-parallel capacitor. In addition, the fixed detection electrode 156 disposed at the left side opposes a movable detection electrode 158 disposed on the back surface of the vertical vibrator 136 with a gap therebetween in the Z-axis direction.

Reference numeral 159 denotes a displacement detector which functions as a second angular velocity detector element for detecting an angular velocity $\Omega 2$ about the Y axis. The displacement detector 159 includes the detection electrodes 155 and 157, and detects the displacement of the of the vertical vibrator 132 in the Z-axis direction as the angular velocity $\Omega 2$ about the Y axis on the basis of a capacitance change between the detection electrodes 155 and 157.

Reference numeral 160 denotes a displacement detector which also functions as the second angular velocity detector element. The displacement detector 160 includes the detection electrodes 156 and 158, and detects the displacement of the vertical vibrator 136 in the Z-axis direction as the angular velocity $\Omega 2$ about the Y axis on the basis of a capacitance change between the electrodes 156 and 158.

Two pad retainers 161 preferably made of a silicon material having a low resistance are provided on the substrate 121 such that they project through the electrode holes 132A and 136A disposed in the vertical vibrators 132 and 136, respectively. In addition, the pad retainers 161 retain detection electrode pads 162 and 163 at the projecting ends thereof, and the detection electrode pads 162 and 163 are connected to the fixed detection electrodes 155 and 156, respectively, by the pad retainers 161.

When the angular velocity sensor is activated, similarly to the second preferred embodiment, the outer mass members 130 and 134 vibrate in the X-axis direction in opposite phases. Accordingly, when the angular velocity Ω2 about the Y axis is applied to the vertical vibrators 132 and 136, the vertical vibrators 132 and 136 move in the opposite directions along the Z axis.

Accordingly, the displacement detectors 159 and 160 output detection signals corresponding to the displacements of the vertical vibrators 132 and 136 via the detection electrode pads 162 and 163, respectively, and the angular velocity Ω2 about the Y axis can be detected with high accuracy by inputting the detection signals into a differential amplifier, etc.

When an acceleration is applied to the vertical vibrators 132 and 136 in the Z-axis direction, the vertical vibrators 132 and 136 move in the same direction along the Z axis, so that the capacitance changes caused by the displacements of the vertical vibrators 132 and 136 can be canceled between the displacement detectors 159 and 160. Therefore, the angular velocity Ω2 about the Y axis can be detected separately from disturbances such as acceleration.

Reference numeral 164 denotes two monitor electrode retainers which are provided on the substrate 121 at the front and back of the outer mass members 130 and 134. Similarly to the second preferred embodiment, each of the monitor electrode retainers 164 is provided with a monitor electrode unit 165 and a monitor electrode pad 166, which will be described below.

The monitor electrode units 165 function as a vibrational state monitor. One of the monitor electrodes units 165 is disposed between one of the monitor electrode retainers 164 and the mass member 130, and the other one of the monitor electrode units 165 is disposed between the other one of the monitor electrode retainers 164 and the mass member 134. The monitor electrode units 165 output alternating-current monitor signals corresponding to vibration frequencies, amplitudes, etc., of the outer mass members 130 and 134 via the monitor electrode pads 166.

The monitor signals are used for, for example, monitoring the vibrational states of the mass members 122, 126, 130, and 134, or as references for signal processing, such as synchronous detection, of the detection signals of the angular velocities Ω1 and Ω2. Reference numeral 167 shows a cover plate for covering the substrate 121.

Accordingly, operational effects similar to those obtained in the first and second preferred embodiments can also be obtained in the sixth preferred embodiment. In addition, in the sixth preferred embodiment, among the four mass members 122, 126, 130, and 134, the central mass members 122 and 126 are used for detecting the angular velocity Ω1 about the Z axis and the outer mass members 130 and 134 are used for detecting the angular velocity Ω2 about the Y axis.

Accordingly, a detector for detecting the angular velocity Ω1 and a detector for detecting the angular velocity Ω2 can be defined by a single set of mass members 122, 126, 130, and 134 in a small space. In addition, the vibration generators 145 and the monitor electrode units 165 can be used in common for both of these detectors.

Accordingly, the overall size of the sensor can be greatly reduced compared to a case in which two angular velocity sensors are disposed perpendicular to each other in order to detect angular velocities about two axes. In addition, the assembly process can be performed more easily, and structures of signal processing circuits and electric wires for processing the vibration signals, the detection signals of the angular velocities Ω1 and Ω2, the monitor signals, etc., can be made much simpler.

In addition, according to the sixth preferred embodiment, the horizontal vibrators 124 and 128 move in accordance with the angular velocity Ω1 about the Z axis and the vertical vibrators 132 and 136 move in accordance with the angular velocity Ω2 about the Y axis. Therefore, the angular velocities Ω1 and Ω2 can be detected with high accuracy and reliability of the sensor can be improved compared to a case in which a single vibrator moves in the Y and Z-axis directions in accordance with the angular velocities Ω1 and Ω2 and the displacements of the vibrator in the Y and Z-axis directions are separated from each other by signal processing, etc., to obtain the angular velocities Ω1 and Ω2.

In addition, since accelerations along the Y axis can be canceled between the horizontal vibrators 124 and 128 (between the displacement detectors 151 and 152) and accelerations along the Z axis can be canceled between the vertical vibrators 132 and 136 (between the displacement detectors 159 and 160), the influence of accelerations along these two directions can be reliably eliminated, and a two-axis angular velocity sensor having high detection accuracy can be obtained.

Figure 25:
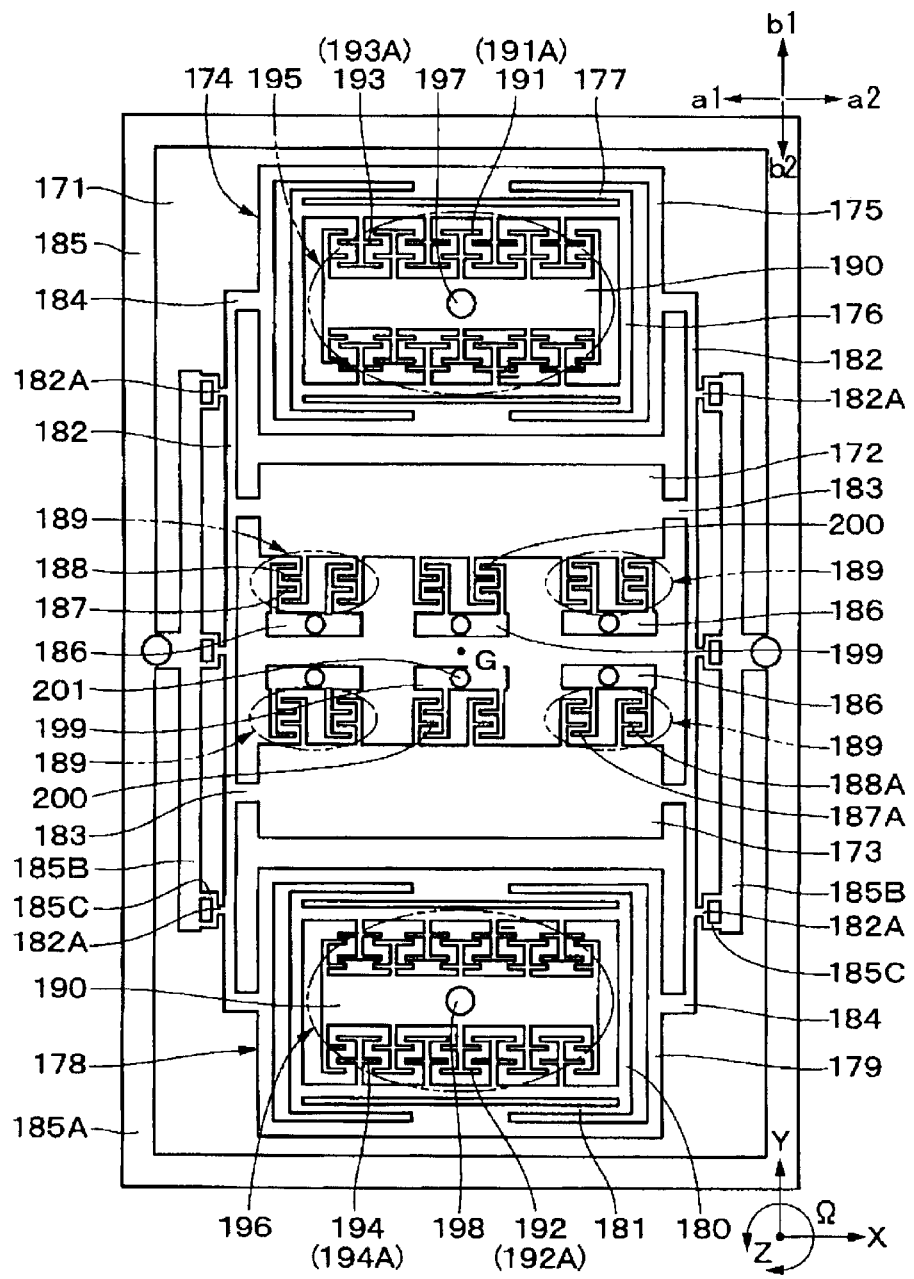
FIG. 25 is a plan view showing an angular velocity sensor according to a seventh preferred embodiment of the present invention.

Next, a seventh preferred embodiment of the present invention will be described below with reference to FIG. 25. According to the seventh preferred embodiment, an angular velocity detector detects an angular velocity about the Z axis on the basis of displacements two of the four mass members which are disposed at the outside (at both ends) in the Y-axis direction when the two mass members move in the Y-axis directions due to the angular velocity. In the seventh preferred embodiment, components similar to those in the second preferred embodiment are denoted by the same reference numerals and explanations thereof are thus omitted.

Reference numeral 171 denotes a substrate preferably made of a silicon material having a high resistance, a glass material, or other suitable material. Central mass members 172 and 173, outer mass members 174 and 178, outer retaining beams 182, a fixing member 185, vibration generators 189, displacement detectors 195 and 196, monitor electrode units 200, etc., which will be described below, are disposed on the surface of the substrate 171 with, for example, a silicon material having a low resistance.

The central mass members 172 and 173 are disposed at the central region of the substrate 171, and extend linearly along the X-axis direction. In addition, the central mass members 172 and 173 are connected to the outer retaining beams 182 at both ends thereof.

The outer mass member 174 is disposed outside the central mass member 172 in the Y-axis direction, and includes a substantially rectangular outer frame 175, a horizontal vibrator 176 which is disposed inside the outer frame 175, and four inner retaining beams 177. In addition, the horizontal vibrator 176 is a substantially rectangular frame and is retained by the inner retaining beams 177 such that the horizontal vibrator 176 can move in the Y-axis direction.

The outer mass member 178 is disposed outside the central mass member 173 in the Y-axis direction, and is constructed similarly to the outer mass member 174. More specifically, the outer mass member 178 includes a substantially rectangular outer frame 179, a horizontal vibrator 180, and four inner retaining beams 181, and the horizontal vibrator 180 is retained by the inner retaining beams 181 such that the horizontal vibrator 180 can move in the Y-axis direction.

Similarly to the first preferred embodiment, the four mass members 172, 173, 174, and 178 are arranged linearly in the Y-axis direction and are connected to each other by the outer retaining beams 182. In addition, the shapes of the mass members 172, 173, 174, and 178 are symmetrical in the Y-axis direction about the overall center of gravity G of the mass members 172, 173, 174, and 178. The mass members 172, 173, 174, and 178 vibrate in the X-axis direction such that the phase of the mass members 172 and 178 and the phase of the mass members 173 and 174 are opposite while the overall center of gravity G is maintained at an approximately constant position.

The retaining beams 182 are disposed at the left and right sides and retain the mass members 172, 173, 174, and 178 such that they can vibrate in the X-axis direction. Similarly to the second preferred embodiment, three node portions 182A are disposed on each of the outer retaining beams 182. In addition, each of the outer retaining beams 182 is connected to the central frames 172 and 173 by connecting members 183 at the central region in the longitudinal direction thereof, and to the outer frames 175 and 179 by connecting members 184 at both ends in the longitudinal direction thereof.

The fixing member 185 is provided on the substrate 171, and similarly to the second preferred embodiment, the fixing member 185 includes a substantially rectangular base frame 185A, T-shaped extending portions 185B, and arm portions 185C. Each of the arm portions 185C includes lateral beams, a longitudinal beam, and a fixing portion, and has elasticity so that it can be deflected in the Y-axis direction, and the outer retaining beams 182 are fixed to the substrate 171 at the node portions 182A by the arm portions 185C of the fixing member 185.

Four driving electrode retainers 186 are provided on the substrate 171 at positions between the central outer mass members 172 and 173. Each of the driving electrode retainers 186 retains a fixed driving electrode 187 having comb-like electrode fingers 187A. The electrode fingers 187A of the fixed driving electrodes 187 interlock with electrode fingers 188A of movable driving electrodes 188, which project from the central mass members 172 and 173 with gaps therebetween. In this manner, four vibration generators 189 for vibrating the mass members 172, 173, 174, and 178 in the X-axis direction are constructed of four pairs of the driving electrodes 187 and 188.

In addition, similarly to the second preferred embodiment, two detection electrode retainers 190 are provided on the substrate 171 at positions inside the horizontal vibrators 176 and 180 to retain fixed detection electrodes 191 and 192. The fixed detection electrode 191 has electrode fingers 191A which interlock with electrode fingers 193A of a movable detection electrode 193 which projects inside the horizontal vibrators 176, and the fixed detection electrode 192 has electrode fingers 192A which interlock with electrode fingers 194A of a movable detection electrode 194 which projects inside the horizontal vibrators 180.

The displacement detector 195 functions as an angular velocity detector for detecting an angular velocity Ω about the Z axis. Similarly to the second preferred embodiment, the displacement detector 195 includes the detection electrodes 191 and 193, and detects the displacement of the horizontal vibrator 176 in the Y-axis direction as the angular velocity Ω about the Z axis on the basis of a capacitance change between the electrode fingers 191A and 193A.

The displacement detector 196 functions as another angular velocity detector, and includes the detection electrodes 192 and 194. The displacement detector 196 detects the displacement of the horizontal vibrator 180 in the Y-axis direction as the angular velocity Ω about the Z axis on the basis of a capacitance change between the electrode fingers 192A and 194A.

In addition, similarly to the second preferred embodiment, when the horizontal vibrators 176 and 180 move in the opposite directions along the Y axis due to the angular velocity Ω about the Z axis, the displacement detectors 195 and 196 output detection signals via detection electrode pads 197 and 198 provided on the detection electrode retainers 190. Accordingly, the angular velocity Ω about the Z axis can be detected with high accuracy by inputting the detection signals into a differential amplifier, etc.

When the horizontal vibrators 176 and 180 move in the same direction along the Y axis due to acceleration, the capacitance changes caused by the displacements can be canceled between the displacement detectors 195 and 196 and the influence of the acceleration can be eliminated.

Reference numeral 199 denotes two monitor electrode retainers which are provided on the substrate 171 at positions between the central mass members 172 and 173. Similarly to the second preferred embodiment, two monitor electrode units 200 are provided. One of the monitor electrode units 200 is disposed between one of the monitor electrode retainers 199 and the central mass member 172, and the other one of the monitor electrode units 200 is disposed between the other one of the monitor electrode retainers 199 and the central mass member 173. In addition, each of the monitor electrode retainers 199 is provided with a monitor electrode pad 201.

Accordingly, operational effects similar to those obtained in the first preferred embodiment can also be obtained in the seventh preferred embodiment.

Although the acceleration component included in the external force is eliminated to detect only the angular velocity component in the first preferred embodiment, the present invention is not limited to this. For example, detection electric wires for obtaining acceleration which add the detection signals of the displacement detectors 29 and 32 (or the displacement detectors 30 and 31) may also be provided. In such a case, while the angular velocity sensor is activated and the angular velocity is detected by the detection electric wires 42 and 43, the acceleration can also be detected by detection electric wires for the acceleration by canceling the angular-velocity components included in the detections signals between the displacement detectors 29 and 32 (or the displacement detectors 30 and 31).

In addition, in the above-described third preferred embodiment, the monitor electrode units 103 and 106 are disposed at the node portions 62A placed at the center in the longitudinal direction of the outer retaining beams 62. However, the present invention is not limited to this, and the monitor electrode units 103 and 106 may also be disposed at the node portions 62A placed near the ends of the outer retaining beams 62.

In addition, although the angular velocity Ω about the Z axis, which is perpendicular to the substrate 1 or the substrate 51, is detected in the first to fourth preferred embodiments, the present invention is not limited to this. For example, the mass members may be moved in the Z-axis direction in accordance with the angular velocity about the Y axis while being vibrated in the X-axis direction, and the displacements in the Z-axis direction may be detected as the angular velocity about the Y axis.

In addition, although the angular velocity Ω1 about the Z axis is detected by the central mass members 122 and 126 and the angular velocity Ω2 about the Y axis is detected by the outer mass members 130 and 134 in the fifth preferred embodiment, the present invention is not limited to this. For example, the constructions and functions of the central mass members and the outer mass members can be exchanged, and the angular velocity about the Y axis may be detected by the central mass members and the angular velocity about the Z axis may be detected by the outer mass members.

In such a case, the central mass members are constructed such that they can move in the Z-axis direction while they are vibrating in the X-axis direction and the second angular velocity detector elements which detect the displacements of the central mass members in the Z-axis direction as the angular velocity about the Y axis on the basis of capacitance changes are disposed between the central mass members and the substrate. In addition, the outer mass members are constructed such that they can move in the Y-axis direction while they are vibrating in the X-axis direction and the first angular velocity detector elements which detect the displacements of the outer mass members in the Y-axis direction as the angular velocity about the Z axis on the basis of the capacitance changes are disposed between the outer mass members and the substrate.

Figure 26:
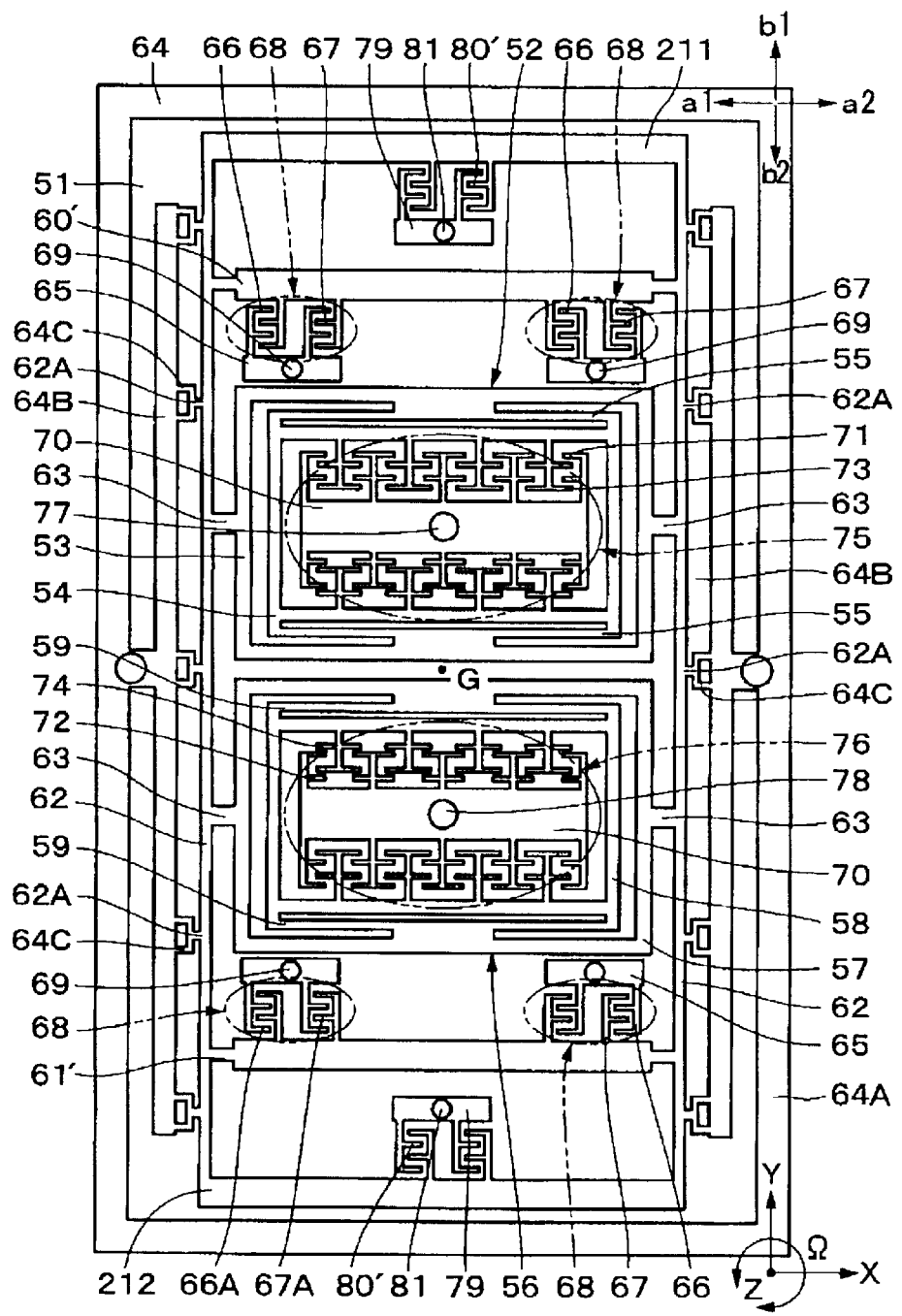
FIG. 26 is a plan view showing an angular velocity sensor according to a first modification of preferred embodiments of the present invention.

In addition, although the four mass members 2, 6, 10, 11, 52, 56, 60, 61, 122, 126, 130, 134, 172, 173, 174, and 178 are arranged in the Y-axis direction in the above-described first to seventh preferred embodiments, the present invention is not limited to this. For example, as in a first modification shown in FIG. 26, six mass members in total may be provided by disposing auxiliary mass members 211 and 212 at positions outside outer mass members 60' and 61'. In this case, the auxiliary mass members 211 and 212 vibrate in the X-axis direction such that the phase of the auxiliary mass member 211 is opposite to that of the outer mass member 60' and the phase of the auxiliary mass member 212 is opposite to that of the outer mass member 61'. Furthermore, eight or more mass members may also be provided. In addition, monitor electrode units 80' may be provided to the auxiliary mass members 211 and 212. By increasing the number of mass members, the rotational moments caused by the drive vibration can be easily adjusted to cancel each other and the area of the detection electrodes can be increased.

Figure 27:
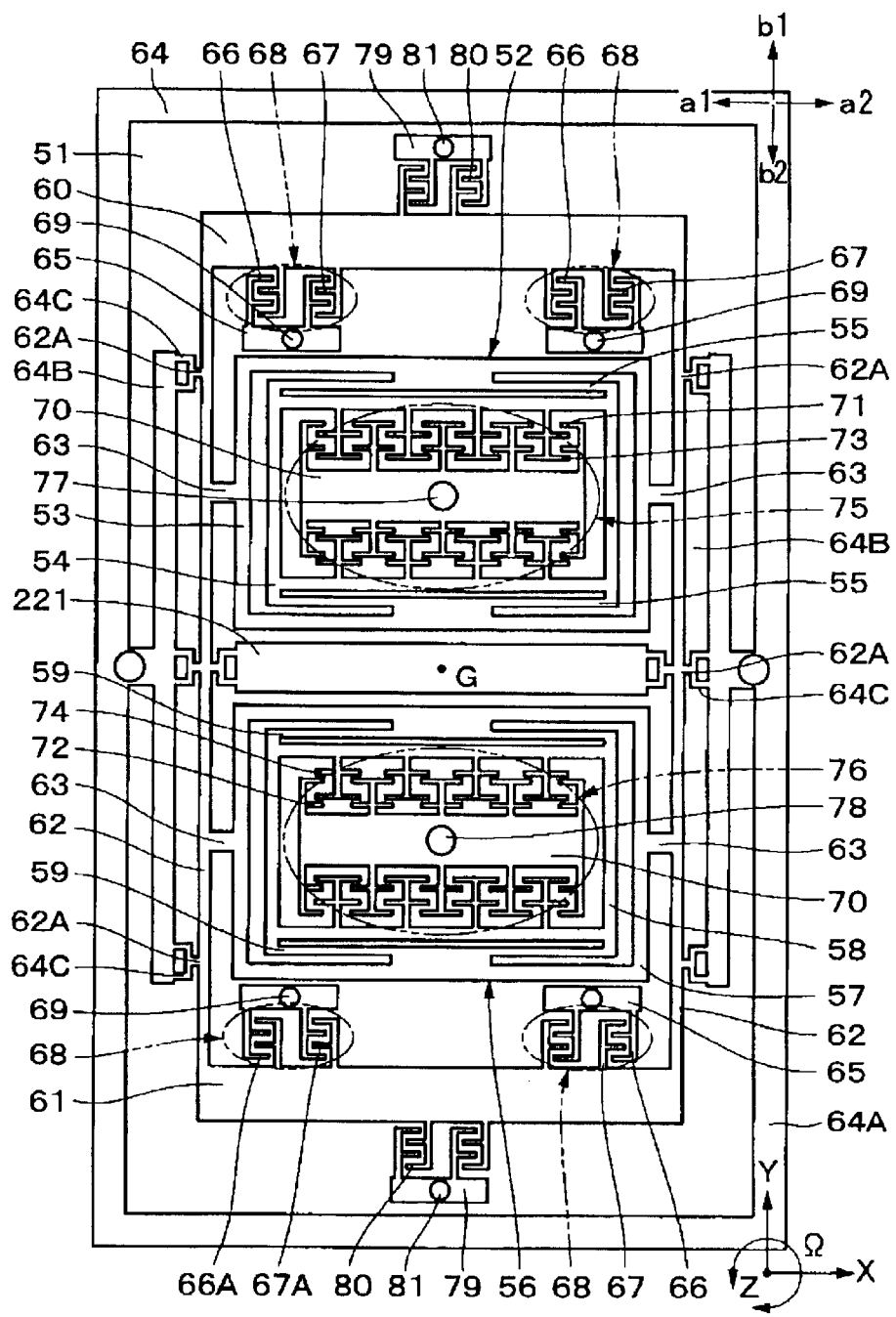
FIG. 27 is a plan view showing an angular velocity sensor according to a second modification of preferred embodiments of the present invention.

In addition, as in a second modification shown in FIG. 27, a reinforcing member 221 which reinforces the angular velocity sensor may be provided between the central mass members 52 and 56. In such a case, both ends of the reinforcing member 221 are connected to the node portions 62A, so that the reinforcing member 221 does not move even when the mass members 52, 56, 60, and 61 vibrate. Since the reinforcing member 221 is provided for suppressing the movement of the overall body including the mass members 52, 56, 60, and 61, it is preferable that the reinforcing member 221 have high rigidity or large mass.

Figure 28:
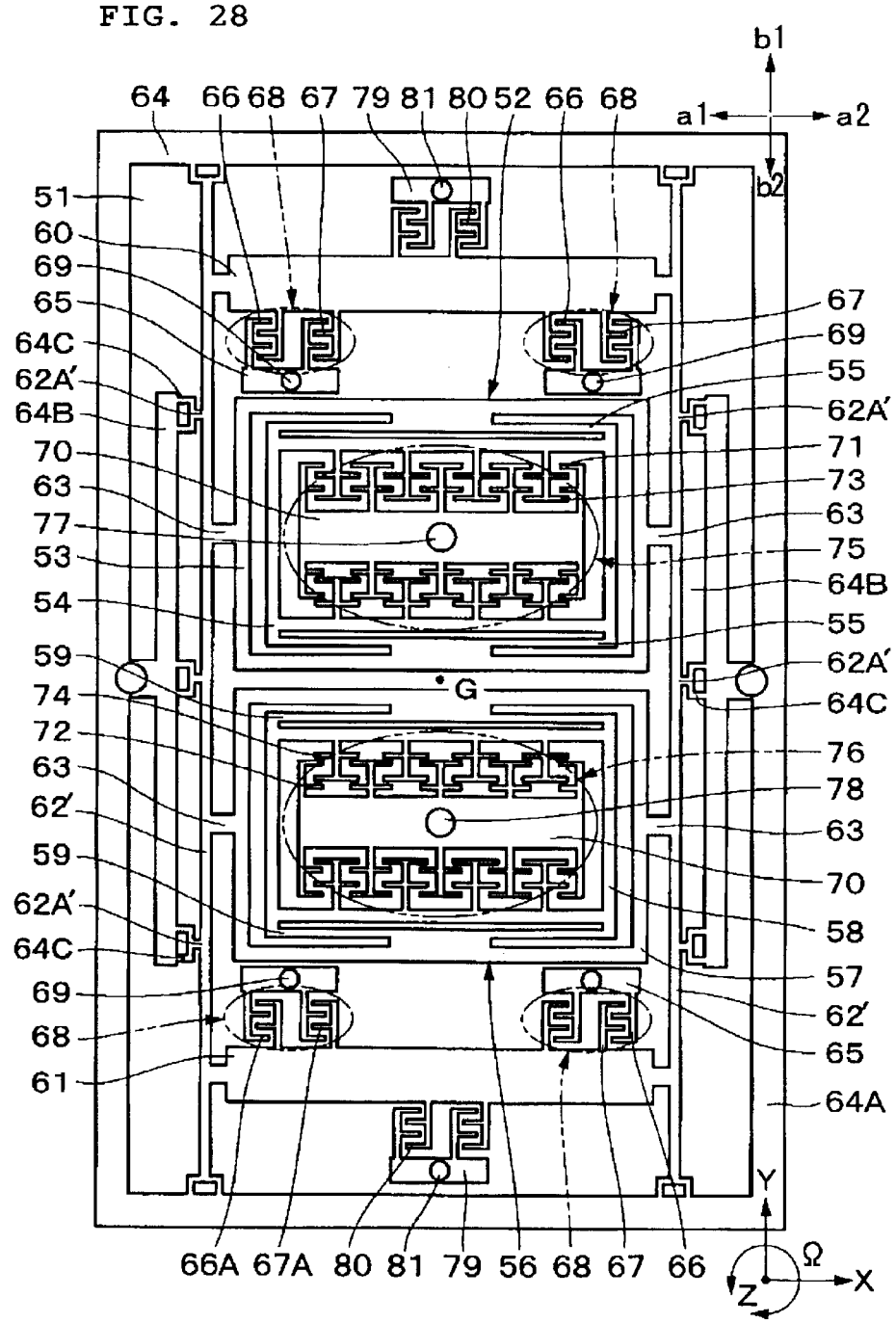
FIG. 28 is a plan view showing an angular velocity sensor according to a third modification of preferred embodiments of the present invention.

In addition, although the outer retaining beams 12, 62, 138, and 182 are free-free beams which extend in the Y-axis direction according to the first to seventh preferred embodiments, the present invention is not limited to this. For example, as in a third modification shown in FIG. 28, both ends of the outer retaining beams 62' may be extended and connected (fixed) to the substantially rectangular base frame 64A (substrate 51). In such a case, the outer mass members 60 and 61 can be prevented from vibrating in the Z-axis direction.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed is:

1. An angular velocity sensor comprising:
   a substrate;
   four mass members which face the substrate with a gap between each of the four mass members and the substrate, the four mass members being arranged along a Y-axis direction when X, Y, and Z axes that are perpendicular to each other are defined;
   retaining beams which connect the four mass members such that the four mass members can move in the X-axis direction;
   a fixing member disposed between the substrate and the retaining beams to fix the retaining beams to the substrate;
   a vibration generator which vibrates at least one of the four mass members in the X-axis direction so that each of the adjacent mass members vibrate in opposite phases; and
   an angular velocity detector which detects an angular velocity on the basis of displacements of two of the four mass members which are disposed symmetrically about a central position in the Y-axis direction when the two mass members disposed symmetrically about the central position move in at least one of the Y and Z-axis directions by the angular velocity.

2. An angular velocity sensor according to claim 1, wherein the angular velocity detector detects an angular velocity on the basis of displacements of two of the four mass members which are disposed at the central region in the Y-axis direction when the two mass members disposed at the central region move in at least one of the Y and Z-axis directions by the angular velocity.

3. An angular velocity sensor according to claim 1, wherein the retaining beams are fixed to the substrate by the fixing member at portions corresponding to nodes of the retaining beams when the four mass members vibrate such that two adjacent mass members are in apposite phases.

4. An angular velocity sensor according to claim 1, wherein the four mass members are arranged linearly in the Y-axis direction and the retaining beams extend linearly in the Y-axis direction and connect the four mass members.

5. An angular velocity sensor according to claim 1, wherein the four mass members include a pair of mass members disposed at the central region in the Y-axis direction and a pair of mass members disposed at positions outside the mass members disposed at the central region, wherein a first pair selected from the two pairs of mass members moves in the Y-axis direction in accordance with an angular velocity about the Z axis and a second pair of the two pairs of mass members moves in the Z-axis direction in accordance with an angular velocity about the Y axis, and wherein the angular velocity detector includes a first angular velocity detector element for detecting the angular velocity about the Z axis on the basis of displacements of the first pair of mass members and a second angular velocity detector element for detecting the angular velocity about Y axis on the basis of displacements of the second pair of mass members.

6. An angular velocity sensor according to claim 1, wherein each of two mass members which are disposed at the central region comprises:
   a central frame having a frame shape; and
   a horizontal vibrator which is disposed inside the central frame such that the horizontal vibrator can vibrate in the Y-axis direction along the substrate;

wherein the angular velocity detector detects an angular velocity about the Z axis on the basis of displacements of the horizontal vibrators in the Y-axis direction.

7. An angular velocity sensor according to claim 6, wherein the angular velocity detector includes first and second displacement detectors for detecting a displacement in the Y-axis direction of the horizontal vibrator of one of the two mass members disposed at the central region, and third and fourth displacement detectors for detecting a displacement in the Y-axis direction of the horizontal vibrator of the other one of the two mass members disposed at the central region.

8. An angular velocity sensor according to claim 7, wherein the first and second displacement detectors include first and second fixed detection electrodes and first and second movable detection electrodes, respectively, the first and second fixed electrodes being provided on the substrate and the first and second movable electrodes being provided on the corresponding horizontal vibrator and facing the first and second fixed detection electrodes, respectively, with gape therebetween in the Y-axis direction, and when the angular velocity about the Z axis is applied, the movable detection electrode moves toward the fixed detection electrode in one of the first and second displacement detectors and the movable detection electrode moves away from the movable detection electrode in the other one of the first and second displacement detectors move away from each other, and wherein the third and fourth displacement detectors include third and fourth fixed detection electrodes and third and fourth movable detection electrodes, respectively, the third and fourth fixed electrodes being provided on the substrate and the third and fourth movable electrodes being provided on the corresponding horizontal vibrator and facing the third and fourth fixed detection electrodes, respectively, with gaps therebetween in the Y-axis direction, and when the angular velocity about the Z axis is applied, the movable detection electrode moves toward the fixed detection electrode in one of the third and fourth displacement detectors and the movable detection electrode moves away from the movable detection electrode in the other one of the third and fourth displacement detectors move away from each other.

9. An angular velocity sensor according to claim 8, wherein the angular velocity detector includes a first displacement detector for detecting a displacement in the Y-axis direction of the horizontal vibrator of one of the two mass members disposed at the central region, and a second displacement detector for detecting a displacement in the Y-axis direction of the horizontal vibrator of the other one of the two mass members disposed at the central region, wherein the first displacement detector includes a first fixed detection electrode which is provided on the substrate and a first movable detection electrode which is provided on the corresponding horizontal vibrator and faces the first fixed detection electrode with a gap therebetween in the Y-axis direction, and the second displacement detector includes a second fixed detection electrode which is provided on the substrate and a second movable detection electrode which is provided on the corresponding horizontal vibrator and faces the second fixed detection electrode with a gap therebetween in the Y-axis direction.

10. An angular velocity sensor according to claim 9, wherein, when the angular velocity about the Z axis is applied, the first and second movable detection electrodes move toward or away from the first and second fixed detection electrodes, respectively, in the first and second displacement detectors at the same time.

11. An angular velocity sensor according to claim 9, wherein, when the angular velocity about the Z axis is applied, the movable detection electrode moves toward the fixed detection electrode in one of the first and second displacement detectors, and the movable detection electrode moves away from the fixed detection electrode in the other one of the first and second displacement detectors.

12. An angular velocity sensor according to claim 1, wherein each of two of the four mass members which are disposed at the outside in the Y-axis direction comprises:
a central frame having a frame shape; and
a vertical vibrator which is disposed inside the central frame such that the vertical vibrator can vibrate in the Z-axis direction, which is perpendicular to the substrate;
wherein the angular velocity detector detects an angular velocity about the Y axis on the basis of displacements of the vertical vibrators in the Z-axis direction.

13. An angular velocity sensor according to claim 1, wherein the fixing member includes arm portions which are deflected in the Y-axis direction while retaining the mass members when an acceleration is applied to the mass members in the Y-axis direction.

14. An angular velocity sensor according to claim 1, wherein the four mass members are arranged symmetrically in the Y-axis direction with respect to the overall center of gravity of the four mass members.

15. An angular velocity sensor according to claim 1, wherein masses of two of the four mass members which are disposed at the outside in the Y-axis direction are smaller than masses of the two mass members disposed at the central region, and wherein, when the four mass members vibrate, a rotational moment about the overall center of gravity of the four mass members applied to the two mass members disposed at the central region is approximately the same as a rotational moment about the overall center of gravity of the four mass members applied to the two mass members disposed at the outside.

16. An angular velocity sensor according to claim 1, wherein two of the four mass members which are disposed at the central region in the Y-axis direction are provided with a vibrational state monitor for monitoring the state of vibration generated by the vibration generator on the basis of displacements of the mass members when the mass members vibrate in the X-axis direction.

17. An angular velocity sensor according to claim 1, wherein two of the four mass members which are disposed at the outside in the Y-axis direction are provided with a vibrational state monitor for monitoring the state of vibration generated by the vibration generator on the basis of displacements of the mass members when the mass members vibrate in the X-axis direction.

18. An angular velocity sensor according to claim 1, further comprising a vibrational state monitor for monitoring the state of vibration generated by the vibration generator on the basis of displacements of the mass members when the mass members vibrate in the X-axis direction, the vibrational state monitor being disposed at a portion of
one of the retaining beams which corresponds to one of nodes of the retaining beam when the mass members vibrate such that two adjacent mass members are in opposite phases.

19. An angular velocity sensor according to claim 18, wherein the vibrational state monitor comprises:
a fixed monitor electrode provided on the substrate; and a movable monitor electrode which is disposed on the portion of the retaining beam which corresponds to the node and which rotates around the portion of the retaining beam which corresponds to the node with respect to the fixed monitor electrode when the mass members vibrate and the retaining beams are deflected.

20. An angular velocity sensor according to claim 19, wherein the fixed monitor electrode includes a plurality of electrode fingers having an arc shaped configuration around the portion of the retaining beam which corresponds to the node, and the movable monitor electrode includes a plurality of electrode fingers having an arc shape such that the electrode fingers of the fixed monitor electrode and the electrode fingers of the movable monitor electrode oppose each other with gaps provided in the radial direction.

21. An angular velocity sensor according to claim 1, wherein the angular velocity detector includes first and second displacement detectors for detecting a displacement in the Y-axis direction of one of the two mass members disposed symmetrically about the central position in the Y-axis direction, and third and fourth displacement detectors for detecting a displacement in the Y-axis direction of the other one of the two mass members disposed symmetrically about the central position in the Y-axis direction.

22. An angular velocity sensor according to claim 1, wherein the angular velocity detector includes a first displacement detector for detecting a displacement in the Y-axis direction of one of the two mass members disposed symmetrically about the central position in the Y-axis direction, and a second displacement detector for detecting a displacement in the Y-axis direction of the other one of the two mass members disposed symmetrically about the central position in the Y-axis direction.

* * * * *